United States Patent
Jang et al.

(10) Patent No.: US 12,478,675 B2
(45) Date of Patent: Nov. 25, 2025

(54) PHARMACEUTICAL COMPOSITION FOR ENHANCING RADIOTHERAPY COMPRISING FUSION PROTEIN CONTAINING IL-2 PROTEIN AND CD80 PROTEIN

(71) Applicant: GI INNOVATION, INC., Seoul (KR)

(72) Inventors: Myung Ho Jang, Seoul (KR); Su Youn Nam, Seoul (KR); Young Jun Koh, Seoul (KR)

(73) Assignee: GI INNOVATION, INC., Seoul (KR)

( * ) Notice: Subject to any disclaimer, the term of this patent is extended or adjusted under 35 U.S.C. 154(b) by 493 days.

(21) Appl. No.: 18/008,034

(22) PCT Filed: Jun. 1, 2021

(86) PCT No.: PCT/KR2021/006809
§ 371 (c)(1),
(2) Date: Dec. 2, 2022

(87) PCT Pub. No.: WO2021/246757
PCT Pub. Date: Dec. 9, 2021

(65) Prior Publication Data
US 2023/0233680 A1    Jul. 27, 2023

(30) Foreign Application Priority Data

Jun. 5, 2020 (KR) .................. 10-2020-0068456

(51) Int. Cl.
| | | |
|---|---|---|
| *A61K 41/00* | (2020.01) | |
| *A61P 35/00* | (2006.01) | |
| *C07K 14/55* | (2006.01) | |
| *C07K 14/705* | (2006.01) | |
| *A61K 38/00* | (2006.01) | |

(52) U.S. Cl.
CPC .......... *A61K 41/0038* (2013.01); *A61P 35/00* (2018.01); *C07K 14/55* (2013.01); *C07K 14/70532* (2013.01); *A61K 38/00* (2013.01); *C07K 2319/00* (2013.01); *C07K 2319/30* (2013.01)

(58) Field of Classification Search
CPC ...... A61K 41/0038; A61P 35/00; C07K 14/55
See application file for complete search history.

(56) References Cited

U.S. PATENT DOCUMENTS

| 10,273,281 B2 | 4/2019 | Brennan et al. |
|---|---|---|
| 2002/0018767 A1 | 2/2002 | Lee et al. |

FOREIGN PATENT DOCUMENTS

| KR | 10-2002-0010206 A | 2/2002 |
|---|---|---|
| KR | 10-2016-0134989 A | 11/2016 |
| KR | 10-2018-0069903 A | 6/2018 |
| KR | 10-2020-0032009 A | 3/2020 |
| WO | 2017/079117 A1 | 5/2017 |
| WO | 2020/060122 A1 | 3/2020 |

OTHER PUBLICATIONS

J.C. Park, et al., "GI101, a novel triple-targeting bispecific CD80-IgG4-IL2variant fusion protein, elicits synergistic anti-tumour effects in preclinical models", Immunotherapy of Cancer, Oct. 2019, vol. 30, Supp. 5, p. v500 (1 page total).

Ondrej Palata et al., "Radiotherapy in Combination With Cytokine Treatment", Frontiers in Oncology, May 22, 2019, pp. 1-14, vol. 9, Article No. 367.

Damodaran Chendil et al., "Curcumin confers radiosensitizing effect in prostate cancer cell line PC-3", Oncogene, 2004, pp. 1599-1607, 23(8).

International Search Report for PCT/KR2021/006809, dated Sep. 9, 2021.

*Primary Examiner* — Amber D Steele
(74) *Attorney, Agent, or Firm* — Sughrue Mion, PLLC

(57) ABSTRACT

A pharmaceutical composition for enhancing radiation therapy, containing a fusion protein dimer is disclosed. The fusion protein dimer includes an IL-2 protein and a CD80 protein. A method of radiation therapy for cancer, using the composition is also disclosed. The composition for enhancing radiation therapy may increase the effect of radiation therapy in cancer treatment.

26 Claims, 8 Drawing Sheets
Specification includes a Sequence Listing.

PHARMACEUTICAL COMPOSITION FOR ENHANCING RADIOTHERAPY COMPRISING FUSION PROTEIN CONTAINING IL-2 PROTEIN AND CD80 PROTEIN

CROSS REFERENCE TO RELATED APPLICATIONS

This application is a National Stage of International Application No. PCT/KR2021/006809 filed Jun. 1, 2021, claiming priority based on Korean Patent Application No. 10-2020-0068456 filed Jun. 5, 2020.

INCORPORATION BY REFERENCE OF SEQUENCE LISTING

The content of the electronically submitted sequence listing, file name: Q282131_Sequence_Listing_As_Filed.txt; size: 98,640 bytes; and date of creation: Dec. 2, 2022, filed herewith, is incorporated herein by reference in its entirety.

TECHNICAL FIELD

The present invention relates to a pharmaceutical composition for enhancing radiation therapy, comprising a fusion protein comprising an IL-2 protein and a CD80 protein, and a method of radiation therapy for cancer using the same.

BACKGROUND ART

Methods for treating cancer can be largely divided into surgery, radiation therapy, and anticancer chemotherapy. The number of cancer patients receiving radiation therapy in Korea is increasing every year, and accordingly, the importance of radiation therapy in cancer treatment is also increasing.

Radiation therapy is currently known as an essential treatment method for various types of cancer. However, the acquisition of radiation resistance of cancer cells, the damage to normal tissues during high-dose radiation therapy, and the like have been pointed out as problems that reduce the efficiency of radiation therapy. Therefore, research on radiation therapy sensitizers and radiation sensitizing compounds to enhance the efficiency of radiation therapy has been attempted (*Oncogene*, 23 (8): 1599-1607, 2004). However, radiation therapy sensitizers reported so far are mainly anticancer agents, for example, taxol, cisplatin, and the like.

When the anticancer agents used to enhance the effect of radiation therapy as described above are used in combination with radiation therapy, the toxicity of anticancer agents may appear in combination with the side effects that occur during radiation therapy, i.e., inflammation of the radiation therapy site, gastrointestinal disorders, nausea, vomiting, diarrhea, and the like, and thus, they have the disadvantage of being limited in their use.

Therefore, there is an urgent need to develop a radiation therapy enhancer capable of optimizing radiation therapy by minimizing side effects while enhancing radiation sensitivity to cancer cells.

DETAILED DESCRIPTION OF INVENTION

Technical Problem

Accordingly, the present inventors have studied to develop a radiation therapy enhancer that can be used together with radiation therapy without side effects while having the effect of enhancing radiation therapy for cancer. As a result, the present inventors have confirmed that a synergistic effect is shown in cancer treatment when treated with a fusion protein dimer comprising an IL-2 protein and a CD80 protein in one molecule in combination with radiation. Based on the above, the present inventors completed the present invention.

Solution to Problem

In order to achieve the above object, in an aspect of the present invention, there is provided a pharmaceutical composition for enhancing radiation therapy for cancer, comprising a fusion protein dimer comprising an IL-2 protein and a CD80 protein.

In another aspect of the present invention, there is provided a method of radiation therapy for cancer, comprising: irradiating radiation to a cancer site of a non-human mammal suffering from cancer; and administering the pharmaceutical composition to the mammal.

Effects of Invention

The composition comprising a fusion protein dimer comprising an IL-2 protein and a CD80 protein according to the present invention may be used in combination with radiation therapy to enhance the effect of radiation therapy. Therefore, the efficiency of radiation therapy may be enhanced even for cancer resistant to radiation.

In addition, by such an action of enhancing radiation therapy, it is possible to obtain an excellent anticancer effect that can be obtained when treated with high-dose radiation in terms of therapeutic efficiency while lowering the dose of radiation therapy. Thus, there is an advantage in that side effects caused by irradiating high-dose radiation during radiation therapy may be reduced.

In addition, it is possible to stimulate systemic immune cells through tumor antigen spreading by radiation therapy. In this regard, since a fusion protein dimer comprising an IL-2 protein and a CD80 protein additionally amplifies the activity of systemic immune cells, the anticancer effect of radiation therapy may be enhanced by the fusion protein dimer.

Therefore, it is expected that the composition comprising a fusion protein dimer comprising an IL-2 protein and a CD80 protein according to the present invention may be used as a radiation therapy adjuvant to be commercialized in the direction of combination therapy. In particular, when radiation is irradiated and the pharmaceutical composition of the present invention is administered, the anticancer effect is excellent even at the site that is not irradiated with radiation, and thus, commercial utility is expected to be high.

BEST MODE FOR CARRYING OUT THE INVENTION

Radiation Therapy Enhancer

Figure 1A:
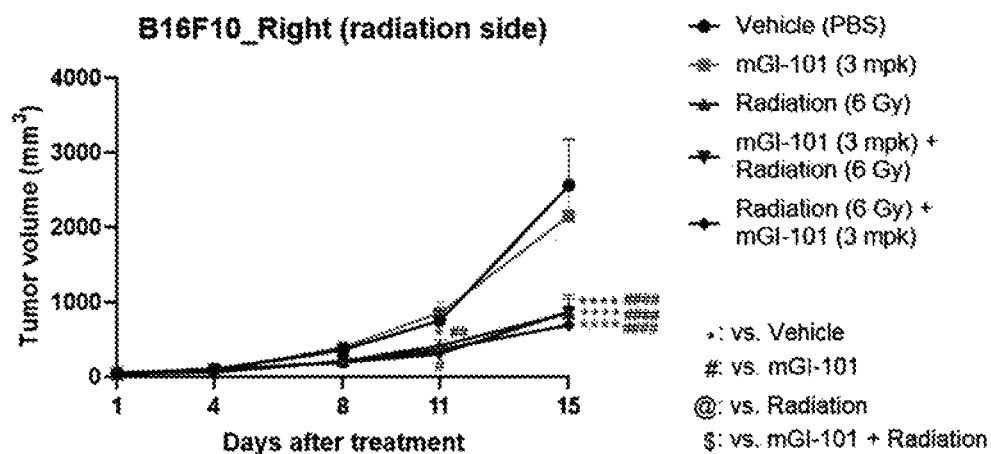
FIGS. 1a to 1c illustrate results obtained by identifying the abscopal effect in which the anticancer effect at a tumor site that is irradiated with radiation and the therapeutic effect at a site that is not irradiated with radiation are shown when mGI-101 of the present invention is administered and/or radiation is irradiated to a mouse having a tumor formed after transplantation of melanoma cell line B16F10. Specifically, they are graphs showing (a) the volume of the right tumor that is irradiated with radiation, (b) the volume of the left tumor that is not irradiated with radiation, and (c) the average volume of both tumors, which are measured using a caliper when mGI-101 of the present invention is administered and/or radiation is irradiated to a mouse having a tumor.
Figure 1B:
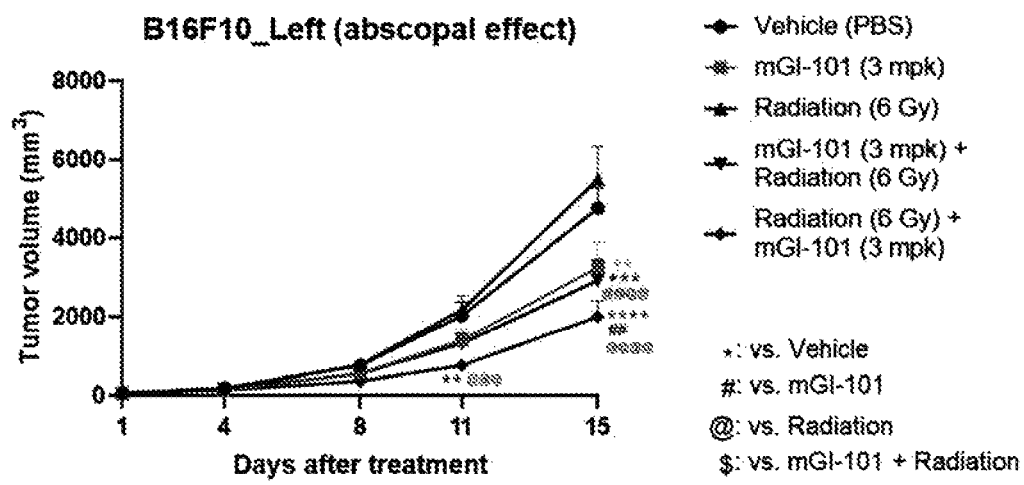

In an aspect of the present invention, there is provided a pharmaceutical composition for enhancing radiation therapy for cancer, comprising a fusion protein dimer comprising an IL-2 protein and a CD80 protein.

In addition, in another aspect of the present invention, there is provided an anticancer adjuvant comprising the fusion protein dimer as an active ingredient.

As used herein, the term "cancer" is classified as a disease in which normal tissue cells proliferate unlimitedly for some reason and continue to develop rapidly regardless of the living phenomenon of the living body or the surrounding tissue state. The cancer in the present invention may be any one cancer selected from the group consisting of various cancers of the human body, such as gastric cancer, liver cancer, lung cancer, colorectal cancer, breast cancer, prostate cancer, ovarian cancer, pancreatic cancer, cervical cancer, thyroid cancer, laryngeal cancer, acute myeloid leukemia, brain tumor, neuroblastoma, retinoblastoma, head and neck cancer, salivary gland cancer, and lymphoma, but is not limited to the above types. In addition, for the purpose of the present invention, it may be a cancer that is resistant to radiation, but is not limited thereto.

As used herein, the term "enhancing radiation therapy" refers to enhancing the sensitivity of cells to radiation in the treatment of diseases using radiation, thereby ultimately enhancing the therapeutic effect on diseases. In particular, when treated in parallel in cancer treatment, the radiation sensitivity of cancer cells may be enhanced, and thus, the effect of killing cancer cells and the inhibitory effect on the proliferation of cancer cells may be shown.

The radiation therapy for cancer includes a variety of known radiotherapy, for example, deep X ray therapy, radium therapy, cobalt-60 mass irradiation, ultra-high pressure radiotherapy, radioactive isotope internal therapy, and the like, but is not limited thereto.

In one embodiment, as a result of treating a mouse having a tumor formed after transplantation of melanoma cell line B16F10 with the fusion protein dimer comprising an IL-2 protein and a CD80 protein of the present invention in combination with radiation therapy, it was confirmed that the fusion protein may be used as a combination or adjuvant for anticancer treatment by more effectively reducing the growth of the tumor (FIGS. 1a to 4c).

The pharmaceutical composition for enhancing radiation therapy of the present invention, comprising a fusion protein comprising an IL-2 protein and a CD80 protein may be applied to any cells to which radiation therapy may be applied, and in particular, it is preferable to use for enhancing the radiation sensitivity of cancer cells.

Since the pharmaceutical composition for enhancing radiation therapy exhibits a synergistic effect in cancer treatment in combination with radiation therapy, it may be used in the same context as an anticancer therapy adjuvant, a radiation therapy adjuvant, a radiation therapy enhancer, or a radiation sensitizer.

As used herein, the term "adjuvant" plays a role in enhancing the effect of an agent, substance, method, and the like having a therapeutic effect, and refers to increasing the anticancer activity through enhancing the anticancer activity of the active ingredient having therapeutic activity or reducing side effects when the pharmaceutical composition for enhancing radiation therapy according to the present invention is administered. Specifically, when used in combination with an anticancer agent or radiation irradiation, which is a conventional cancer treatment method, it may exhibit a synergistic effect on the cancer therapeutic effect, and may enhance the sensitivity of cancer cells to the anticancer agent or radiation irradiation.

In particular, it was confirmed that when the fusion protein dimer is administered during radiation therapy, the abscopal effect, in which cancer at a distal site other than a site that is irradiated with radiation is effectively removed, is increased. Therefore, it was confirmed that the fusion protein dimer is effective in enhancing the anticancer effect of radiation therapy not only at a site that is irradiated with radiation but also at a distal site that is not irradiated with radiation. Thus, it may be used as a combination therapy to enhance the effect of radiation therapy.

The fusion protein comprising an IL-2 protein and a CD80 protein included in the pharmaceutical composition for enhancing radiation therapy is as described below.

Fusion Protein Comprising IL-2 Protein and CD80 Protein

As used herein, the term "IL-2" or "interleukin-2", unless otherwise stated, refers to any wild-type IL-2 obtained from any vertebrate source, including mammals, for example, primates (such as humans) and rodents (such as mice and rats). IL-2 may be obtained from animal cells, and also includes one obtained from recombinant cells capable of producing IL-2. In addition, IL-2 may be wild-type IL-2 or a variant thereof.

In the present specification, IL-2 or a variant thereof may be collectively expressed by the term "IL-2 protein" or "IL-2 polypeptide." IL-2, an IL-2 protein, an IL-2 polypeptide, and an IL-2 variant specifically bind to, for example, an IL-2 receptor. This specific binding may be identified by methods known to those skilled in the art.

An embodiment of IL-2 may have the amino acid sequence of SEQ ID NO: 35 or SEQ ID NO: 36. Here, IL-2 may also be in a mature form. Specifically, the mature IL-2 may not contain a signal sequence, and may have the amino acid sequence of SEQ ID NO: 10. Here, IL-2 may be used under a concept encompassing a fragment of wild-type IL-2 in which a portion of N-terminus or C-terminus of the wild-type IL-2 is truncated.

In addition, the fragment of IL-2 may be in a form in which 1, 2, 3, 4, 5, 6, 7, 8, 9, 10, 11, 12, 13, 14, 15, 16, 17, 18, 19, 20, 21, 22, 23, 24, or 25 contiguous amino acids are truncated from N-terminus of a protein having the amino acid sequence of SEQ ID NO: 35 or SEQ ID NO: 36. In addition, the fragment of IL-2 may be in a form in which 1, 2, 3, 4, 5, 6, 7, 8, 9, 10, 11, 12, 13, 14, 15, 16, 17, 18, 19, 20, 21, 22, 23, 24, or 25 contiguous amino acids are truncated from C-terminus of a protein having the amino acid sequence of SEQ ID NO: 35 or SEQ ID NO: 36.

As used herein, the term "IL-2 variant" refers to a form in which a portion of amino acids in the full-length IL-2 or the above-described fragment of IL-2 is substituted. That is, an IL-2 variant may have an amino acid sequence different from wild-type IL-2 or a fragment thereof. However, an IL-2 variant may have activity equivalent or similar to the wild-type IL-2. Here, "IL-2 activity" may, for example, refer to specific binding to an IL-2 receptor, which specific binding may be measured by methods known to those skilled in the art.

Specifically, an IL-2 variant may be obtained by substitution of a portion of amino acids in the wild-type IL-2. An embodiment of the IL-2 variant obtained by amino acid substitution may be obtained by substitution of at least one of the 38th, $42^{nd}$, $45^{th}$, $61^{st}$, and $72^{nd}$ amino acids in the amino acid sequence of SEQ ID NO: 10.

Specifically, the IL-2 variant may be obtained by substitution of at least one of the $38^{th}$, $42^{nd}$, $45^{th}$, $61^{st}$, or $72^{nd}$ amino acid in the amino acid sequence of SEQ ID NO: 10 with another amino acid. In addition, when IL-2 is in a form in which a portion of N-terminus in the amino acid sequence of SEQ ID NO: 35 is truncated, the amino acid at a position complementarily corresponding to that in the amino acid sequence of SEQ ID NO: 10 may be substituted with another amino acid. For example, when IL-2 has the amino acid sequence of SEQ ID NO: 35, its IL-2 variant may be obtained by substitution of at least one of 58th, $62^{nd}$, $65^{th}$, $81^{st}$ or $92^{nd}$ amino acid in the amino acid sequence of SEQ ID NO: 35 with another amino acid. These amino acid residues correspond to the 38th, $42^{nd}$, 45th, $61^{st}$, and $72^{nd}$ amino acid residues in the amino acid sequence of SEQ ID NO: 10, respectively. According to an embodiment, one, two, three, four, five, six, seven, eight, nine, or ten amino acids may be substituted as long as such IL-2 variant maintains IL-2 activity. According to another embodiment, one to five amino acids may be substituted.

In an embodiment, an IL-2 variant may be in a form in which two amino acids are substituted. Specifically, the IL-2 variant may be obtained by substitution of the $38^{th}$ and $42^{nd}$ amino acids in the amino acid sequence of SEQ ID NO: 10. In addition, in an embodiment, the IL-2 variant may be obtained by substitution of the $38^{th}$ and $45^{th}$ amino acids in the amino acid sequence of SEQ ID NO: 10. In addition, in an embodiment, the IL-2 variant may be obtained by substitution of the $38^{th}$ and $61^{st}$ amino acids in the amino acid sequence of SEQ ID NO: 10. In addition, in an embodiment, the IL-2 variant may be obtained by substitution of the $38^{th}$ and $72^{nd}$ amino acids in the amino acid sequence of SEQ ID NO: 10. In addition, in an embodiment, the IL-2 variant may be obtained by substitution of the $42^{nd}$ and $45^{th}$ amino acids in the amino acid sequence of SEQ ID NO: 10. In addition, in an embodiment, the IL-2 variant may be obtained by substitution of the $42^{nd}$ and $61^{st}$ amino acids in the amino acid sequence of SEQ ID NO: 10. In addition, in an embodiment, the IL-2 variant may be obtained by substitution of the $42^{nd}$ and $72^{nd}$ amino acids in the amino acid sequence of SEQ ID NO: 10. In addition, in an embodiment, the IL-2 variant may be obtained by substitution of the $45^{th}$ and $61^{st}$ amino acids in the amino acid sequence of SEQ ID NO: 10. In addition, in an embodiment, the IL-2 variant may be obtained by substitution of the $45^{th}$ and $72^{nd}$ amino acids in the amino acid sequence of SEQ ID NO: 10. In addition, in an embodiment, the IL-2 variant may be obtained by substitution of the $61^{st}$ and $72^{nd}$ amino acids in the amino acid sequence of SEQ ID NO: 10.

Furthermore, an IL-2 variant may be in a form in which three amino acids are substituted. Specifically, the IL-2 variant may be obtained by substitution of the 38th, $42^{nd}$, and $45^{th}$ amino acids in the amino acid sequence of SEQ ID NO: 10. In addition, in an embodiment, the IL-2 variant may be obtained by substitution of the 38th, $42^{nd}$, and $61^{st}$ amino acids in the amino acid sequence of SEQ ID NO: 10. In addition, in an embodiment, the IL-2 variant may be obtained by substitution of the $38^{th}$, $42^{nd}$, and $72^{nd}$ amino acids in the amino acid sequence of SEQ ID NO: 10. In addition, in an embodiment, the IL-2 variant may be obtained by substitution of the 38th, $45^{th}$, and $61^{st}$ amino acids in the amino acid sequence of SEQ ID NO: 10. In addition, in an embodiment, the IL-2 variant may be obtained by substitution of the $38^{th}$, $45^{th}$, and $72^{nd}$ amino acids in the amino acid sequence of SEQ ID NO: 10. In addition, in an embodiment, the IL-2 variant may be obtained by substitution of the $38^{th}$, $61^{st}$, and $72^{nd}$ amino acids in the amino acid sequence of SEQ ID NO: 10. In addition, in an embodiment, the IL-2 variant may be obtained by substitution of the $42^{nd}$, $45^{th}$ and $61^{st}$ amino acids in the amino acid sequence of SEQ ID NO: 10. In addition, in an embodiment, the IL-2 variant may be obtained by substitution of the $42^{nd}$, 45th, and $72^{nd}$ amino acids in the amino acid sequence of SEQ ID NO: 10. In addition, in an embodiment, the IL-2 variant may be obtained by substitution of the 45th, $61^{st}$, and $72^{nd}$ amino acids in the amino acid sequence of SEQ ID NO: 10.

In addition, an IL-2 variant may be in a form in which four amino acids are substituted. Specifically, the IL-2 variant may be obtained by substitution of the 38th, $42^{nd}$, 45th, and $61^{st}$ amino acids in the amino acid sequence of SEQ ID NO: 10. In addition, in an embodiment, the IL-2 variant may be obtained by substitution of the $38^{th}$, $42^{nd}$ 45th, and $72^{nd}$ amino acids in the amino acid sequence of SEQ ID NO: 10. In addition, in an embodiment, the IL-2 variant may be obtained by substitution of the $38^{th}$, $45^{th}$, $61^{st}$, and $72^{nd}$ amino acids in the amino acid sequence of SEQ ID NO: 10. In addition, in an embodiment, the IL-2 variant may be obtained by substitution of the $38^{th}$, $42^{nd}$, $61^{st}$, and $72^{nd}$ amino acids in the amino acid sequence of SEQ ID NO: 10. In addition, in an embodiment, the IL-2 variant may be obtained by substitution of $42^{nd}$, $45^{th}$, $61^{st}$ and $72^{nd}$ amino acids in the amino acid sequence of SEQ ID NO: 10.

Furthermore, an IL-2 variant may be in a form in which five amino acids are substituted. Specifically, the IL-2 variant may be obtained by substitution of each of the $38^{th}$, $42^{nd}$ $45^{th}$, $61^{st}$, and $72^{nd}$ amino acids in the amino acid sequence of SEQ ID NO: 10 with another amino acid.

Here, the "another amino acid" introduced by the substitution may be any one selected from the group consisting of alanine, arginine, asparagine, aspartic acid, cysteine, glutamic acid, glutamine, histidine, isoleucine, leucine, lysine, methionine, phenylalanine, proline, serine, threonine, tryptophan, tyrosine, and valine. However, regarding amino acid substitution for the IL-2 variant, in the amino acid sequence of SEQ ID NO: 10, the 38$^{th}$ amino acid cannot be substituted with arginine, the 42$^{nd}$ amino acid cannot be substituted with phenylalanine, the 45th amino acid cannot be substituted with tyrosine, the 61$^{st}$ amino acid cannot be substituted with glutamic acid, and the 72$^{nd}$ amino acid cannot be substituted with leucine.

Regarding amino acid substitution for an IL-2 variant, in the amino acid sequence of SEQ ID NO: 10, the 38$^{th}$ amino acid, arginine, may be substituted with an amino acid other than arginine. Preferably, regarding amino acid substitution for an IL-2 variant, in the amino acid sequence of SEQ ID NO: 10, the 38$^{th}$ amino acid, arginine, may be substituted with alanine (R38A).

Regarding amino acid substitution for an IL-2 variant, in the amino acid sequence of SEQ ID NO: 10, the 42$^{nd}$ amino acid, phenylalanine, may be substituted with an amino acid other than phenylalanine. Preferably, regarding amino acid substitution for an IL-2 variant, in the amino acid sequence of SEQ ID NO: 10, the 42$^{nd}$ amino acid, phenylalanine, may be substituted with alanine (F42A).

Regarding amino acid substitution for an IL-2 variant, in the amino acid sequence of SEQ ID NO: 10, the 45$^{th}$ amino acid, tyrosine, may be substituted with an amino acid other than tyrosine. Preferably, regarding amino acid substitution for an IL-2 variant, in the amino acid sequence of SEQ ID NO: 10, the 45$^{th}$ amino acid, tyrosine, may be substituted with alanine (Y45A).

Regarding amino acid substitution for an IL-2 variant, in the amino acid sequence of SEQ ID NO: 10, the 61$^{st}$ amino acid, glutamic acid, may be substituted with an amino acid other than glutamic acid. Preferably, regarding amino acid substitution for an IL-2 variant, in the amino acid sequence of SEQ ID NO: 10, the 61$^{st}$ amino acid, glutamic acid, may be substituted with arginine (E61R).

Regarding amino acid substitution for an IL-2 variant, in the amino acid sequence of SEQ ID NO: 10, the 72$^{nd}$ amino acid, leucine, may be substituted with an amino acid other than leucine. Preferably, regarding amino acid substitution for an IL-2 variant, in the amino acid sequence of SEQ ID NO: 10, the 72$^{nd}$ amino acid, leucine, may be substituted with glycine (L72G).

Specifically, an IL-2 variant may be obtained by at least one substitution selected from the group consisting of R38A, F42A, Y45A, E61R, and L72G, in the amino acid sequence of SEQ ID NO: 10.

Specifically, an IL-2 variant may be obtained by amino acid substitutions at two, three, four, or five positions among the positions selected from the group consisting of R38A, F42A, Y45A, E61R, and L72G.

In addition, an IL-2 variant may be in a form in which two amino acids are substituted. Specifically, an IL-2 variant may be obtained by the substitutions, R38A and F42A. In addition, in an embodiment, an IL-2 variant may be obtained by the substitutions, R38A and Y45A. In addition, in an embodiment, an IL-2 variant may be obtained by the substitutions, R38A and E61R. In addition, in an embodiment, an IL-2 variant may be obtained by the substitutions, R38A and L72G. In addition, in an embodiment, an IL-2 variant may be obtained by the substitutions, F42A and Y45A. In addition, in an embodiment, an IL-2 variant may be obtained by the substitutions, F42A and E61R. In addition, in an embodiment, an IL-2 variant may be obtained by the substitutions, F42A and L72G. In addition, in an embodiment, an IL-2 variant may be obtained by the substitutions, E61R and L72G.

Furthermore, an IL-2 variant may be in a form in which three amino acids are substituted. Specifically, an IL-2 variant may be obtained by the substitutions, R38A, F42A, and Y45A. In addition, in an embodiment, an IL-2 variant may be obtained by the substitutions, R38A, F42A, and E61R. In addition, in an embodiment, an IL-2 variant may be obtained by the substitutions, R38A, F42A, and L72G. In addition, in an embodiment, an IL-2 variant may be obtained by the substitutions, R38A, Y45A, and E61R. In addition, in an embodiment, an IL-2 variant may be obtained by the substitutions, R38A, Y45A, and L72G. In addition, in an embodiment, an IL-2 variant may be obtained by the substitutions, F42A, Y45A, and E61R. In addition, in an embodiment, an IL-2 variant may be obtained by the substitutions, F42A, Y45A, and L72G. In addition, in an embodiment, an IL-2 variant may be obtained by the substitutions, F42A, E61R, and L72G. In addition, in an embodiment, an IL-2 variant may be obtained by the substitutions, Y45A, E61R, and L72G.

In addition, an IL-2 variant may be in a form in which four amino acids are substituted. Specifically, an IL-2 variant may be obtained by the substitutions, R38A, F42A, Y45A, and E61R. In addition, in an embodiment, an IL-2 variant may be obtained by the substitutions, R38A, F42A, Y45A, and L72G. In addition, in an embodiment, an IL-2 variant may be obtained by the substitutions, R38A, F42A, E61R, and L72G. In addition, in an embodiment, an IL-2 variant may be obtained by the substitutions, R38A, Y45A, E61R, and L72G. In addition, in an embodiment, an IL-2 variant may be obtained by the substitutions, F42A, Y45A, E61R, and L72G.

Furthermore, an IL-2 variant may be obtained by the substitutions, R38A, F42A, Y45A, E61R, and L72G.

Preferably, an embodiment of the IL-2 variant may contain which are any one selected from the following substitution combinations (a) to (d) in the amino acid sequence of SEQ ID NO: 10:

(a) R38A/F42A;
(b) R38A/F42A/Y45A;
(c) R38A/F42A/E61R; or
(d) R38A/F42A/L72G.

Here, when IL-2 has the amino acid sequence of SEQ ID NO: 35, an amino acid substitution may be present at a position complementarily corresponding to that in the amino acid sequence of SEQ ID NO: 10. In addition, even when IL-2 is a fragment of the amino acid sequence of SEQ ID NO: 35, an amino acid substitution may be present at a position complementarily corresponding to that in the amino acid sequence of SEQ ID NO: 10.

Specifically, an IL-2 variant may have the amino acid sequence of SEQ ID NO: 6, 22, 23, or 24.

In addition, an IL-2 variant may be characterized by having low in vivo toxicity. Here, the low in vivo toxicity may be a side effect caused by binding of IL-2 to the IL-2 receptor alpha chain (IL-2Rα). Various IL-2 variants have been developed to ameliorate the side effect caused by binding of IL-2 to IL-2Ra, and such IL-2 variants may be those disclosed in U.S. Pat. No. 5,229,109 and Korean Patent No. 1667096. In particular, IL-2 variants described in the present application have low binding ability for the IL-2 receptor alpha chain (IL-2Ra) and thus have lower in vivo toxicity than the wild-type IL-2.

As used herein, the term "CD80", also called "B7-1", is a membrane protein present in dendritic cells, activated B cells, and monocytes. CD80 provides co-stimulatory signals essential for activation and survival of T cells. CD80 is known as a ligand for the two different proteins, CD28 and CTLA-4, present on the surface of T cells. CD80 is composed of 288 amino acids, and may specifically have the amino acid sequence of SEQ ID NO: 11. In addition, as used herein, the term "CD80 protein" refers to the full-length CD80 or a CD80 fragment.

As used herein, the term "CD80 fragment" refers to a cleaved form of CD80. In addition, the CD80 fragment may be an extracellular domain of CD80. An embodiment of the CD80 fragment may be obtained by elimination of the 1" to 34$^{th}$ amino acids from N-terminus which are a signal sequence of CD80. Specifically, an embodiment of the CD80 fragment may be a protein composed of the 35$^{th}$ to 288$^{th}$ amino acids in SEQ ID NO: 11. In addition, an embodiment of the CD80 fragment may be a protein composed of the 35$^{th}$ to 242$^{nd}$ amino acids in SEQ ID NO: 11. In addition, an embodiment of the CD80 fragment may be a protein composed of the 35$^{th}$ to 232$^{nd}$ amino acids in SEQ ID NO: 11. In addition, an embodiment of the CD80 fragment may be a protein composed of the 35$^{th}$ to 139$^{th}$ amino acids in SEQ ID NO: 11. In addition, an embodiment of the CD80 fragment may be a protein composed of the 142$^{nd}$ to 242$^{nd}$ amino acids in SEQ ID NO: 11. In an embodiment, a CD80 fragment may have the amino acid sequence of SEQ ID NO: 2.

In addition, the IL-2 protein and the CD80 protein may be attached to each other via a linker or a carrier. Specifically, the IL-2 or a variant thereof and the CD80 (B7-1) or a fragment thereof may be attached to each other via a linker or a carrier. In the present description, the linker and the carrier may be used interchangeably.

The linker links two proteins. An embodiment of the linker may include 1 to 50 amino acids, albumin or a fragment thereof, an Fc domain of an immunoglobulin, or the like. Here, the Fc domain of immunoglobulin refers to a protein that contains heavy chain constant region 2 (CH2) and heavy chain constant region 3 (CH3) of an immunoglobulin, but does not contain heavy and light chain variable regions and light chain constant region 1 (CH1) of an immunoglobulin. The immunoglobulin may be IgG, IgA, IgE, IgD, or IgM, and may preferably be IgG4. Here, Fc domain of wild-type immunoglobulin G4 may have the amino acid sequence of SEQ ID NO: 4.

In addition, the Fc domain of an immunoglobulin may be an Fc domain variant as well as wild-type Fc domain. In addition, as used herein, the term "Fc domain variant" may refer to a form which is different from the wild-type Fc domain in terms of glycosylation pattern, has a high glycosylation as compared with the wild-type Fc domain, or has a low glycosylation as compared with the wild-type Fc domain, or a deglycosylated form. In addition, an aglycosylated Fc domain is included therein. The Fc domain or a variant thereof may be adapted to have an adjusted number of sialic acids, fucosylations, or glycosylations, through culture conditions or genetic manipulation of a host.

In addition, glycosylation of the Fc domain of an immunoglobulin may be modified by conventional methods such as chemical methods, enzymatic methods, and genetic engineering methods using microorganisms. In addition, the Fc domain variant may be in a mixed form of respective Fc regions of immunoglobulins, IgG, IgA, IgE, IgD, and IgM. In addition, the Fc domain variant may be in a form in which some amino acids of the Fc domain are substituted with other amino acids. An embodiment of the Fc domain variant may have the amino acid sequence of SEQ ID NO: 12.

The fusion protein may have a structure in which, using an Fc domain as a linker (or carrier), a CD80 protein and an IL-2 protein, or an IL-2 protein and a CD80 protein are linked to N-terminus and C-terminus of the linker or carrier, respectively. Linkage between N-terminus or C-terminus of the Fc domain and CD-80 or IL-2 may optionally be achieved by a linker peptide.

Specifically, a fusion protein may consist of the following structural formula (I) or (II):

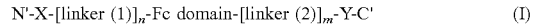

N'-X-[linker (1)]$_n$-Fc domain-[linker (2)]$_m$-Y-C'    (I)

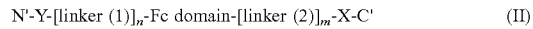

N'-Y-[linker (1)]$_n$-Fc domain-[linker (2)]$_m$-X-C'    (II)

Here, in the structural formulas (I) and (II),
N' is the N-terminus of the fusion protein,
C' is the C-terminus of the fusion protein,
X is the CD80 protein,
Y is the IL-2 protein,
the linkers (1) and (2) are peptide linkers, and
n and m are each independently 0 or 1.

Preferably, the fusion protein may consist of the structural formula (I). The IL-2 protein is as described above. In addition, the CD80 protein is as described above. According to an embodiment, the IL-2 protein may be an IL-2 variant with one to five amino acid substitutions as compared with the wild-type IL-2. The CD80 protein may be a fragment obtained by truncation of up to about 34 contiguous amino acid residues from the N-terminus or C-terminus of the wild-type CD80. Alternatively, the CD protein may be an extracellular immunoglobulin-like domain having the activity of binding to the T cell surface receptors CTLA-4 and CD28.

Specifically, the fusion protein may have the amino acid sequence of SEQ ID NO: 9, 26, 28, or 30. According to another embodiment, the fusion protein includes a polypeptide having a sequence identity of 85%, 86%, 87%, 88%, 89%, 90%, 91%, 92%, 93%, 94%, 95%, 96%, 97%, 98%, 99%, or 100% to the amino acid sequence of SEQ ID NO: 9, 26, 28, or 30. Here, the identity is, for example, percent homology, and may be determined through homology comparison software such as BlastN software of the National Center of Biotechnology Information (NCBI).

The peptide linker (1) may be included between the CD80 protein and the Fc domain. The peptide linker (1) may consist of 5 to 80 contiguous amino acids, 20 to 60 contiguous amino acids, 25 to 50 contiguous amino acids, or 30 to 40 contiguous amino acids. In an embodiment, the peptide linker (1) may consist of 30 amino acids. In addition, the peptide linker (1) may contain at least one cysteine. Specifically, the peptide linker (1) may contain one, two, or three cysteines. In addition, the peptide linker (1) may be derived from the hinge of an immunoglobulin. In an embodiment, the peptide linker (1) may be a peptide linker consisting of the amino acid sequence of SEQ ID NO: 3.

The peptide linker (2) may consist of 1 to 50 contiguous amino acids, 3 to 30 contiguous amino acids, or 5 to 15 contiguous amino acids. In an embodiment, the peptide linker (2) may be (G4S)$_n$ (where n is an integer of 1 to 10). Here, in (G4S)$_n$, n may be 1, 2, 3, 4, 5, 6, 7, 8, 9, or 10. In an embodiment, the peptide linker (2) may be a peptide linker consisting of the amino acid sequence of SEQ ID NO: 5.

In another aspect of the present invention, there is provided a dimer obtained by binding of two fusion proteins, each of which comprises an IL-2 protein or a variant thereof, and a CD80 protein or a fragment thereof. The fusion protein comprising IL-2 or a variant thereof, and CD80 or a fragment thereof is as described above.

Here, the binding between the fusion proteins constituting the dimer may be achieved by, but is not limited to, a disulfide bond formed by cysteines present in the linker. The fusion proteins constituting the dimer may be the same or different fusion proteins from each other. Preferably, the dimer may be a homodimer. An embodiment of the fusion protein constituting the dimer may be a protein having the amino acid sequence of SEQ ID NO: 9.

The pharmaceutical composition for enhancing radiation therapy of the present invention, comprising the fusion protein comprising an IL-2 protein and a CD80 protein, may be additionally administered in combination with other anticancer agents, thereby further enhancing the effect of radiation therapy on cancer.

The anticancer agent may be a chemotherapeutic anticancer agent, a target anticancer agent, or an immune anticancer agent.

Specifically, the "chemotherapeutic anticancer agent" may be an alkylating agent, a microtuble inhibitor, an antimetabolite, or a topoisomerase inhibitor, but is not limited thereto.

The alkylating agent may be mechlorethamine, cyclophosphamide, ifosfamide, melphalan, chlorambucil, thiotepa, altretamine, procarbazine, busulfan, streptozocin, carmustine, iomustine, dacarbazine, cisplatin, carboplatin, or oxaliplatin, but is not limited thereto. The microtuble inhibitor may be docetaxel, vinblastine, oncovin, or vinorelbine, but is not limited thereto. The antimetabolite may be fluorouracil, capecitabine, cytarabine, gemcitabine, fludarabine, methotrexate, pemetrexed, or mercaptopurine, but is not limited thereto. The topoisomerase inhibitor may be hycamtin, camptosar, vepesid, taxol, bleomycin, adriamycin, or cerubidine, but is not limited thereto.

In addition, the "target anticancer agent" may be trastuzumab, pertuzumab, panitumumab, cetuximab, bevacizumab, ramucirumab, aflibercept, rituximab, obinutuzumab, daratumumab, denosumab, ibrutinib, dasatinib, nilotinib, imatinib, bosutinib, osimertinib, erlotinib, gefitinib, nintedanib, sunitinib, sorafenib, cabozantinib, lenvatinib, regorafenib, axitinib, pazopanib, cabozantinib, trametinib, dabrafenib, abemaciclib, palbociclib, lenalidomide, ruxolitinib, alectinib, crizotinib, olaparib, or venetoclax, but is not limited thereto.

In addition, the "immune anticancer agent" may be an immune checkpoint inhibitor, an immune cell therapeutic agent (ex, CAR-T), an antibody drug conjugate (ADC), a bispecific antibody, an anticancer virus, or an anticancer vaccine, but is not limited thereto.

The "immune checkpoint inhibitor" may be an anti-PD-1 antibody, an anti-PD-L1 antibody, an anti-CTLA-4 antibody, an anti-TIM3 antibody, or an anti-LAG3 antibody. The anti-PD-1 antibody may be pembrolizumab, nivolumab, or cemiplimab; and the anti-PD-L1 antibody may be atezolizumab, avelumab, or durvalumab, but is not limited thereto. The anti-CTLA-4 antibody may be ipilimumab or tremelimumab; the anti-TIM3 antibody may be MBG452; and the anti-LAG3 antibody may be BMS-986016 or LAG525, but is not limited thereto. The immune cell therapeutic agent may be tisagenlecleucel or axicabtagene ciloleucel, but is not limited thereto. The ADC may be gemtuzumab ozogamicin, brentuximab vedotin, trastuzumab emtansine, inotuzumab ozogamicin, or eribulin mesylate, but is not limited thereto. The bispecific antibody may be blinatumomab, and the anticancer virus may be talimogene laherparepvec, and the anticancer vaccine may be sipuleucel-T, but is not limited thereto.

The pharmaceutical composition of the present invention may further comprise a pharmaceutically acceptable carrier. The pharmaceutically acceptable carrier may be any non-toxic substance appropriate for delivery to a patient. Distilled water, alcohol, fats, waxes, and inert solids may be included as carriers. In addition, a pharmacologically acceptable adjuvant (buffering agent, dispersing agent) may be included in the pharmaceutical composition.

Specifically, the pharmaceutical composition may be prepared as a parenteral formulation according to the route of administration by a conventional method known in the art including a pharmaceutically acceptable carrier. Here, "pharmaceutically acceptable" means that it does not inhibit the activity of the active ingredient and does not have toxicity beyond what the application (prescription) target may adapt.

When the pharmaceutical composition is prepared as a parenteral formulation, it may be formulated in the form of an injection, a transdermal preparation, a nasal inhalant, and a suppository together with a suitable carrier according to methods known in the art. When formulated as an injection, sterile water, ethanol, polyol such as glycerol or propylene glycol, or a mixture thereof may be used as a suitable carrier, and preferably, Ringer's solution, PBS (phosphate buffered saline) containing triethanolamine, or sterile water for injection, an isotonic solution such as 5% dextrose, and the like may be used. Formulation of the pharmaceutical composition is known in the art, and specifically, reference may be made to the literature [Remington's Pharmaceutical Sciences ($19^{th}$ ed., 1995)] and the like. The literature is considered a part of the present specification.

On the other hand, the pharmaceutical composition of the present invention is administered in a pharmaceutically effective amount. As used herein, the term "administration" refers to introducing a predetermined substance to a subject by an appropriate method, and the route of administration of the composition may be through any general route as long as it may reach a target tissue. It may be intraperitoneal administration, intravenous administration, intramuscular administration, subcutaneous administration, intradermal administration, oral administration, topical administration, intranasal administration, intrapulmonary administration, or intrarectal administration, but is not limited thereto.

The term "subject" refers to all animals including a human, a rat, a mouse, a livestock, and the like. Preferably, it may be a mammal including a human.

The term "pharmaceutically effective amount" refers to an amount that is sufficient to treat a disease with a reasonable benefit/risk ratio applicable to medical treatment and does not cause side effects, and the effective dose level may be readily determined by one of ordinary skill in the art according to factors including the sex, age, body weight, and health condition of the patient, the type and severity of the disease, the activity of the drug, the sensitivity to the drug, the administration method, the administration time, the route of administration, the excretion rate, the duration of treatment, drugs used in combination or concurrently, and other factors well known in the medical field. The daily dose may be in the range of 0.01 µg/kg to 10 g/kg, or in the range of 0.01 mg/kg to 1 g/kg. Administration may be performed once a day or several times a day. Such dosages should not be construed as limiting the scope of the present invention in any aspect.

Method of Radiation Therapy

In another aspect of the present invention, there is provided a method of radiation therapy for cancer, comprising: irradiating radiation to a cancer site of a non-human mammal suffering from cancer; and administering the pharmaceutical composition for enhancing radiation therapy according to the present invention to the mammal.

As used herein, the term "radiation irradiation" refers to a topical treatment method that damages DNA of malignant cells by irradiating radiation. Normal cells have a greater capacity to repair this damage than tumor cells. Radiation irradiation refers to a treatment using such a difference, and includes a method of treatment using radiation in a conventional sense.

The radiation irradiation may be classified into radical radiation therapy, adjuvant radiation therapy, and palliative radiation therapy depending on the radiation therapy. Radical radiation therapy refers to radiation therapy for the complete recovery when the tumor is limited to a relatively local site and there is no distant metastasis. Adjuvant radiation therapy refers to radiation therapy performed for preventing local recurrence after surgical operation. When used in combination with radiation therapy, it is possible to not only reduce recurrence, but also reduce the range of surgery to maintain the function of the tissue. Palliative radiation therapy refers to radiation therapy performed for relieving symptoms caused by cancer. Radiation is a therapy that kills cancer cells using high energy radiation. However, since it affects not only cancer cells but also normal tissues around them, side effects may occur due to the therapy. Examples include changes in skin, hair loss, nausea and vomiting, diarrhea, mucositis/esophagitis, dry mouth, changes in reproductive function, and the like.

The radiation may be singly or fractionally irradiated in an irradiation amount of 0.1 Gy to 100 Gy. Specifically, radiation irradiation amount may be 0.1 Gy to 100 Gy, 0.5 Gy to 90 Gy, 0.7 Gy to 80 Gy, and 0.9 Gy to 70 Gy, and preferably 1 Gy to 60 Gy, but is not limited thereto. In addition, the radiation may be irradiated for a period of 1 to 26 weeks, but is not limited thereto.

The pharmaceutical composition for enhancing radiation therapy according to the present invention may be administered in combination with radiation irradiation during the treatment of cancer in order to obtain the effect of enhancing radiation therapy for cancer, and "administered in combination with" means that radiation is irradiated together during the anticancer therapy of the treatment of various types of cancer cells.

As used herein, the term "treatment" may be used in the sense of including both therapeutic treatment and prophylactic treatment. In this regard, prevention may be used in the sense of relieving or reducing a pathological condition or disease of a subject. In addition, "treatment" includes any form of administration or application for treating a disease in a mammal including a human. The term includes the meaning of inhibiting or slowing the disease or the progression of the disease; restoring or repairing damaged or missing function, thereby partially or completely relieving the disease; or stimulating an inefficient process; or relieving a serious disease.

In one embodiment, the term "treatment" may include, without limitation, any action that improves or benefits cancer symptoms by irradiating radiation.

In one embodiment, the term "prevention" may include, without limitation, any action that blocks cancer symptoms or inhibits or delays cancer symptoms using the pharmaceutical composition of the present invention.

In one embodiment, when irradiating radiation before and after administration of the pharmaceutical composition for enhancing radiation therapy of the present invention, the effect of radiation therapy may be significantly enhanced according to a synergistic effect. Furthermore, resistance to anticancer agents, or metastasis or recurrence of cancer may be prevented.

As long as the effects of the pharmaceutical composition according to the present invention and radiation irradiation are within a range having an interaction with each other, the pharmaceutical composition may be administered with a time gap before or after radiation irradiation.

The administration duration of the pharmaceutical composition may be appropriately increased or decreased depending on the type of cancer, the degree of cancer progression, the route of administration, sex, age, body weight, and the like. In addition, before or after radiation irradiation, as well as daily doses may be regularly administered or large doses may be intensively administered in a short period of time. Specifically, the pharmaceutical composition may be administered once to 20 times, once to 18 times, once to 15 times, once to 10 times, once to 8 times, once to 5 times, or twice to 3 times a week, but is not limited thereto.

On the other hand, the pharmaceutical composition may be administered before or after 6 to 48 hours, before or after 10 to 42 hours, before or after 14 to 36 hours, or before or after 18 to 30 hours, and preferably before or after 20 to 28 hours, based on the time of radiation irradiation, but is not limited thereto.

The route of administration of the composition of the present invention may be through various routes, either oral or parenteral, as long as it may reach a target tissue. Specifically, it may be administered in a conventional manner via oral, rectal, topical, intravenous, intraperitoneal, intramuscular, intraarterial, transdermal, intranasal, inhalation, intraocular, or intradermal route.

The method of radiation therapy for cancer of the present invention includes administering a therapeutically effective amount of the pharmaceutical composition for enhancing radiation therapy according to the present invention. The therapeutically effective amount refers to an amount that effectively enhances the sensitivity of a tumor in cancer cells to radiation. It is apparent to one of ordinary skill in the art that a suitable total daily amount may be determined by an attending physician within the scope of sound medical judgment. It is preferable to apply a therapeutically effective amount specific for a particular patient differently depending on various factors including the type and extent of the response to be achieved, the specific composition, including whether or not other agents are optionally used, the age, body weight, general health condition, sex and diet of the patient, the administration time, the route of administration, and secretion rate of the composition, the duration of treatment, and the radiation amount to be irradiated, and similar factors well known in the pharmaceutical field. Therefore, it is preferable to determine the effective amount of the pharmaceutical composition for enhancing radiation therapy suitable for the purpose of the present invention in consideration of the foregoing. In addition, in some cases, by administering a known anticancer agent together with the pharmaceutical composition for enhancing radiation therapy of the present invention, the anticancer effect including the effect of radiation therapy may be enhanced.

In addition, the method of radiation therapy of the present invention is applicable to any animal having radiation resistance capable of being increased. The animal includes a human and a primate, as well as a domestic animal such as a cattle, a pig, a sheep, a horse, a dog, and a cat. In addition, the method of radiation therapy of the present invention may be used to treat all cancers having increased radiation resistance. Preferably, it may be used for the treatment of cancer such as gastric cancer, liver cancer, lung cancer, colorectal cancer, breast cancer, prostate cancer, ovarian cancer, pancreatic cancer, cervical cancer, thyroid cancer, laryngeal cancer, acute myeloid leukemia, brain tumor, neuroblastoma, retinoblastoma, head and neck cancer, salivary gland cancer, and lymphoma, but is not limited thereto.

The method of radiation therapy of the present invention comprises: administering the composition of the present invention to a subject having cancer cells or a subject suffering from cancer; and irradiating radiation, wherein the radiation irradiation may refer to ionizing radiation, in particular, gamma radiation emitted by a commonly used linear accelerator or a radionuclide. When radiation is irradiated, the living body causes ionization phenomenon, which causes chemical denaturation of nucleic acids, cell membranes, and the like, essential for the proliferation and survival of the cells, resulting in the death of cancer cells. The radiation irradiation by radionuclides may be done externally or internally, and the amount of the anticancer agent administered, the radiation irradiation amount, and the intermittency of the radiation irradiation amount may vary depending on a series of factors such as the type and location of the tumor, and patient's response to chemotherapy or radiation therapy.

In addition, the method of radiation therapy of the present invention may include brachytherapy, radionuclide therapy, external beam radiation therapy, hyperthermia (including cryoablation therapy and thermotherapy), radiosurgery, charged-particle radiotherapy, neutron radiation therapy, photodynamic therapy, and the like.

MODE FOR CARRYING OUT THE INVENTION

Hereinafter, the present invention will be described in more detail by way of the following examples. These examples are only for illustrating the present invention, and it will be apparent to one of ordinary skill in the art that the scope of the present invention is not to be construed as being limited by these examples.

Manufacturing Example 1. Manufacturing of Test Substance

Manufacturing Example 1.1. Manufacturing of hCD80-Fc-IL-2 Variant (2M): GI-101

In order to produce a fusion protein comprising a human CD80 fragment, an Fc domain, and an IL-2 variant, a dimer comprising a fusion protein of SEQ ID NO: 9 that contains a CD80 fragment (SEQ ID NO: 2), an Ig hinge (SEQ ID NO: 3), an Fc domain (SEQ ID NO: 4), a linker (SEQ ID NO: 5), and an IL-2 variant (2M) (R38A, F42A) having two amino acid substitutions (SEQ ID NO: 6), in this order, from the N-terminus was prepared. A specific preparation method was performed by the method described in Korean Patent Application Publication No. 10-2020-0032009A. In addition, the fusion protein dimer was designated "GI-101."

Manufacturing Example 1.2. Manufacturing of mCD80-Fc-IL-2 Variant (2M): mGI-101

In order to produce a fusion protein comprising a mouse CD80, an Fc domain, and an IL-2 variant, a dimer comprising a fusion protein of SEQ ID NO: 38 that contains a mCD80 fragment (SEQ ID NO: 13), an Ig hinge (SEQ ID NO: 3), an Fc domain (SEQ ID NO: 4), a linker (SEQ ID NO: 5), and an IL-2 variant (2M) (R38A, F42A) having two amino acid substitutions (SEQ ID NO: 6), in this order, from the N-terminus was prepared. The fusion protein dimer was designated "mGI-101."

Manufacturing Example 1.3. Manufacturing of Test Substance: mGI-101

The test substance in a frozen state was completely thawed at room temperature and then prepared according to the dosage and volume using PBS as a vehicle. After mixing the test substance and PBS, it was administered after gentle hand agitation without vortexing or pipetting. The thawed test substance was continuously stored in refrigeration until administration.

Preparation Example 1. Preparation of Mouse Tumor Model

Preparation Example 1.1. Preparation of Tumor Cell Line

The B16F10 cell line, a mouse melanoma cell line, was purchased from the Korea Cell Line Bank and cultured in Dulbecco's modified MEM medium containing 10% fetal bovine serum (FBS) at 37° C. and 5% $CO_2$ conditions.

Preparation Example 1.2. Quarantine and Acclimation of Mice as Experimental Subjects 6-week-old female C57BL/6 mice were purchased from Orient Bio. Inspection and quarantine were carried out by referring to the microbiological monitoring report of the test system provided by the supplier when obtaining the experimental animals, and observing the appearance of the experimental animals. Animals with no appearance abnormality were brought into the breeding area and acclimatized in the animal room where the test was carried out for 7 days. Health condition was evaluated during the quarantine and acclimation period of 7 days, and healthy mice were selected by checking whether they are suitable for conducting the experiment.

Preparation Example 1.3. Identification of Mouse Subject and Breeding Box

When obtaining experimental animals, subject marking was made on the tail of the mice using a red oil-based pen (tail marking), and a temporary subject identification card (test name, subject number, and stocking time) was attached to the breeding box during the quarantine and acclimation period. At the time of grouping, subject marking was made on the tail of the mice using a black oil-based pen, and a subject identification card (test name, group information, subject number, sex, stocking time, and administration period) was attached to each cage.

Preparation Example 1.4. Transplantation of Tumor Cell Line

After the end of quarantine and acclimation period, for the selected healthy C57BL/6 mice, 100 μl ($5 \times 10^5$ cells) of B16F10 cells, which were diluted in PBS at a concentration of $5 \times 10^6$ cells/mL, per subject were subcutaneously transplanted into the flanks of both sides. However, in the case of the right, the cells were transplanted into the flank of the hind leg, and in the case of the left, the cells were transplanted into the flank of the front leg.

Preparation Example 1.5. Grouping of Mouse Tumor Model

About 7 days before and after transplanting the B16F10 tumor cell line in Preparation Example 1.4. above, the tumor size of C57BL/6 mice was measured using an electronic caliper, and then 10 mice per group were grouped into a total of 5 groups. Specifically, when the tumor volume of most subjects transplanted with tumor cell lines reached about 50 to 120 mm³, the tumors transplanted into both sides of one subject were measured, and grouping was carried out according to the Z array method based on the tumor size of the average value.

Preparation Example 1.6. Breeding of Mice as Experimental Subjects

5 C57BL/6 mice, the subjects of the experiment, per box were bred in a polycarbonate breeding box with a size of 200 (Width, mm)×260 (Depth, mm)×130 (Height, mm). At this time, the breeding temperature condition was 20° C. to 25° C., and the humidity was 50±20%. Ventilation was carried out 10 to 15 times per hour, and a 12-hour day and night cycle was maintained. At this time, the illuminance was 150 to 300 Lux.

During breeding, feed and water were allowed to be freely consumed. At this time, tap water was filtered with a filter water flowing sterilizer and then irradiated with ultraviolet rays, and provided using a polycarbonate drinking water bottle (250 mL). On the other hand, the breeding box and feeder were exchanged at a frequency of once/week, and a water bottle was exchanged at a frequency of 2 times/week. The breeding materials were washed with a disinfectant solution, disinfected using a UV disinfector, and then reused.

Experimental Example 1. Therapeutic Effect in Combination of Radiation Irradiation and mGI-101 in Mouse Tumor Model Experimental Example 1.1. mGI-101 Intraperitoneal Administration and Radiation Irradiation mGI-101 prepared in Manufacturing Example 1 as a test substance was administered to a mouse tumor model through intraperitoneal injection, and the mice were 8 weeks old at the time of administration. Specifically, in the case of experimental groups G2 and G4, mGI-101 was first administered on the day of grouping (day 1), and in the case of experimental group G5, mGI-101 was first administered on day 4, the day after radiation irradiation. Thereafter, in the case of experimental groups G2, G4 and G5, mGI-101 was additionally administered intraperitoneally once a week, a total of 2 times. In the case of control group G1, PBS was administered on the day of grouping (day 1), and then PBS was additionally administered through intraperitoneal injection once a week, a total of 2 times.

In the case of radiation irradiation, the right side was laid face up under injection anesthesia so that the right side of the tumor transplantation site could be irradiated. The radiation was irradiated once on day 3 at an intensity of 6 Gy. The results are summarized in Table 1 below.

TABLE 1

| Group | Test substance | Test substance administration time* | Dosage and irradiation amount | Administration volume (volume) | Route of administration | Number of administration | Administration period | Number of subjects |
|---|---|---|---|---|---|---|---|---|
| G1 (Control) | PBS (Vehicle) | Day 1 | — | 10 mL/kg | intraperitoneal injection | once a week (a total of 2 times) | 2 weeks | 10 |
| G2 | mGI-101 | Day 1 | 3 mg/kg | 10 mL/kg | intraperitoneal injection | once a week (a total of 2 times) | 2 weeks | 10 |
| G3 | radiation | Day 3 | 6 Gy | — | irradiation | once | — | 10 |
| G4 (Combination: mGI-101→radiation) | mGI-101 | Day 1 | 3 mg/kg | 10 mL/kg | intraperitoneal injection | once a week (a total of 2 times) | 2 weeks | 10 |
|  | radiation | Day 3 | 6 Gy | — | irradiation | once |  |  |
| G5 (Combination: radiation→mGI-101) | radiation | Day 3 | 6 Gy | — | irradiation | once | 2 weeks | 10 |
|  | mGI-101 | Day 4 | 3 mg/kg | 10 mL/kg | intraperitoneal injection | once a week (a total of 2 times) |  |  |

*The day of grouping was set as day 1.

Experimental Example 1.2. Measurement of Tumor Volume and Analysis of Tumor Growth Inhibition in Mouse Tumor Model After mGI-101 intraperitoneal injection and radiation irradiation, the major axis (maximum length, L) and the minor axis (perpendicular width, W) of the tumor transplanted into the flanks of both sides of the mice were measured using an electronic caliper twice a week, and the tumor volume was calculated by substituting them into the following [Equation 1].

$$\text{Tumor volume (mm}^3) = [L \text{ (mm)} \times W \text{ (mm)} \times W \text{ (mm)}] \times 0.5 \quad \text{[Equation 1]}$$

On the other hand, the tumor growth inhibition (TGI) was calculated by substituting them into the following [Equation 2].

$$TGI = (1 - (T_i - T_0)/(V_i - V_0)) \times 100 \quad \text{[Equation 2]}$$

$T_i$=tumor volume before administration of experimental group $T_0$=tumor volume after administration of experimental group $V_i$=tumor volume before administration of control group $V_0$=tumor volume after administration of control group The tumor volume before administration of each subject was set as the value measured at the time of grouping.

Experimental Example 1.3. Tumor Growth Inhibitory Effect by Radiation Irradiation and Administration of mGI-101

In the case of the right tumor that was irradiated with radiation, G3 significantly inhibited the tumor growth on day 15 as compared with G1 and G2; and both G4 and G5 significantly inhibited the tumor growth on day 11 and day 15 as compared with G1 and G2 (FIGS. 1a and 2a to 2e).

In the case of the left tumor that was not irradiated with radiation, G2 significantly inhibited the tumor growth on day 15 as compared with G1; and G4 significantly inhibited the tumor growth on day 15 as compared with G1 and G3. G5 significantly inhibited the tumor growth on day 11 as compared with G1 and G3; and on day 15 as compared with G1, G2, and G3 (FIGS. 1b and 3a to 3e).

Figure 1C:
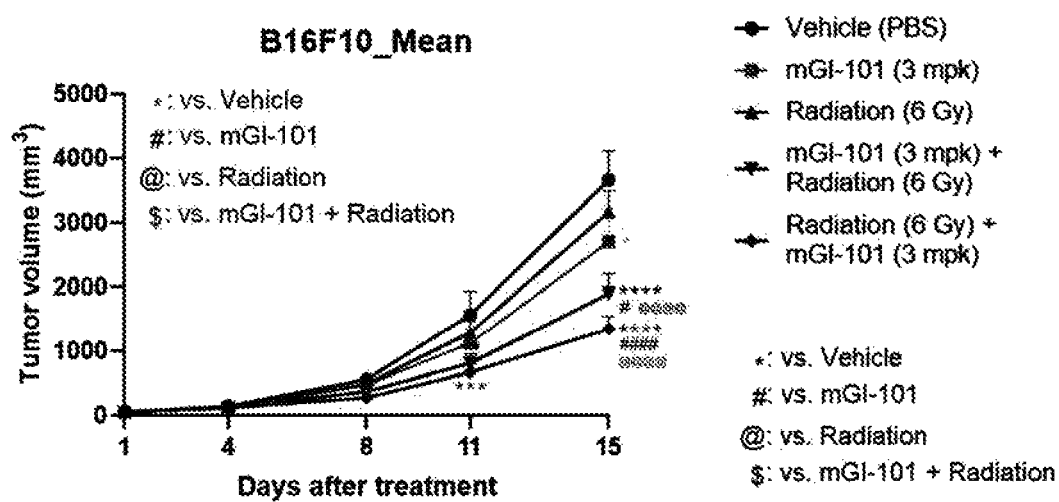
Figure 2A:
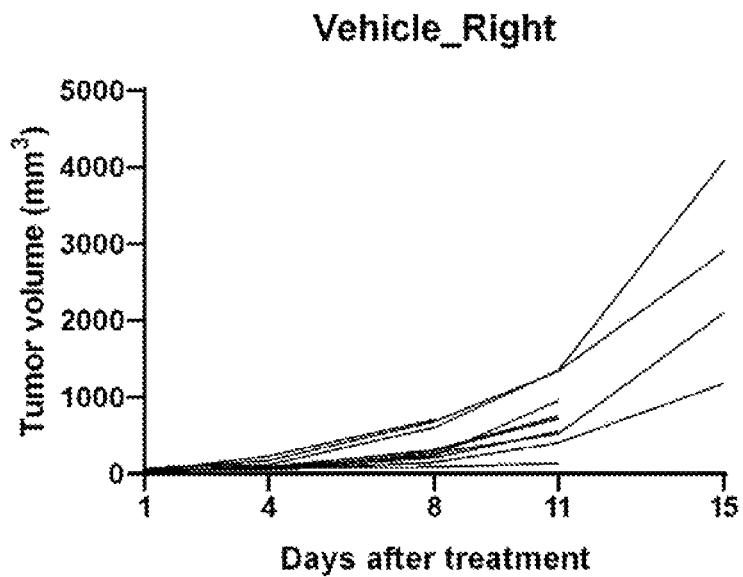
FIGS. 2a to 2e illustrate results obtained by identifying the anticancer effect at a tumor site that is irradiated with radiation, when mGI-101 of the present invention is administered and/or radiation is irradiated to a mouse having a tumor. Specifically, they illustrate the tumor growth for each mouse subject, when mGI-101 of the present invention is administered and/or radiation is irradiated to the right tumor that is irradiated with radiation.
Figure 2B:
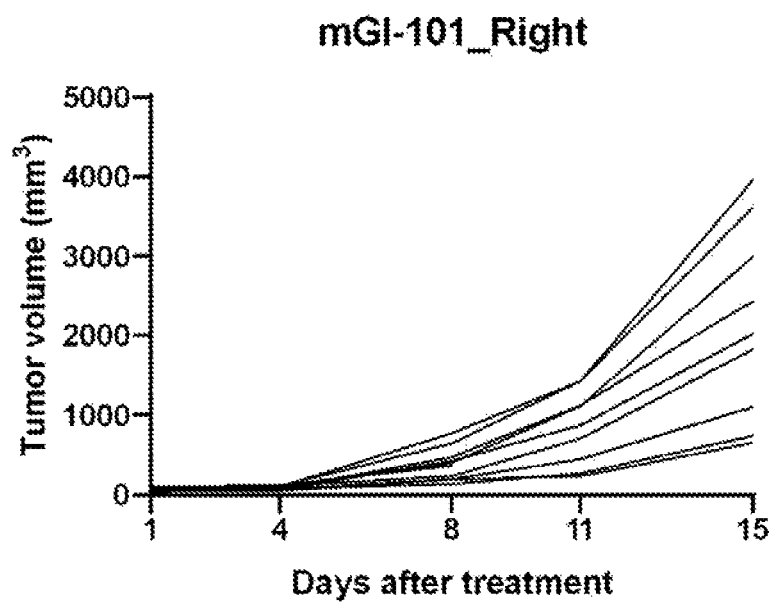
Figure 2C:
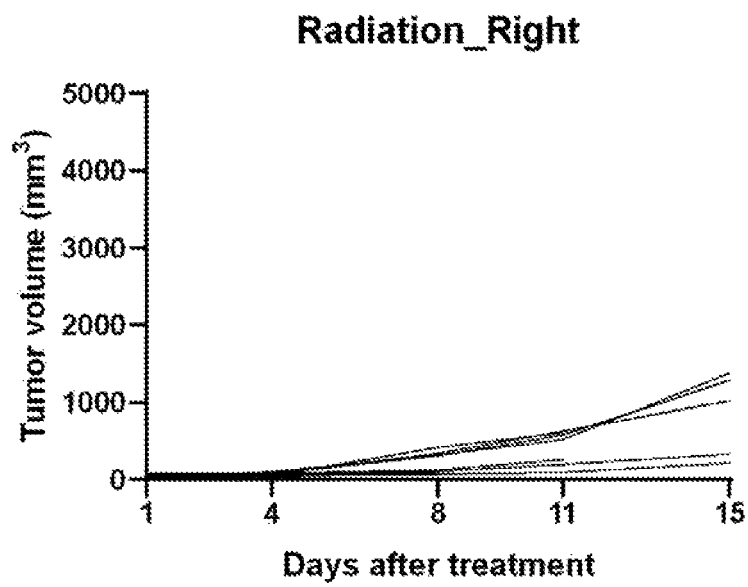
Figure 2D:
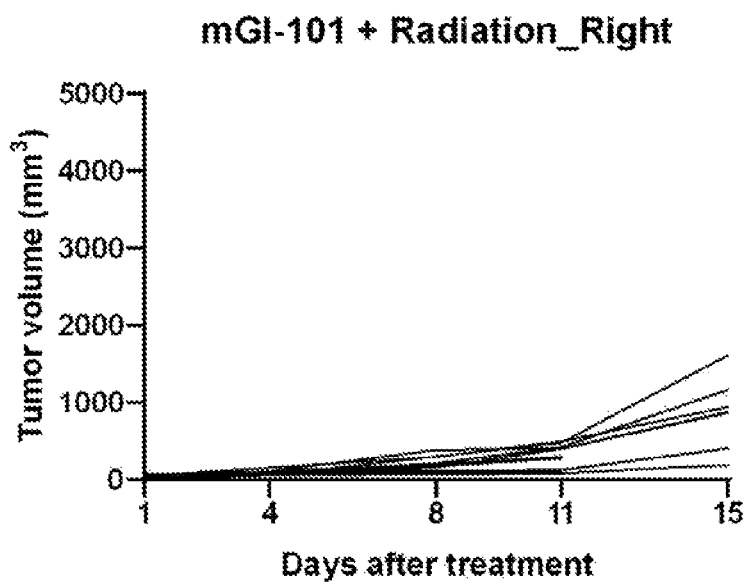
Figure 2E:
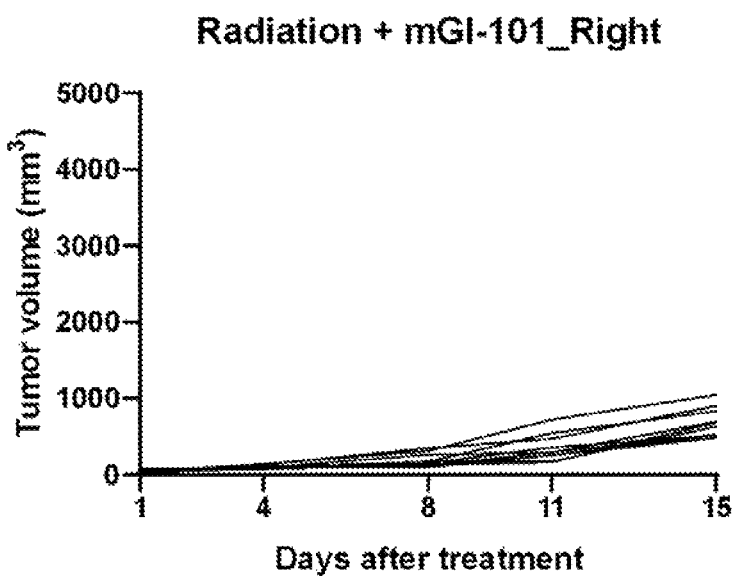
Figure 3A:
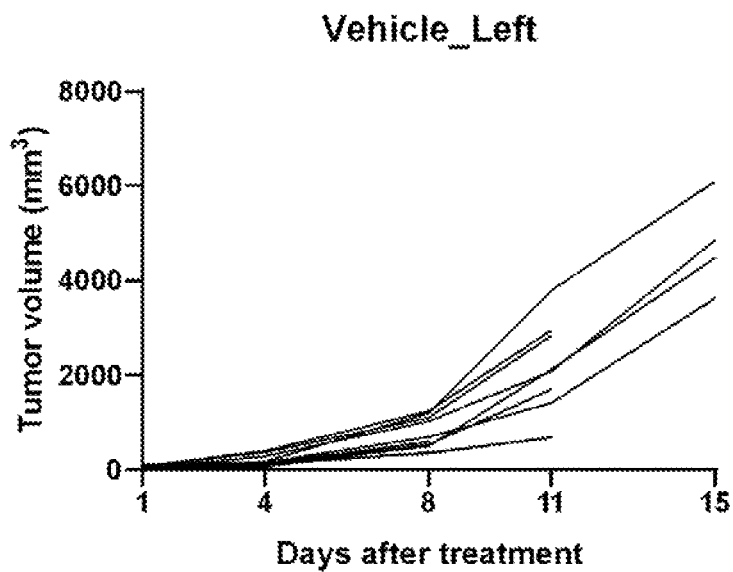
FIGS. 3a to 3e illustrate results obtained by identifying the abscopal effect in which the therapeutic effect at a distal site that is not irradiated with radiation is shown when mGI-101 of the present invention is administered and/or radiation is irradiated to a mouse having a tumor. Specifically, they illustrate the tumor growth for each mouse subject, when mGI-101 of the present invention is administered and/or radiation is irradiated to the left tumor that is not irradiated with radiation.
Figure 3B:
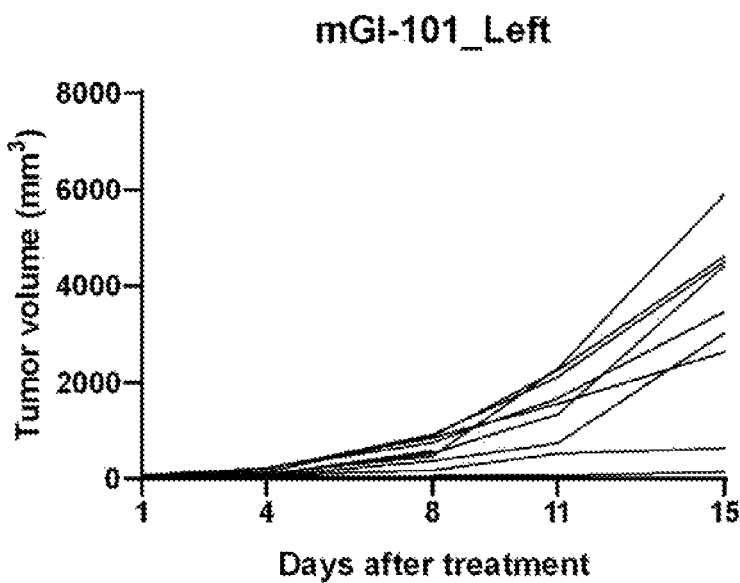
Figure 3C:
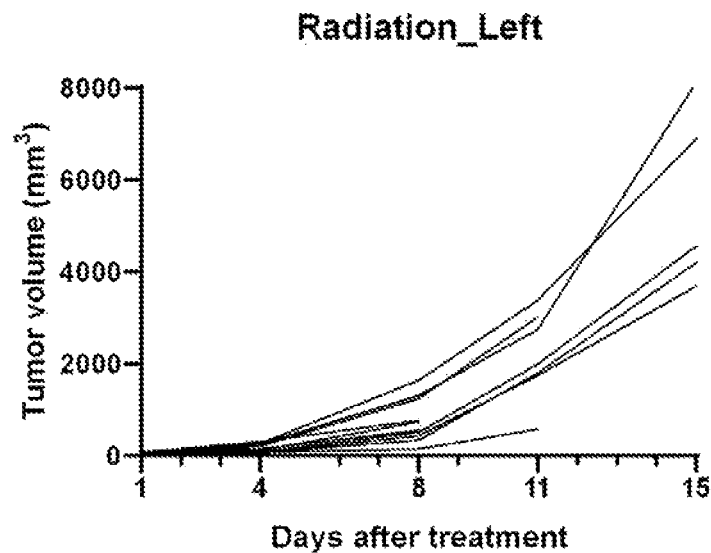
Figure 3D:
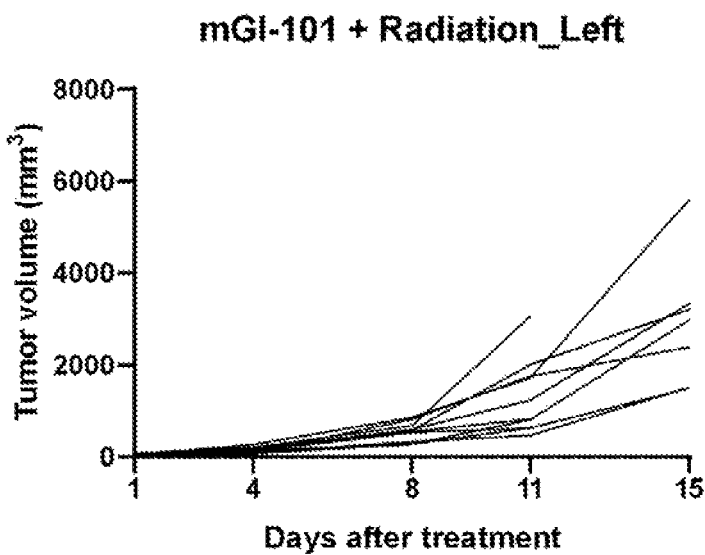
Figure 3E:
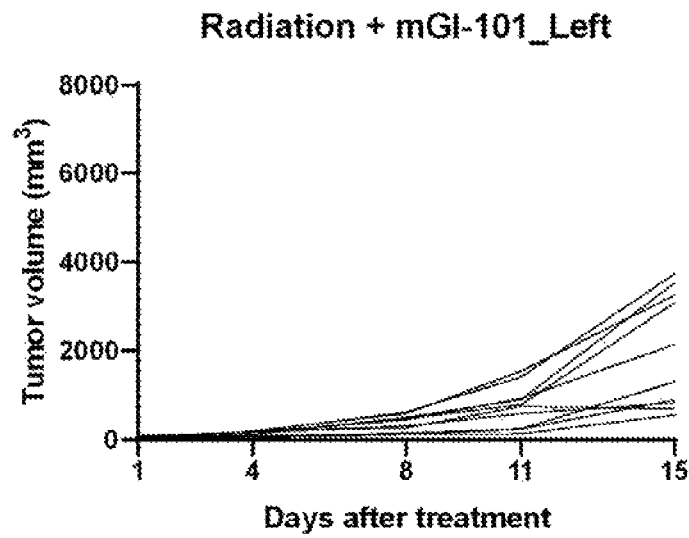

For the average of both tumors, G2 significantly inhibited the tumor growth on day 15 as compared with G1; both G4 and G5 significantly inhibited the tumor growth on day 11 as compared with G1; and both G4 and G5 significantly inhibited the tumor growth on day 15 as compared with G1, G2, and G3 (FIG. 1c).

Experimental Example 1.4. Analysis of Tumor Growth Inhibition by Radiation Irradiation and Administration of mGI-101

Figure 4A:
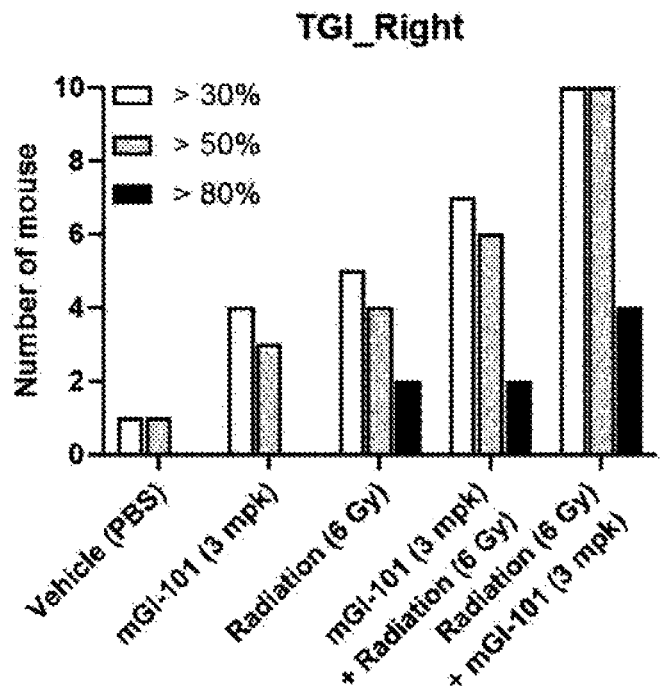
FIG. 4a to FIG. 4c are graphs showing the tumor growth inhibition by mGI-101 of the present invention and/or irradiation with radiation. Specifically, they are graphs showing (a) the tumor growth inhibition for the right tumor that is irradiated with radiation, (b) the tumor growth inhibition for the left tumor that is not irradiated with radiation, and (c) the average tumor growth inhibition for both tumors.

For the tumor growth inhibition (TGI) for the right tumor that was irradiated with radiation, G1 exhibited 30% or more inhibition in 1 mouse, 50% or more inhibition in 1 mouse, and 80% or more inhibition in 0 mice; and G2 exhibited 30% or more inhibition in 4 mice, 50% or more inhibition in 3 mice, and 80% or more inhibition in 0 mice. G3 exhibited 30% or more inhibition in 5 mice, 50% or more inhibition in 4 mice, and 80% or more inhibition in 2 mice; and G4 exhibited 30% or more inhibition in 7 mice, 50% or more inhibition in 6 mice, and 80% or more inhibition in 2 mice. G5 exhibited 30% or more inhibition in 10 mice, 50% or more inhibition in 10 mice, and 80% or more inhibition in 4 mice (FIG. 4a and Table 2).

TABLE 2

| Group | 30% or more inhibition | 50% or more inhibition | 80% or more inhibition |
|---|---|---|---|
| G1 | 1 | 1 | 0 |
| G2 | 4 | 3 | 0 |
| G3 | 5 | 4 | 2 |
| G4 | 7 | 6 | 2 |
| G5 | 10 | 10 | 4 |

Figure 4B:
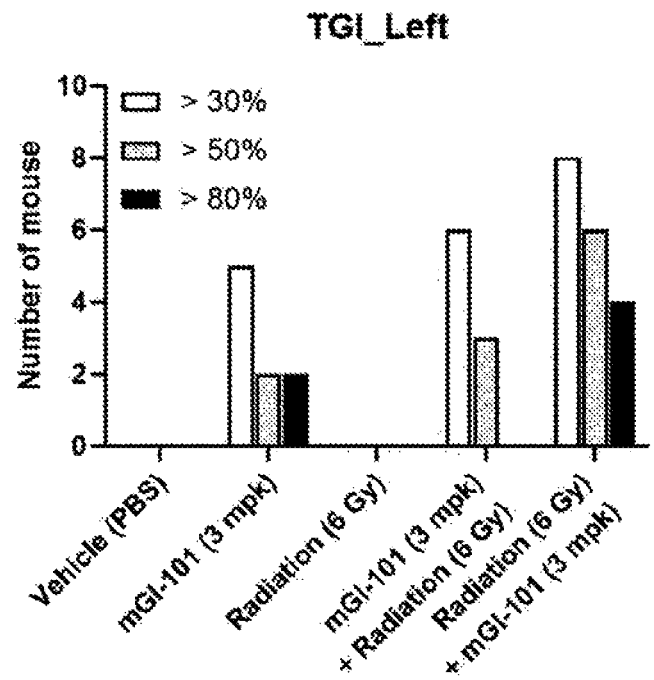

For the tumor growth inhibition for the left tumor that was not irradiated with radiation, G1 exhibited 30% or more inhibition in 0 mice, 50% or more inhibition in 0 mice, and 80% or more inhibition in 0 mice; and G2 exhibited 30% or more inhibition in 5 mice, 50% or more inhibition in 2 mice, and 80% or more inhibition in 2 mice. G3 exhibited 30% or more inhibition in 0 mice, 50% or more inhibition in 0 mice, and 80% or more inhibition 0 mice; and G4 exhibited 30% or more inhibition in 6 mice, 50% or more inhibition in 3 mice, and 80% or more inhibition in 0 mice. G5 exhibited 30% or more inhibition in 8 mice, 50% or more inhibition in 6 mice, and 80% or more inhibition in 4 mice (FIG. 4b and Table 3).

TABLE 3

| Group | 30% or more inhibition | 50% or more inhibition | 80% or more inhibition |
|---|---|---|---|
| G1 | 0 | 0 | 0 |
| G2 | 5 | 2 | 2 |
| G3 | 0 | 0 | 0 |
| G4 | 6 | 3 | 0 |
| G5 | 8 | 6 | 4 |

Figure 4C:
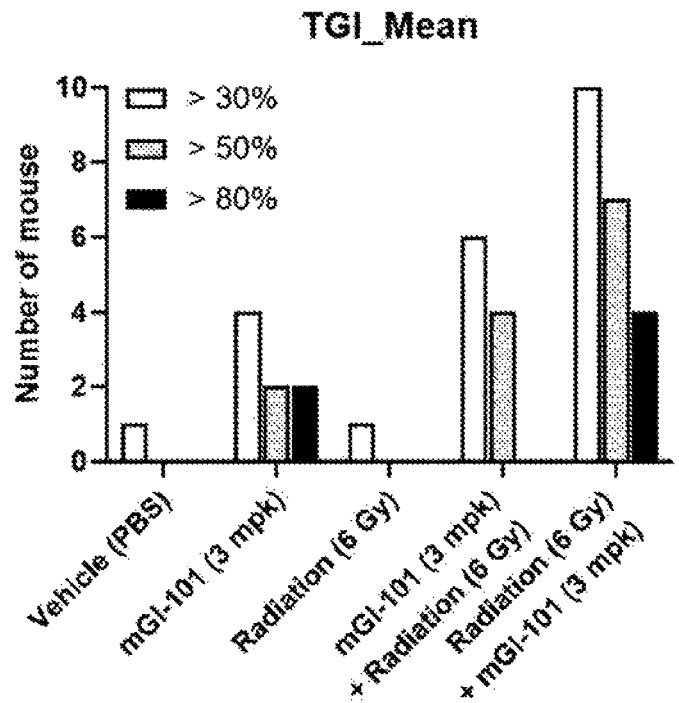

For the average tumor growth inhibition for both tumors, G1 exhibited 30% or more inhibition in 1 mouse, 50% or more inhibition in 0 mice, and 80% or more inhibition in 0 mice; and G2 exhibited 30% or more inhibition in 4 mice, 50% or more inhibition in 2 mice, and 80% or more inhibition in 2 mice. G3 exhibited 30% or more inhibition in 1 mouse, 50% or more inhibition in 0 mice, and 80% or more inhibition in 0 mice; and G4 exhibited 30% or more inhibition in 6 mice, 50% or more inhibition in 4 mice, and 80% or more inhibition in 0 mice. G5 exhibited 30% or more inhibition in 10 mice, 50% or more inhibition in 7 mice, and 80% or more inhibition in 4 mice (FIG. 4c and Table 4).

TABLE 4

| Group | 30% or more inhibition | 50% or more inhibition | 80% or more inhibition |
|---|---|---|---|
| G1 | 1 | 0 | 0 |
| G2 | 4 | 2 | 2 |
| G3 | 1 | 0 | 0 |
| G4 | 6 | 4 | 0 |
| G5 | 10 | 7 | 4 |

Through the above results, it was found that the combination therapy of GI-101 and radiation not only exhibited a synergistic anticancer effect at a tumor site that was irradiated with radiation, but also exhibited a synergistic anticancer effect at a distal tumor site that was not irradiated with radiation.

The invention claimed is:

1. A pharmaceutical composition for enhancing radiation therapy for cancer, comprising a fusion protein dimer comprising an IL-2 protein and a CD80 protein.

2. The pharmaceutical composition of claim 1, wherein the IL-2 protein and the CD80 protein are bound to each other via a linker.

3. The pharmaceutical composition of claim 1, wherein the IL-2 protein has the amino acid sequence of SEQ ID NO: 10.

4. The pharmaceutical composition of claim 1, wherein the IL-2 protein is an IL-2 variant.

5. The pharmaceutical composition of claim 4, wherein the IL-2 variant is obtained by substitution of at least one selected from the group consisting of the $38^{th}$, $42^{nd}$, $45^{th}$, $61^{st}$, and $72^{nd}$ amino acid(s) in the amino acid sequence of SEQ ID NO: 10.

6. The pharmaceutical composition of claim 4, wherein the IL-2 variant is obtained by at least one substitution selected from the group consisting of R38A, F42A, Y45A, E61R, and L72G in the amino acid sequence of SEQ ID NO: 10.

7. The pharmaceutical composition of claim 4, wherein the IL-2 variant is obtained by any one selected from the following substitution combinations (a) to (d) in the amino acid sequence of SEQ ID NO: 10:
  (a) R38A/F42A
  (b) R38A/F42A/Y45A
  (c) R38A/F42A/E61R
  (d) R38A/F42A/L72G.

8. The pharmaceutical composition of claim 4, wherein the IL-2 variant has the amino acid sequence of SEQ ID NO: 6, 22, 23, or 24.

9. The pharmaceutical composition of claim 1, wherein the CD80 has the amino acid sequence of SEQ ID NO: 11.

10. The pharmaceutical composition of claim 1, wherein the CD80 protein is a fragment of CD80.

11. The pharmaceutical composition of claim 10, wherein the fragment of CD80 consists of the $35^{th}$ to $242^{nd}$ amino acids in the amino acid sequence of SEQ ID NO: 11.

12. The pharmaceutical composition of claim 2, wherein the linker is an albumin or an Fc domain of an immunoglobulin.

13. The pharmaceutical composition of claim 12, wherein the Fc domain is a wild type or a variant of an Fc domain.

14. The pharmaceutical composition of claim 12, wherein the Fc domain has the amino acid sequence of SEQ ID NO: 4.

15. The pharmaceutical composition of claim 13, wherein the variant of the Fc domain has the amino acid sequence of SEQ ID NO: 12.

16. The pharmaceutical composition of claim 1, wherein the fusion protein consists of the following structural formula (I) or (II):
  N'-X-[linker (1)] n-Fc domain-[linker (2)] m-Y-C' (I)
  N'-Y-[linker (1)] n-Fc domain-[linker (2)] m-X-C' (II)
  in the structural formulas (I) and (II),
  N' is the N-terminus of the fusion protein,
  C' is the C-terminus of the fusion protein,
  X is the CD80 protein,
  Y is the IL-2 protein,
  the linkers (1) and (2) are peptide linkers, and
  n and m are each independently 0 or 1.

17. The pharmaceutical composition of claim 16, wherein the linker (1) is a peptide linker consisting of the amino acid sequence of SEQ ID NO: 3.

18. The pharmaceutical composition of claim 16, wherein the linker (2) is a peptide linker consisting of the amino acid sequence of SEQ ID NO: 5.

19. The pharmaceutical composition of claim 16, wherein the fusion protein consists of the structural formula (I).

20. The pharmaceutical composition of claim 1, wherein the fusion protein has a sequence identity of 85% or higher to the amino acid sequence of SEQ ID NO: 9, 26, 28, or 30.

21. The pharmaceutical composition of claim 1, wherein the cancer is any one selected from the group consisting of gastric cancer, liver cancer, lung cancer, colorectal cancer, breast cancer, prostate cancer, ovarian cancer, pancreatic cancer, cervical cancer, thyroid cancer, laryngeal cancer, acute myeloid leukemia, brain tumor, neuroblastoma, retinoblastoma, head and neck cancer, salivary gland cancer, and lymphoma.

22. A method of radiation therapy for cancer, comprising:
  irradiating radiation to a cancer site of a non-human mammal suffering from cancer; and
  administering the pharmaceutical composition of claim 1 to the mammal.

23. The method of claim 22, wherein the radiation is irradiated in an irradiation amount of 0.1 Gy to 100 Gy.

24. The method of claim 22, wherein the pharmaceutical composition is administered before or after radiation irradiation.

25. The method of claim 24, wherein the pharmaceutical composition is administered before or after 6 to 48 hours based on the time of radiation irradiation.

26. The method of claim 22, wherein the pharmaceutical composition is administered once to 20 times a week.

* * * * *

SEQUENCE LISTING

<160> NUMBER OF SEQ ID NOS: 38

<210> SEQ ID NO 1
<211> LENGTH: 25
<212> TYPE: PRT
<213> ORGANISM: Artificial Sequence
<220> FEATURE:
<223> OTHER INFORMATION: signal peptide (TPA)

<400> SEQUENCE: 1

Met Asp Ala Met Leu Arg Gly Leu Cys Cys Val Leu Leu Cys Gly
1               5                   10                  15

Ala Val Phe Val Ser Pro Ser His Ala
            20                  25

<210> SEQ ID NO 2
<211> LENGTH: 208
<212> TYPE: PRT
<213> ORGANISM: Artificial Sequence
<220> FEATURE:
<223> OTHER INFORMATION: hB7-1:35-242

<400> SEQUENCE: 2

Val Ile His Val Thr Lys Glu Val Lys Glu Val Ala Thr Leu Ser Cys
1               5                   10                  15

Gly His Asn Val Ser Val Glu Glu Leu Ala Gln Thr Arg Ile Tyr Trp
                20                  25                  30

Gln Lys Glu Lys Lys Met Val Leu Thr Met Met Ser Gly Asp Met Asn
            35                  40                  45

Ile Trp Pro Glu Tyr Lys Asn Arg Thr Ile Phe Asp Ile Thr Asn Asn
        50                  55                  60

Leu Ser Ile Val Ile Leu Ala Leu Arg Pro Ser Asp Glu Gly Thr Tyr
65                  70                  75                  80

Glu Cys Val Val Leu Lys Tyr Glu Lys Asp Ala Phe Lys Arg Glu His
                85                  90                  95

Leu Ala Glu Val Thr Leu Ser Val Lys Ala Asp Phe Pro Thr Pro Ser
            100                 105                 110

Ile Ser Asp Phe Glu Ile Pro Thr Ser Asn Ile Arg Arg Ile Ile Cys
        115                 120                 125

Ser Thr Ser Gly Gly Phe Pro Glu Pro His Leu Ser Trp Leu Glu Asn
130                 135                 140

Gly Glu Glu Leu Asn Ala Ile Asn Thr Thr Val Ser Gln Asp Pro Glu
145                 150                 155                 160

Thr Glu Leu Tyr Ala Val Ser Ser Lys Leu Asp Phe Asn Met Thr Thr
                165                 170                 175

Asn His Ser Phe Met Cys Leu Ile Lys Tyr Gly His Leu Arg Val Asn
            180                 185                 190

Gln Thr Phe Asn Trp Asn Thr Thr Lys Gln Glu His Phe Pro Asp Asn
        195                 200                 205

<210> SEQ ID NO 3
<211> LENGTH: 30
<212> TYPE: PRT
<213> ORGANISM: Artificial Sequence
<220> FEATURE:
<223> OTHER INFORMATION: hinge

<400> SEQUENCE: 3

Gly Ser Gly Gly Gly Gly Ser Gly Gly Gly Gly Ser Gly Gly Gly Gly
1               5                   10                  15

```
Ser Ala Glu Ser Lys Tyr Gly Pro Pro Cys Pro Pro Cys Pro
            20                  25                  30
```

<210> SEQ ID NO 4
<211> LENGTH: 216
<212> TYPE: PRT
<213> ORGANISM: Artificial Sequence
<220> FEATURE:
<223> OTHER INFORMATION: immunoglobulin fc

<400> SEQUENCE: 4

```
Ala Pro Glu Ala Ala Gly Gly Pro Ser Val Phe Leu Phe Pro Pro Lys
1               5                   10                  15

Pro Lys Asp Gln Leu Met Ile Ser Arg Thr Pro Glu Val Thr Cys Val
            20                  25                  30

Val Val Asp Val Ser Gln Glu Asp Pro Glu Val Gln Phe Asn Trp Tyr
        35                  40                  45

Val Asp Gly Val Glu Val His Asn Ala Lys Thr Lys Pro Arg Glu Glu
    50                  55                  60

Gln Phe Asn Ser Thr Tyr Arg Val Val Ser Val Leu Thr Val Leu His
65                  70                  75                  80

Gln Asp Trp Leu Asn Gly Lys Glu Tyr Lys Cys Lys Val Ser Asn Lys
                85                  90                  95

Gly Leu Pro Ser Ser Ile Glu Lys Thr Ile Ser Lys Ala Lys Gly Gln
            100                 105                 110

Pro Arg Glu Pro Gln Val Tyr Thr Leu Pro Pro Ser Gln Glu Glu Met
        115                 120                 125

Thr Lys Asn Gln Val Ser Leu Thr Cys Leu Val Lys Gly Phe Tyr Pro
    130                 135                 140

Ser Asp Ile Ala Val Glu Trp Glu Ser Asn Gly Gln Pro Glu Asn Asn
145                 150                 155                 160

Tyr Lys Thr Thr Pro Pro Val Leu Asp Ser Asp Gly Ser Phe Phe Leu
                165                 170                 175

Tyr Ser Arg Leu Thr Val Asp Lys Ser Arg Trp Gln Glu Gly Asn Val
            180                 185                 190

Phe Ser Cys Ser Val Leu His Glu Ala Leu His Asn His Tyr Thr Gln
        195                 200                 205

Lys Ser Leu Ser Leu Ser Leu Gly
    210                 215
```

<210> SEQ ID NO 5
<211> LENGTH: 5
<212> TYPE: PRT
<213> ORGANISM: Artificial Sequence
<220> FEATURE:
<223> OTHER INFORMATION: linker

<400> SEQUENCE: 5

```
Gly Gly Gly Gly Ser
1               5
```

<210> SEQ ID NO 6
<211> LENGTH: 133
<212> TYPE: PRT
<213> ORGANISM: Artificial Sequence
<220> FEATURE:
<223> OTHER INFORMATION: hIL-2M

<400> SEQUENCE: 6

```
Ala Pro Thr Ser Ser Ser Thr Lys Lys Thr Gln Leu Gln Leu Glu His
1               5                   10                  15

Leu Leu Leu Asp Leu Gln Met Ile Leu Asn Gly Ile Asn Asn Tyr Lys
            20                  25                  30

Asn Pro Lys Leu Thr Ala Met Leu Thr Ala Lys Phe Tyr Met Pro Lys
        35                  40                  45

Lys Ala Thr Glu Leu Lys His Leu Gln Cys Leu Glu Glu Glu Leu Lys
    50                  55                  60

Pro Leu Glu Glu Val Leu Asn Leu Ala Gln Ser Lys Asn Phe His Leu
65                  70                  75                  80

Arg Pro Arg Asp Leu Ile Ser Asn Ile Asn Val Ile Val Leu Glu Leu
                85                  90                  95

Lys Gly Ser Glu Thr Thr Phe Met Cys Glu Tyr Ala Asp Glu Thr Ala
            100                 105                 110

Thr Ile Val Glu Phe Leu Asn Arg Trp Ile Thr Phe Cys Gln Ser Ile
        115                 120                 125

Ile Ser Thr Leu Thr
    130

<210> SEQ ID NO 7
<211> LENGTH: 617
<212> TYPE: PRT
<213> ORGANISM: Artificial Sequence
<220> FEATURE:
<223> OTHER INFORMATION: fusion protein comprising variants of IL-2 and
      fragments of CD80

<400> SEQUENCE: 7

Met Asp Ala Met Leu Arg Gly Leu Cys Cys Val Leu Leu Leu Cys Gly
1               5                   10                  15

Ala Val Phe Val Ser Pro Ser His Ala Val Ile His Val Thr Lys Glu
            20                  25                  30

Val Lys Glu Val Ala Thr Leu Ser Cys Gly His Asn Val Ser Val Glu
        35                  40                  45

Glu Leu Ala Gln Thr Arg Ile Tyr Trp Gln Lys Glu Lys Lys Met Val
    50                  55                  60

Leu Thr Met Met Ser Gly Asp Met Asn Ile Trp Pro Glu Tyr Lys Asn
65                  70                  75                  80

Arg Thr Ile Phe Asp Ile Thr Asn Asn Leu Ser Ile Val Ile Leu Ala
                85                  90                  95

Leu Arg Pro Ser Asp Glu Gly Thr Tyr Glu Cys Val Val Leu Lys Tyr
            100                 105                 110

Glu Lys Asp Ala Phe Lys Arg Glu His Leu Ala Glu Val Thr Leu Ser
        115                 120                 125

Val Lys Ala Asp Phe Pro Thr Pro Ser Ile Ser Asp Phe Glu Ile Pro
    130                 135                 140

Thr Ser Asn Ile Arg Arg Ile Ile Cys Ser Thr Ser Gly Gly Phe Pro
145                 150                 155                 160

Glu Pro His Leu Ser Trp Leu Glu Asn Gly Glu Glu Leu Asn Ala Ile
                165                 170                 175

Asn Thr Thr Val Ser Gln Asp Pro Glu Thr Glu Leu Tyr Ala Val Ser
            180                 185                 190

Ser Lys Leu Asp Phe Asn Met Thr Thr Asn His Ser Phe Met Cys Leu
        195                 200                 205

Ile Lys Tyr Gly His Leu Arg Val Asn Gln Thr Phe Asn Trp Asn Thr
    210                 215                 220
```

-continued

Thr Lys Gln Glu His Phe Pro Asp Asn Gly Ser Gly Gly Gly Ser
225                 230                 235                 240

Gly Gly Gly Gly Ser Gly Gly Gly Ser Ala Glu Ser Lys Tyr Gly
                245                 250                 255

Pro Pro Cys Pro Pro Cys Pro Ala Pro Glu Ala Ala Gly Gly Pro Ser
            260                 265                 270

Val Phe Leu Phe Pro Pro Lys Pro Lys Asp Gln Leu Met Ile Ser Arg
            275                 280                 285

Thr Pro Glu Val Thr Cys Val Val Asp Val Ser Gln Glu Asp Pro
290                 295                 300

Glu Val Gln Phe Asn Trp Tyr Val Asp Gly Val Glu Val His Asn Ala
305                 310                 315                 320

Lys Thr Lys Pro Arg Glu Glu Gln Phe Asn Ser Thr Tyr Arg Val Val
                325                 330                 335

Ser Val Leu Thr Val Leu His Gln Asp Trp Leu Asn Gly Lys Glu Tyr
                340                 345                 350

Lys Cys Lys Val Ser Asn Lys Gly Leu Pro Ser Ser Ile Glu Lys Thr
            355                 360                 365

Ile Ser Lys Ala Lys Gly Gln Pro Arg Glu Pro Gln Val Tyr Thr Leu
370                 375                 380

Pro Pro Ser Gln Glu Glu Met Thr Lys Asn Gln Val Ser Leu Thr Cys
385                 390                 395                 400

Leu Val Lys Gly Phe Tyr Pro Ser Asp Ile Ala Val Glu Trp Glu Ser
                405                 410                 415

Asn Gly Gln Pro Glu Asn Asn Tyr Lys Thr Thr Pro Pro Val Leu Asp
            420                 425                 430

Ser Asp Gly Ser Phe Phe Leu Tyr Ser Arg Leu Thr Val Asp Lys Ser
            435                 440                 445

Arg Trp Gln Glu Gly Asn Val Phe Ser Cys Ser Val Leu His Glu Ala
450                 455                 460

Leu His Asn His Tyr Thr Gln Lys Ser Leu Ser Leu Ser Leu Gly Gly
465                 470                 475                 480

Gly Gly Gly Ser Ala Pro Thr Ser Ser Ser Thr Lys Lys Thr Gln Leu
                485                 490                 495

Gln Leu Glu His Leu Leu Leu Asp Leu Gln Met Ile Leu Asn Gly Ile
            500                 505                 510

Asn Asn Tyr Lys Asn Pro Lys Leu Thr Ala Met Leu Thr Ala Lys Phe
            515                 520                 525

Tyr Met Pro Lys Lys Ala Thr Glu Leu Lys His Leu Gln Cys Leu Glu
            530                 535                 540

Glu Glu Leu Lys Pro Leu Glu Glu Val Leu Asn Leu Ala Gln Ser Lys
545                 550                 555                 560

Asn Phe His Leu Arg Pro Arg Asp Leu Ile Ser Asn Ile Asn Val Ile
                565                 570                 575

Val Leu Glu Leu Lys Gly Ser Glu Thr Thr Phe Met Cys Glu Tyr Ala
                580                 585                 590

Asp Glu Thr Ala Thr Ile Val Glu Phe Leu Asn Arg Trp Ile Thr Phe
            595                 600                 605

Cys Gln Ser Ile Ile Ser Thr Leu Thr
610                 615

<210> SEQ ID NO 8
<211> LENGTH: 1857

```
<212> TYPE: DNA
<213> ORGANISM: Artificial Sequence
<220> FEATURE:
<223> OTHER INFORMATION: nucleotiedes coding fusion protein (GI101)

<400> SEQUENCE: 8
atggatgcta tgctgagagg cctgtgttgc gtgctgctgc tgtgtggcgc tgtgttcgtg      60
tctccttctc acgctgtgat ccacgtgacc aaagaagtga agaggtcgc cacactgtcc      120 tgcggccaca acgtttcagt ggaagaactg gcccagacca ggatctactg cagaaagaa      180 aagaaaatgg tgctgaccat gatgtccggc gacatgaaca tctggcctga gtacaagaac      240
cggaccatct tcgacatcac caacaacctg tccatcgtga ttctggccct gaggccttct      300
gatgagggca cctatgagtg cgtggtgctg aagtacgaga aggacgcctt caagcgcgag      360
cacctggctg aagtgacact gtccgtgaag gccgactttc ccacaccttc catctccgac      420
ttcgagatcc taccctccaa catccggcgg atcatctgtt ctacctctgg cggctttcct      480
gagcctcacc tgtcttggct ggaaaacggc gaggaactga cgccatcaa caccaccgtg      540 tctcaggacc ccgaaaccga gctgtacgct gtgtcctcca gctggactt caacatgacc      600 accaaccaca gcttcatgtg cctgattaag tacggccacc tgagagtgaa ccagaccttc      660
aactggaaca ccaccaagca agagcacttc cctgacaatg gatctggcgg cggaggttct      720
ggcggaggtg gaagcggagg cggaggatct gctgagtcta agtatggccc tccttgtcct      780
ccatgtcctg ctccagaagc tgctggcgga ccctctgtgt tcctgttcc tccaaagcct      840 aaggaccagc tcatgatctc tcggacaccc gaagtgacct gcgtggtggt ggatgtgtct      900
caagaggacc ctgaggtgca gttcaattgg tacgtggacg gcgtggaagt gcacaacgcc      960
aagaccaagc ctagagagga acagttcaac tccacctaca gagtggtgtc cgtgctgacc     1020
gtgctgcacc aggattggct gaacggcaaa gagtacaagt gcaaggtgtc caacaagggc     1080
ctgccttcca gcatcgaaaa gaccatctcc aaggctaagg ccagcctag gaaccccag      1140 gtttacaccc tgcctccaag ccaagaggaa atgaccaaga ccaggtgtc cctgacctgc     1200 ctggtcaagg gcttctaccc ttccgacatt gccgtggaat gggagtccaa tggccagcct     1260
gagaacaact acaagaccac acctcctgtg ctggactccg acggctcctt ctttctgtac     1320
tctcgcctga ccgtggacaa gtctagatgg caagagggca acgtgttctc ctgctctgtg     1380
ctgcacgagg ccctgcacaa tcactacacc cagaagtccc tgtctctgtc tcttggaggt     1440
ggtggcggtt ctgcccctac cagctcctct accaagaaaa cccagctcca gttggagcat     1500
ctgctgctgg acctccagat gattctgaac gggatcaaca ctataagaa ccccaagctg     1560 accgccatgc tgaccgctaa gttctacatg cccaagaagg ccaccgagct gaagcacctc     1620
cagtgcctga agaagaaact gaagcccctg gaagaggtgc tgaatctggc ccagtccaag     1680
aacttccacc tgaggccacg ggacctgatc agcaacatca cgtgatcgt gctggaactg     1740 aagggctccg agacaacctt tatgtgcgag tacgccgacg agacagccac catcgtggaa     1800
tttctgaacc ggtggatcac cttctgccag agcatcatct ccacactgac ctgatga       1857
```

<210> SEQ ID NO 9
<211> LENGTH: 592
<212> TYPE: PRT
<213> ORGANISM: Artificial Sequence
<220> FEATURE:
<223> OTHER INFORMATION: fusion protein (GI101)

<400> SEQUENCE: 9

Val Ile His Val Thr Lys Glu Val Lys Glu Val Ala Thr Leu Ser Cys
1               5                   10                  15

Gly His Asn Val Ser Val Glu Glu Leu Ala Gln Thr Arg Ile Tyr Trp
                20                  25                  30

Gln Lys Glu Lys Lys Met Val Leu Thr Met Met Ser Gly Asp Met Asn
            35                  40                  45

Ile Trp Pro Glu Tyr Lys Asn Arg Thr Ile Phe Asp Ile Thr Asn Asn
50                  55                  60

Leu Ser Ile Val Ile Leu Ala Leu Arg Pro Ser Asp Glu Gly Thr Tyr
65                  70                  75                  80

Glu Cys Val Val Leu Lys Tyr Glu Lys Asp Ala Phe Lys Arg Glu His
                85                  90                  95

Leu Ala Glu Val Thr Leu Ser Val Lys Ala Asp Phe Pro Thr Pro Ser
                100                 105                 110

Ile Ser Asp Phe Glu Ile Pro Thr Ser Asn Ile Arg Arg Ile Ile Cys
                115                 120                 125

Ser Thr Ser Gly Gly Phe Pro Glu Pro His Leu Ser Trp Leu Glu Asn
            130                 135                 140

Gly Glu Glu Leu Asn Ala Ile Asn Thr Thr Val Ser Gln Asp Pro Glu
145                 150                 155                 160

Thr Glu Leu Tyr Ala Val Ser Ser Lys Leu Asp Phe Asn Met Thr Thr
                165                 170                 175

Asn His Ser Phe Met Cys Leu Ile Lys Tyr Gly His Leu Arg Val Asn
            180                 185                 190

Gln Thr Phe Asn Trp Asn Thr Thr Lys Gln Glu His Phe Pro Asp Asn
            195                 200                 205

Gly Ser Gly Gly Gly Ser Gly Gly Gly Ser Gly Gly Gly Gly
210                 215                 220

Ser Ala Glu Ser Lys Tyr Gly Pro Pro Cys Pro Pro Cys Pro Ala Pro
225                 230                 235                 240

Glu Ala Ala Gly Gly Pro Ser Val Phe Leu Phe Pro Pro Lys Pro Lys
                245                 250                 255

Asp Gln Leu Met Ile Ser Arg Thr Pro Glu Val Thr Cys Val Val Val
            260                 265                 270

Asp Val Ser Gln Glu Asp Pro Glu Val Gln Phe Asn Trp Tyr Val Asp
            275                 280                 285

Gly Val Glu Val His Asn Ala Lys Thr Lys Pro Arg Glu Glu Gln Phe
            290                 295                 300

Asn Ser Thr Tyr Arg Val Val Ser Val Leu Thr Val Leu His Gln Asp
305                 310                 315                 320

Trp Leu Asn Gly Lys Glu Tyr Lys Cys Lys Val Ser Asn Lys Gly Leu
                325                 330                 335

Pro Ser Ser Ile Glu Lys Thr Ile Ser Lys Ala Lys Gly Gln Pro Arg
            340                 345                 350

Glu Pro Gln Val Tyr Thr Leu Pro Pro Ser Gln Glu Glu Met Thr Lys
            355                 360                 365

Asn Gln Val Ser Leu Thr Cys Leu Val Lys Gly Phe Tyr Pro Ser Asp
370                 375                 380

Ile Ala Val Glu Trp Glu Ser Asn Gly Gln Pro Glu Asn Asn Tyr Lys
385                 390                 395                 400

Thr Thr Pro Pro Val Leu Asp Ser Asp Gly Ser Phe Phe Leu Tyr Ser
                405                 410                 415

Arg Leu Thr Val Asp Lys Ser Arg Trp Gln Glu Gly Asn Val Phe Ser

```
                      420                 425                 430
Cys Ser Val Leu His Glu Ala Leu His Asn His Tyr Thr Gln Lys Ser
            435                 440                 445

Leu Ser Leu Ser Leu Gly Gly Gly Gly Ser Ala Pro Thr Ser Ser
    450                 455                 460

Ser Thr Lys Lys Thr Gln Leu Gln Leu Glu His Leu Leu Leu Asp Leu
465                 470                 475                 480

Gln Met Ile Leu Asn Gly Ile Asn Asn Tyr Lys Asn Pro Lys Leu Thr
                485                 490                 495

Ala Met Leu Thr Ala Lys Phe Tyr Met Pro Lys Lys Ala Thr Glu Leu
            500                 505                 510

Lys His Leu Gln Cys Leu Glu Glu Glu Leu Lys Pro Leu Glu Glu Val
        515                 520                 525

Leu Asn Leu Ala Gln Ser Lys Asn Phe His Leu Arg Pro Arg Asp Leu
    530                 535                 540

Ile Ser Asn Ile Asn Val Ile Val Leu Glu Leu Lys Gly Ser Glu Thr
545                 550                 555                 560

Thr Phe Met Cys Glu Tyr Ala Asp Glu Thr Ala Thr Ile Val Glu Phe
                565                 570                 575

Leu Asn Arg Trp Ile Thr Phe Cys Gln Ser Ile Ile Ser Thr Leu Thr
            580                 585                 590
```

<210> SEQ ID NO 10
<211> LENGTH: 133
<212> TYPE: PRT
<213> ORGANISM: Artificial Sequence
<220> FEATURE:
<223> OTHER INFORMATION: hIL-2

<400> SEQUENCE: 10

```
Ala Pro Thr Ser Ser Thr Lys Lys Thr Gln Leu Gln Leu Glu His
1               5                   10                  15

Leu Leu Leu Asp Leu Gln Met Ile Leu Asn Gly Ile Asn Asn Tyr Lys
                20                  25                  30

Asn Pro Lys Leu Thr Arg Met Leu Thr Phe Lys Phe Tyr Met Pro Lys
            35                  40                  45

Lys Ala Thr Glu Leu Lys His Leu Gln Cys Leu Glu Glu Glu Leu Lys
    50                  55                  60

Pro Leu Glu Glu Val Leu Asn Leu Ala Gln Ser Lys Asn Phe His Leu
65                  70                  75                  80

Arg Pro Arg Asp Leu Ile Ser Asn Ile Asn Val Ile Val Leu Glu Leu
                85                  90                  95

Lys Gly Ser Glu Thr Thr Phe Met Cys Glu Tyr Ala Asp Glu Thr Ala
            100                 105                 110

Thr Ile Val Glu Phe Leu Asn Arg Trp Ile Thr Phe Cys Gln Ser Ile
        115                 120                 125

Ile Ser Thr Leu Thr
    130
```

<210> SEQ ID NO 11
<211> LENGTH: 288
<212> TYPE: PRT
<213> ORGANISM: Artificial Sequence
<220> FEATURE:
<223> OTHER INFORMATION: CD80

<400> SEQUENCE: 11

```
Met Gly His Thr Arg Arg Gln Gly Thr Ser Pro Ser Lys Cys Pro Tyr
1               5                   10                  15

Leu Asn Phe Phe Gln Leu Leu Val Leu Ala Gly Leu Ser His Phe Cys
            20                  25                  30

Ser Gly Val Ile His Val Thr Lys Glu Val Lys Glu Val Ala Thr Leu
            35                  40                  45

Ser Cys Gly His Asn Val Ser Val Glu Glu Leu Ala Gln Thr Arg Ile
50                  55                  60

Tyr Trp Gln Lys Glu Lys Lys Met Val Leu Thr Met Met Ser Gly Asp
65                  70                  75                  80

Met Asn Ile Trp Pro Glu Tyr Lys Asn Arg Thr Ile Phe Asp Ile Thr
                85                  90                  95

Asn Asn Leu Ser Ile Val Ile Leu Ala Leu Arg Pro Ser Asp Glu Gly
                100                 105                 110

Thr Tyr Glu Cys Val Val Leu Lys Tyr Glu Lys Asp Ala Phe Lys Arg
            115                 120                 125

Glu His Leu Ala Glu Val Thr Leu Ser Val Lys Ala Asp Phe Pro Thr
            130                 135                 140

Pro Ser Ile Ser Asp Phe Glu Ile Pro Thr Ser Asn Ile Arg Arg Ile
145                 150                 155                 160

Ile Cys Ser Thr Ser Gly Gly Phe Pro Glu Pro His Leu Ser Trp Leu
                165                 170                 175

Glu Asn Gly Glu Glu Leu Asn Ala Ile Asn Thr Thr Val Ser Gln Asp
                180                 185                 190

Pro Glu Thr Glu Leu Tyr Ala Val Ser Ser Lys Leu Asp Phe Asn Met
            195                 200                 205

Thr Thr Asn His Ser Phe Met Cys Leu Ile Lys Tyr Gly His Leu Arg
210                 215                 220

Val Asn Gln Thr Phe Asn Trp Asn Thr Thr Lys Gln Glu His Phe Pro
225                 230                 235                 240

Asp Asn Leu Leu Pro Ser Trp Ala Ile Thr Leu Ile Ser Val Asn Gly
                245                 250                 255

Ile Phe Val Ile Cys Cys Leu Thr Tyr Cys Phe Ala Pro Arg Cys Arg
                260                 265                 270

Glu Arg Arg Arg Asn Glu Arg Leu Arg Arg Glu Ser Val Arg Pro Val
            275                 280                 285
```

<210> SEQ ID NO 12
<211> LENGTH: 215
<212> TYPE: PRT
<213> ORGANISM: Artificial Sequence
<220> FEATURE:
<223> OTHER INFORMATION: modified Fc

<400> SEQUENCE: 12

```
Ser His Thr Gln Pro Leu Gly Val Phe Leu Phe Pro Pro Lys Pro Lys
1               5                   10                  15

Asp Thr Leu Met Ile Ser Arg Thr Pro Glu Val Thr Cys Val Val Val
            20                  25                  30

Asp Val Ser Gln Glu Asp Pro Glu Val Gln Phe Asn Trp Tyr Val Asp
            35                  40                  45

Gly Val Glu Val His Asn Ala Lys Thr Lys Pro Arg Glu Glu Gln Phe
50                  55                  60

Asn Ser Thr Tyr Arg Val Val Ser Val Leu Thr Val Leu His Gln Asp
65                  70                  75                  80
```

Trp Leu Asn Gly Lys Glu Tyr Lys Cys Lys Val Ser Asn Lys Gly Leu
                85                  90                  95

Pro Ser Ser Ile Glu Lys Thr Ile Ser Lys Ala Lys Gly Gln Pro Arg
            100                 105                 110

Glu Pro Gln Val Tyr Thr Leu Pro Pro Ser Gln Glu Glu Met Thr Lys
        115                 120                 125

Asn Gln Val Ser Leu Thr Cys Leu Val Lys Gly Phe Tyr Pro Ser Asp
    130                 135                 140

Ile Ala Val Glu Trp Glu Ser Asn Gly Gln Pro Glu Asn Asn Tyr Lys
145                 150                 155                 160

Thr Thr Pro Pro Val Leu Asp Ser Asp Gly Ser Phe Phe Leu Tyr Ser
                165                 170                 175

Arg Leu Thr Val Asp Lys Ser Arg Trp Gln Glu Gly Asn Val Phe Ser
            180                 185                 190

Cys Ser Val Met His Glu Ala Leu His Asn His Tyr Thr Gln Lys Ser
        195                 200                 205

Leu Ser Leu Ser Leu Gly Lys
    210                 215

<210> SEQ ID NO 13
<211> LENGTH: 306
<212> TYPE: PRT
<213> ORGANISM: Artificial Sequence
<220> FEATURE:
<223> OTHER INFORMATION: mCD80

<400> SEQUENCE: 13

Met Ala Cys Asn Cys Gln Leu Met Gln Asp Thr Pro Leu Leu Lys Phe
1               5                   10                  15

Pro Cys Pro Arg Leu Ile Leu Leu Phe Val Leu Leu Ile Arg Leu Ser
            20                  25                  30

Gln Val Ser Ser Asp Val Asp Glu Gln Leu Ser Lys Ser Val Lys Asp
        35                  40                  45

Lys Val Leu Leu Pro Cys Arg Tyr Asn Ser Pro His Glu Asp Glu Ser
    50                  55                  60

Glu Asp Arg Ile Tyr Trp Gln Lys His Asp Lys Val Val Leu Ser Val
65                  70                  75                  80

Ile Ala Gly Lys Leu Lys Val Trp Pro Glu Tyr Lys Asn Arg Thr Leu
                85                  90                  95

Tyr Asp Asn Thr Thr Tyr Ser Leu Ile Ile Leu Gly Leu Val Leu Ser
            100                 105                 110

Asp Arg Gly Thr Tyr Ser Cys Val Val Gln Lys Lys Glu Arg Gly Thr
        115                 120                 125

Tyr Glu Val Lys His Leu Ala Leu Val Lys Leu Ser Ile Lys Ala Asp
    130                 135                 140

Phe Ser Thr Pro Asn Ile Thr Glu Ser Gly Asn Pro Ser Ala Asp Thr
145                 150                 155                 160

Lys Arg Ile Thr Cys Phe Ala Ser Gly Gly Phe Pro Lys Pro Arg Phe
                165                 170                 175

Ser Trp Leu Glu Asn Gly Arg Glu Leu Pro Gly Ile Asn Thr Thr Ile
            180                 185                 190

Ser Gln Asp Pro Glu Ser Glu Leu Tyr Thr Ile Ser Ser Gln Leu Asp
        195                 200                 205

Phe Asn Thr Thr Arg Asn His Thr Ile Lys Cys Leu Ile Lys Tyr Gly
    210                 215                 220

```
Asp Ala His Val Ser Glu Asp Phe Thr Trp Glu Lys Pro Pro Glu Asp
225                 230                 235                 240

Pro Pro Asp Ser Lys Asn Thr Leu Val Leu Phe Gly Ala Gly Phe Gly
            245                 250                 255

Ala Val Ile Thr Val Val Val Ile Val Val Ile Ile Lys Cys Phe Cys
                260                 265                 270

Lys His Arg Ser Cys Phe Arg Arg Asn Glu Ala Ser Arg Glu Thr Asn
            275                 280                 285

Asn Ser Leu Thr Phe Gly Pro Glu Glu Ala Leu Ala Glu Gln Thr Val
        290                 295                 300

Phe Leu
305

<210> SEQ ID NO 14
<211> LENGTH: 1848
<212> TYPE: DNA
<213> ORGANISM: Artificial Sequence
<220> FEATURE:
<223> OTHER INFORMATION: nucleotiedes coding fusion protein (mGI101)

<400> SEQUENCE: 14
atggatgcta tgctgagagg cctgtgttgc gtgctgctgc tgtgtggcgc tgtgttcgtg    60
tctccttctc acgctgtgga cgagcagctc tccaagtccg tgaaggataa ggtcctgctg   120
ccttgccggt acaactctcc tcacgaggac gagtctgagg accggatcta ctggcagaaa   180
cacgacaagg tggtgctgtc cgtgatcgcc ggaaagctga agtgtggcc tgagtacaag    240 aacaggaccc tgtacgacaa caccacctac agcctgatca tcctgggcct cgtgctgagc   300
gatagaggca cctattcttg cgtggtgcag aagaaagagc ggggcaccta cgaagtgaag   360
cacctggctc tggtcaagct gtccatcaag gccgacttca gcaccctaa catcaccgag   420 tctggcaacc cttccgccga caccaagaga atcacctgtt cgcctctgg cggcttccct   480 aagcctcggt tctcttggct ggaaaacggc agagagctgc ccggcatcaa taccaccatt   540
tctcaggacc cagagtccga gctgtacacc atctccagcc agctcgactt aacaccacc   600 agaaaccaca ccatcaagtg cctgattaag tacggcgacg cccacgtgtc cgaggacttt   660
acttgggaga accctcctga ggaccctcct gactctggat ctggcggcgg aggttctggc   720
ggaggtggaa gcggaggcgg aggatctgct gagtctaagt atggccctcc ttgtcctcca   780
tgtcctgctc cagaagctgc tggcggaccc tctgtgttcc tgtttcctcc aaagcctaag   840
gaccagctca tgatctctcg gacccctgaa gtgacctgcg tggtggtgga tgtgtctcaa   900
gaggaccctg aggtgcagtt caattggtac gtggacggcg tggaagtgca caacgccaag   960
accaagccta gaggaacagt tcaactccc acctatagag tggtgtccgt gctgaccgtg  1020
ctgcaccagg attggctgaa cggcaaagag tacaagtgca aggtgtccaa caagggcctg  1080
ccttccagca tcgaaaagac catcagcaag gctaagggcc agcctaggga accccaggtt  1140
tacaccctgc ctccaagcca agaggaaatg accaagaacc aggtgtccct gacctgcctg  1200
gtcaagggct tctaccctc cgacattgcc gtggaatggg agtccaatgg ccagcctgag  1260
aacaactaca agaccacacc tcctgtgctg gactccgacg gctccttctt tctgtactct  1320
cgcctgaccg tggacaagtc taggtggcaa gagggcaacg tgttctcctg ctctgtgctg  1380
cacgaggctc tgcacaacca ctacacccag aagtccctgt ctctgtctct ggaggtggt  1440 ggcggttctg cccctacctc cagctctacc aagaaacccc agctccagtt ggagcatctg  1500
ctgctggacc tccagatgat cctgaatggc atcaacaatt acaagaaccc caagctgacc  1560
```

```
gccatgctga ccgctaagtt ctacatgccc aagaaggcca ccgagctgaa gcacttgcag      1620
tgcctggaag aggaactgaa gcccctggaa gaagtgctga atctggccca gtccaagaac      1680
ttccacctga ggcctaggga cctgatctcc aacatcaacg tgatcgtgct ggaactgaaa      1740
ggctccgaga caaccttcat gtgcgagtac gccgacgaga cagccaccat cgtggaattt      1800
ctgaaccggt ggatcacctt ctgccagagc atcatctcca cactgacc                   1848
```

<210> SEQ ID NO 15
<211> LENGTH: 616
<212> TYPE: PRT
<213> ORGANISM: Artificial Sequence
<220> FEATURE:
<223> OTHER INFORMATION: fusion protein (mGI101)

<400> SEQUENCE: 15

```
Met Asp Ala Met Leu Arg Gly Leu Cys Cys Val Leu Leu Leu Cys Gly
1               5                   10                  15

Ala Val Phe Val Ser Pro Ser His Ala Val Asp Glu Gln Leu Ser Lys
            20                  25                  30

Ser Val Lys Asp Lys Val Leu Leu Pro Cys Arg Tyr Asn Ser Pro His
        35                  40                  45

Glu Asp Glu Ser Glu Asp Arg Ile Tyr Trp Gln Lys His Asp Lys Val
    50                  55                  60

Val Leu Ser Val Ile Ala Gly Lys Leu Lys Val Trp Pro Glu Tyr Lys
65                  70                  75                  80

Asn Arg Thr Leu Tyr Asp Asn Thr Thr Tyr Ser Leu Ile Ile Leu Gly
                85                  90                  95

Leu Val Leu Ser Asp Arg Gly Thr Tyr Ser Cys Val Val Gln Lys Lys
            100                 105                 110

Glu Arg Gly Thr Tyr Glu Val Lys His Leu Ala Leu Val Lys Leu Ser
        115                 120                 125

Ile Lys Ala Asp Phe Ser Thr Pro Asn Ile Thr Glu Ser Gly Asn Pro
    130                 135                 140

Ser Ala Asp Thr Lys Arg Ile Thr Cys Phe Ala Ser Gly Gly Phe Pro
145                 150                 155                 160

Lys Pro Arg Phe Ser Trp Leu Glu Asn Gly Arg Glu Leu Pro Gly Ile
                165                 170                 175

Asn Thr Thr Ile Ser Gln Asp Pro Glu Ser Glu Leu Tyr Thr Ile Ser
            180                 185                 190

Ser Gln Leu Asp Phe Asn Thr Thr Arg Asn His Thr Ile Lys Cys Leu
        195                 200                 205

Ile Lys Tyr Gly Asp Ala His Val Ser Glu Asp Phe Thr Trp Glu Lys
    210                 215                 220

Pro Pro Glu Asp Pro Pro Asp Ser Gly Ser Gly Gly Gly Ser Gly
225                 230                 235                 240

Gly Gly Gly Ser Gly Gly Gly Ser Ala Glu Ser Lys Tyr Gly Pro
                245                 250                 255

Pro Cys Pro Pro Cys Pro Ala Pro Glu Ala Ala Gly Gly Pro Ser Val
            260                 265                 270

Phe Leu Phe Pro Pro Lys Pro Lys Asp Gln Leu Met Ile Ser Arg Thr
        275                 280                 285

Pro Glu Val Thr Cys Val Val Val Asp Val Ser Gln Glu Asp Pro Glu
    290                 295                 300

Val Gln Phe Asn Trp Tyr Val Asp Gly Val Glu Val His Asn Ala Lys
```

Thr Lys Pro Arg Glu Glu Gln Phe Asn Ser Thr Tyr Arg Val Val Ser
305                 310                 315                 320

Val Leu Thr Val Leu His Gln Asp Trp Leu Asn Gly Lys Glu Tyr Lys
            325                 330                 335

Cys Lys Val Ser Asn Lys Gly Leu Pro Ser Ser Ile Glu Lys Thr Ile
        340                 345                 350

Ser Lys Ala Lys Gly Gln Pro Arg Glu Pro Gln Val Tyr Thr Leu Pro
    355                 360                 365

Pro Ser Gln Glu Glu Met Thr Lys Asn Gln Val Ser Leu Thr Cys Leu
370                 375                 380

Val Lys Gly Phe Tyr Pro Ser Asp Ile Ala Val Glu Trp Glu Ser Asn
                385                 390                 395                 400

Gly Gln Pro Glu Asn Asn Tyr Lys Thr Thr Pro Pro Val Leu Asp Ser
            405                 410                 415

Asp Gly Ser Phe Phe Leu Tyr Ser Arg Leu Thr Val Asp Lys Ser Arg
        420                 425                 430

Trp Gln Glu Gly Asn Val Phe Ser Cys Ser Val Leu His Glu Ala Leu
    435                 440                 445

His Asn His Tyr Thr Gln Lys Ser Leu Ser Leu Ser Leu Gly Gly Gly
450                 455                 460

Gly Gly Ser Ala Pro Thr Ser Ser Ser Thr Lys Lys Thr Gln Leu Gln
                465                 470                 475                 480

Leu Glu His Leu Leu Leu Asp Leu Gln Met Ile Leu Asn Gly Ile Asn
            485                 490                 495

Asn Tyr Lys Asn Pro Lys Leu Thr Ala Met Leu Thr Ala Lys Phe Tyr
        500                 505                 510

Met Pro Lys Lys Ala Thr Glu Leu Lys His Leu Gln Cys Leu Glu Glu
    515                 520                 525

Glu Leu Lys Pro Leu Glu Glu Val Leu Asn Leu Ala Gln Ser Lys Asn
530                 535                 540

Phe His Leu Arg Pro Arg Asp Leu Ile Ser Asn Ile Asn Val Ile Val
                545                 550                 555                 560

Leu Glu Leu Lys Gly Ser Glu Thr Thr Phe Met Cys Glu Tyr Ala Asp
            565                 570                 575

Glu Thr Ala Thr Ile Val Glu Phe Leu Asn Arg Trp Ile Thr Phe Cys
        580                 585                 590

Gln Ser Ile Ile Ser Thr Leu Thr
    595                 600

<210> SEQ ID NO 16
<211> LENGTH: 1437
<212> TYPE: DNA
<213> ORGANISM: Artificial Sequence
<220> FEATURE:
<223> OTHER INFORMATION: nucleotiedes coding fusion protein (GI101C1)

<400> SEQUENCE: 16
atggatgcta tgctgagagg cctgtgttgc gtgctgctgc tgtgtggcgc tgtgttcgtg        60
tctccttctc acgctgtgat ccacgtgacc aaagaagtga agaggtcgc cacactgtcc        120 tgcggccaca acgtttcagt ggaagaactg cccagacca ggatctactg cagaaagaa        180 aagaaaatgg tgctgaccat gatgtccggc gacatgaaca tctggcctga gtacaagaac        240
cggaccatct tcgacatcac caacaacctg tccatcgtga ttctggccct gaggccttct        300

| | |
|---|---|
| gatgagggca cctatgagtg cgtggtgctg aagtacgaga aggacgcctt caagcgcgag | 360 |
| cacctggctg aagtgacact gtccgtgaag gccgactttc ccacaccttc catctccgac | 420 |
| ttcgagatcc ctacctccaa catccggcgg atcatctgtt ctacctctgg cggctttcct | 480 |
| gagcctcacc tgtcttggct ggaaaacggc gaggaactga acgccatcaa caccaccgtg | 540 |
| tctcaggacc ccgaaaccga gctgtacgct gtgtcctcca agctggactt caacatgacc | 600 |
| accaaccaca gcttcatgtg cctgattaag tacggccacc tgagagtgaa ccagaccttc | 660 |
| aactggaaca ccaccaagca agagcacttc cctgacaatg gatctggcgg cggaggttct | 720 |
| ggcggaggtg aagcggagg cggaggatct gctgagtcta agtatggccc tccttgtcct | 780 |
| ccatgtcctg ctccagaagc tgctggcgga ccctctgtgt tcctgtttcc tccaaagcct | 840 |
| aaggaccagc tcatgatctc tcggacaccc gaagtgacct gcgtggtggt ggatgtgtct | 900 |
| caagaggacc ctgaggtgca gttcaattgg tacgtggacg gcgtggaagt gcacaacgcc | 960 |
| aagaccaagc ctagagagga acagttcaac tccacctaca gagtggtgtc cgtgctgacc | 1020 |
| gtgctgcacc aggattggct gaacggcaaa gagtacaagt gcaaggtgtc caacaagggc | 1080 |
| ctgcccttcca gcatcgaaaa gaccatctcc aaggctaagg gccagcctag ggaaccccag | 1140 |
| gtttacaccc tgcctccaag ccaagaggaa atgaccaaga accaggtgtc cctgacctgc | 1200 |
| ctggtcaagg gcttctaccc ttccgacatt gccgtggaat gggagtccaa tggccagcct | 1260 |
| gagaacaact acaagaccac acctcctgtg ctggactccg acggctcctt ctttctgtac | 1320 |
| tctcgcctga ccgtggacaa gtctaggtgg caagagggca acgtgttctc ctgctctgtg | 1380 |
| ctgcacgagg ccctgcacaa tcactacacc cagaagtccc tgtctctgtc cctgggc | 1437 |

<210> SEQ ID NO 17
<211> LENGTH: 454
<212> TYPE: PRT
<213> ORGANISM: Artificial Sequence
<220> FEATURE:
<223> OTHER INFORMATION: fusion protein (GI101C1)

<400> SEQUENCE: 17

Val Ile His Val Thr Lys Glu Val Lys Glu Val Ala Thr Leu Ser Cys
1               5                   10                  15

Gly His Asn Val Ser Val Glu Glu Leu Ala Gln Thr Arg Ile Tyr Trp
                20                  25                  30

Gln Lys Glu Lys Lys Met Val Leu Thr Met Met Ser Gly Asp Met Asn
            35                  40                  45

Ile Trp Pro Glu Tyr Lys Asn Arg Thr Ile Phe Asp Ile Thr Asn Asn
        50                  55                  60

Leu Ser Ile Val Ile Leu Ala Leu Arg Pro Ser Asp Glu Gly Thr Tyr
65                  70                  75                  80

Glu Cys Val Val Leu Lys Tyr Glu Lys Asp Ala Phe Lys Arg Glu His
                85                  90                  95

Leu Ala Glu Val Thr Leu Ser Val Lys Ala Asp Phe Pro Thr Pro Ser
            100                 105                 110

Ile Ser Asp Phe Glu Ile Pro Thr Ser Asn Ile Arg Arg Ile Ile Cys
        115                 120                 125

Ser Thr Ser Gly Gly Phe Pro Glu Pro His Leu Ser Trp Leu Glu Asn
    130                 135                 140

Gly Glu Glu Leu Asn Ala Ile Asn Thr Val Ser Gln Asp Pro Glu
145                 150                 155                 160

Thr Glu Leu Tyr Ala Val Ser Ser Lys Leu Asp Phe Asn Met Thr Thr 165                 170                 175
Asn His Ser Phe Met Cys Leu Ile Lys Tyr Gly His Leu Arg Val Asn
            180                 185                 190

Gln Thr Phe Asn Trp Asn Thr Thr Lys Gln Glu His Phe Pro Asp Asn
        195                 200                 205

Gly Ser Gly Gly Gly Ser Gly Gly Gly Ser Gly Gly Gly Gly
    210                 215                 220

Ser Ala Glu Ser Lys Tyr Gly Pro Pro Cys Pro Pro Cys Pro Ala Pro
225                 230                 235                 240

Glu Ala Ala Gly Gly Pro Ser Val Phe Leu Phe Pro Pro Lys Pro Lys
            245                 250                 255

Asp Gln Leu Met Ile Ser Arg Thr Pro Glu Val Thr Cys Val Val Val
        260                 265                 270

Asp Val Ser Gln Glu Asp Pro Glu Val Gln Phe Asn Trp Tyr Val Asp
    275                 280                 285

Gly Val Glu Val His Asn Ala Lys Thr Lys Pro Arg Glu Glu Gln Phe
290                 295                 300

Asn Ser Thr Tyr Arg Val Val Ser Val Leu Thr Val Leu His Gln Asp
305                 310                 315                 320

Trp Leu Asn Gly Lys Glu Tyr Lys Cys Lys Val Ser Asn Lys Gly Leu
            325                 330                 335

Pro Ser Ser Ile Glu Lys Thr Ile Ser Lys Ala Lys Gly Gln Pro Arg
        340                 345                 350

Glu Pro Gln Val Tyr Thr Leu Pro Pro Ser Gln Glu Glu Met Thr Lys
    355                 360                 365

Asn Gln Val Ser Leu Thr Cys Leu Val Lys Gly Phe Tyr Pro Ser Asp
370                 375                 380

Ile Ala Val Glu Trp Glu Ser Asn Gly Gln Pro Glu Asn Asn Tyr Lys
385                 390                 395                 400

Thr Thr Pro Pro Val Leu Asp Ser Asp Gly Ser Phe Phe Leu Tyr Ser
            405                 410                 415

Arg Leu Thr Val Asp Lys Ser Arg Trp Gln Glu Gly Asn Val Phe Ser
        420                 425                 430

Cys Ser Val Leu His Glu Ala Leu His Asn His Tyr Thr Gln Lys Ser
    435                 440                 445

Leu Ser Leu Ser Leu Gly
    450

<210> SEQ ID NO 18
<211> LENGTH: 1176
<212> TYPE: DNA
<213> ORGANISM: Artificial Sequence
<220> FEATURE:
<223> OTHER INFORMATION: nucleotiedes coding fusion protein (GI101C2)

<400> SEQUENCE: 18
atggatgcta tgctgagagg cctgtgttgc gtgctgctgc tgtgtggcgc tgtgttcgtg      60
tctccatctc acgccgctga gtctaagtac ggccctcctt gtcctccatg tcctgctcca     120
gaagctgctg gcggaccctc tgtgttcctg tttcctccaa agcctaagga ccagctcatg     180
atctctcgga cccctgaagt gacctgcgtg gtggtggatg tgtctcaaga ggaccctgag     240
gtgcagttca attggtacgt ggacggcgtg gaagtgcaca acgccaagac caagcctaga     300
gaggaacagt tcaactccac ctacagagtg gtgtccgtgc tgaccgtgct gcaccaggat     360
tggctgaacg gcaaagagta caagtgcaag gtgtccaaca agggcctgcc ttccagcatc     420

```
gaaaagacca tctccaaggc taagggccag cctagggaac cccaggttta caccctgcct    480
ccaagccaag aggaaatgac caagaaccag gtgtccctga cctgcctggt caagggcttc    540 taccccttccg acattgccgt ggaatgggag tccaatggcc agcctgagaa caactacaag    600
accacacctc ctgtgctgga ctccgacggc tccttctttc tgtactctcg cctgaccgtg    660
gacaagtcta ggtggcaaga gggcaacgtg ttctcctgct ctgtgctgca cgaggccctg    720
cacaatcact acacccagaa gtccctgtct ctgtctcttg gcggaggcgg aggatctgct    780
cctacctcca gctccaccaa gaaaacccag ctccagttgg agcatctgct gctggacctc    840
cagatgatcc tgaatggcat caacaattac aagaacccca gctgaccgc catgctgacc    900 gctaagttct acatgcccaa gaaggccacc gagctgaagc acctccagtg cctggaagag    960
gaactgaagc ccctggaaga agtgctgaat ctggcccagt ccaagaactt ccacctgagg    1020
cctagggacc tgatctccaa catcaacgtg atcgtgctgg aactgaaagg ctccgagaca    1080
accttcatgt gcgagtacgc cgacgagaca gccaccatcg tggaatttct gaaccggtgg    1140
atcaccttct gccagtccat catctccaca ctgacc                              1176
```

<210> SEQ ID NO 19
<211> LENGTH: 367
<212> TYPE: PRT
<213> ORGANISM: Artificial Sequence
<220> FEATURE:
<223> OTHER INFORMATION: fusion protein (GI101C2)

<400> SEQUENCE: 19

```
Ala Glu Ser Lys Tyr Gly Pro Pro Cys Pro Pro Cys Pro Ala Pro Glu
1               5                   10                  15

Ala Ala Gly Gly Pro Ser Val Phe Leu Phe Pro Pro Lys Pro Lys Asp
            20                  25                  30

Gln Leu Met Ile Ser Arg Thr Pro Glu Val Thr Cys Val Val Val Asp
        35                  40                  45

Val Ser Gln Glu Asp Pro Glu Val Gln Phe Asn Trp Tyr Val Asp Gly
    50                  55                  60

Val Glu Val His Asn Ala Lys Thr Lys Pro Arg Glu Glu Gln Phe Asn
65                  70                  75                  80

Ser Thr Tyr Arg Val Val Ser Val Leu Thr Val Leu His Gln Asp Trp
                85                  90                  95

Leu Asn Gly Lys Glu Tyr Lys Cys Lys Val Ser Asn Lys Gly Leu Pro
            100                 105                 110

Ser Ser Ile Glu Lys Thr Ile Ser Lys Ala Lys Gly Gln Pro Arg Glu
        115                 120                 125

Pro Gln Val Tyr Thr Leu Pro Pro Ser Gln Glu Glu Met Thr Lys Asn
    130                 135                 140

Gln Val Ser Leu Thr Cys Leu Val Lys Gly Phe Tyr Pro Ser Asp Ile
145                 150                 155                 160

Ala Val Glu Trp Glu Ser Asn Gly Gln Pro Glu Asn Asn Tyr Lys Thr
                165                 170                 175

Thr Pro Pro Val Leu Asp Ser Asp Gly Ser Phe Phe Leu Tyr Ser Arg
            180                 185                 190

Leu Thr Val Asp Lys Ser Arg Trp Gln Glu Gly Asn Val Phe Ser Cys
        195                 200                 205

Ser Val Leu His Glu Ala Leu His Asn His Tyr Thr Gln Lys Ser Leu
    210                 215                 220
```

Ser Leu Ser Leu Gly Gly Gly Gly Ser Ala Pro Thr Ser Ser Ser
225                 230                 235                 240

Thr Lys Lys Thr Gln Leu Gln Leu Glu His Leu Leu Asp Leu Gln
            245                 250                 255

Met Ile Leu Asn Gly Ile Asn Asn Tyr Lys Asn Pro Lys Leu Thr Ala
        260                 265                 270

Met Leu Thr Ala Lys Phe Tyr Met Pro Lys Lys Ala Thr Glu Leu Lys
        275                 280                 285

His Leu Gln Cys Leu Glu Glu Leu Lys Pro Leu Glu Glu Val Leu
        290                 295                 300

Asn Leu Ala Gln Ser Lys Asn Phe His Leu Arg Pro Arg Asp Leu Ile
305                 310                 315                 320

Ser Asn Ile Asn Val Ile Val Leu Glu Leu Lys Gly Ser Glu Thr Thr
                325                 330                 335

Phe Met Cys Glu Tyr Ala Asp Glu Thr Ala Thr Ile Val Glu Phe Leu
            340                 345                 350

Asn Arg Trp Ile Thr Phe Cys Gln Ser Ile Ile Ser Thr Leu Thr
        355                 360                 365

<210> SEQ ID NO 20
<211> LENGTH: 1434
<212> TYPE: DNA
<213> ORGANISM: Artificial Sequence
<220> FEATURE:
<223> OTHER INFORMATION: nucleotiedes coding fusion protein (mGI101C1)

<400> SEQUENCE: 20
atggatgcta tgctgagagg cctgtgttgc gtgctgctgc tgtgtggcgc tgtgttcgtg      60
tctccttctc acgctgtgga cgagcagctc tccaagtccg tgaaggataa ggtcctgctg     120
ccttgccggt acaactctcc tcacgaggac gagtctgagg accggatcta ctggcagaaa     180
cacgacaagg tggtgctgtc cgtgatcgcc ggaaagctga agtgtggcc tgagtacaag      240 aacaggaccc tgtacgacaa caccacctac agcctgatca tcctgggcct cgtgctgagc     300
gatagaggca cctattcttg cgtggtgcag aagaaagagc ggggcaccta cgaagtgaag     360
cacctggctc tggtcaagct gtccatcaag gccgacttca gcacccctaa catcaccgag     420
tctggcaacc cttccgccga caccaagaga atcacctgtt cgcctctgg cggcttccct     480 aagcctcggt tctcttggct ggaaaacggc agagagctgc ccggcatcaa taccaccatt     540
tctcaggacc cagagtccga gctgtacacc atctccagcc agctcgactt aacaccacc      600 agaaaccaca ccatcaagtg cctgattaag tacggcgacg cccacgtgtc cgaggacttt     660
acttgggaga aacctcctga ggaccctcct gactctggat ctggcggcgg aggttctggc     720
ggaggtggaa gcggaggcgg aggatctgct gagtctaagt atggccctcc ttgtcctcca     780
tgtcctgctc agaagctgc tggcggaccc tctgtgttcc tgtttcctcc aaagcctaag     840
gaccagctca tgatctctcg gacccctgaa gtgacctgcg tggtggtgga tgtgtctcaa     900
gaggaccctg aggtgcagtt caattggtac gtggacggcg tggaagtgca caacgccaag     960
accaagccta gaggaacagt tcaactccc acctatagag tggtgtccgt gctgaccgtg    1020
ctgcaccagg attggctgaa cggcaaagag tacaagtgca aggtgtccaa caagggcctg    1080
ccttccagca tcgaaaagac catcagcaag gctaagggcc agcctaggga accccaggtt    1140
tacaccctgc ctccaagcca agaggaaatg accaagaacc aggtgtccct gacctgcctg    1200
gtcaagggct ctaccccttc cgacattgcc gtggaatggg agtccaatgg ccagcctgag    1260

```
aacaactaca agaccacacc tcctgtgctg gactccgacg gctccttctt tctgtactct    1320
cgcctgaccg tggacaagtc taggtggcaa gagggcaacg tgttctcctg ctctgtgctg    1380
cacgaggctc tgcacaacca ctacacccag aagtccctgt ctctgtccct gggc          1434
```

<210> SEQ ID NO 21
<211> LENGTH: 478
<212> TYPE: PRT
<213> ORGANISM: Artificial Sequence
<220> FEATURE:
<223> OTHER INFORMATION: fusion protein (mGI101C1)

<400> SEQUENCE: 21

```
Met Asp Ala Met Leu Arg Gly Leu Cys Cys Val Leu Leu Cys Gly
1               5                   10                  15

Ala Val Phe Val Ser Pro Ser His Ala Val Asp Glu Gln Leu Ser Lys
            20                  25                  30

Ser Val Lys Asp Lys Val Leu Leu Pro Cys Arg Tyr Asn Ser Pro His
        35                  40                  45

Glu Asp Glu Ser Glu Asp Arg Ile Tyr Trp Gln Lys His Asp Lys Val
    50                  55                  60

Val Leu Ser Val Ile Ala Gly Lys Leu Lys Val Trp Pro Glu Tyr Lys
65                  70                  75                  80

Asn Arg Thr Leu Tyr Asp Asn Thr Thr Tyr Ser Leu Ile Ile Leu Gly
                85                  90                  95

Leu Val Leu Ser Asp Arg Gly Thr Tyr Ser Cys Val Gln Lys Lys
            100                 105                 110

Glu Arg Gly Thr Tyr Glu Val Lys His Leu Ala Leu Val Lys Leu Ser
        115                 120                 125

Ile Lys Ala Asp Phe Ser Thr Pro Asn Ile Thr Glu Ser Gly Asn Pro
    130                 135                 140

Ser Ala Asp Thr Lys Arg Ile Thr Cys Phe Ala Ser Gly Gly Phe Pro
145                 150                 155                 160

Lys Pro Arg Phe Ser Trp Leu Glu Asn Gly Arg Glu Leu Pro Gly Ile
                165                 170                 175

Asn Thr Thr Ile Ser Gln Asp Pro Glu Ser Glu Leu Tyr Thr Ile Ser
            180                 185                 190

Ser Gln Leu Asp Phe Asn Thr Thr Arg Asn His Thr Ile Lys Cys Leu
        195                 200                 205

Ile Lys Tyr Gly Asp Ala His Val Ser Glu Asp Phe Thr Trp Glu Lys
    210                 215                 220

Pro Pro Glu Asp Pro Pro Asp Ser Gly Ser Gly Gly Gly Ser Gly
225                 230                 235                 240

Gly Gly Gly Ser Gly Gly Gly Ser Ala Glu Ser Lys Tyr Gly Pro
                245                 250                 255

Pro Cys Pro Pro Cys Pro Ala Pro Glu Ala Ala Gly Gly Pro Ser Val
            260                 265                 270

Phe Leu Phe Pro Pro Lys Pro Lys Asp Gln Leu Met Ile Ser Arg Thr
        275                 280                 285

Pro Glu Val Thr Cys Val Val Asp Val Ser Gln Glu Asp Pro Glu
    290                 295                 300

Val Gln Phe Asn Trp Tyr Val Asp Gly Val Glu Val His Asn Ala Lys
305                 310                 315                 320

Thr Lys Pro Arg Glu Glu Gln Phe Asn Ser Thr Tyr Arg Val Val Ser
                325                 330                 335
```

Val Leu Thr Val Leu His Gln Asp Trp Leu Asn Gly Lys Glu Tyr Lys
            340                 345                 350

Cys Lys Val Ser Asn Lys Gly Leu Pro Ser Ser Ile Glu Lys Thr Ile
            355                 360                 365

Ser Lys Ala Lys Gly Gln Pro Arg Glu Pro Gln Val Tyr Thr Leu Pro
370                 375                 380

Pro Ser Gln Glu Glu Met Thr Lys Asn Gln Val Ser Leu Thr Cys Leu
385                 390                 395                 400

Val Lys Gly Phe Tyr Pro Ser Asp Ile Ala Val Glu Trp Glu Ser Asn
            405                 410                 415

Gly Gln Pro Glu Asn Asn Tyr Lys Thr Thr Pro Pro Val Leu Asp Ser
            420                 425                 430

Asp Gly Ser Phe Phe Leu Tyr Ser Arg Leu Thr Val Asp Lys Ser Arg
            435                 440                 445

Trp Gln Glu Gly Asn Val Phe Ser Cys Ser Val Leu His Glu Ala Leu
            450                 455                 460

His Asn His Tyr Thr Gln Lys Ser Leu Ser Leu Ser Leu Gly
465                 470                 475

<210> SEQ ID NO 22
<211> LENGTH: 133
<212> TYPE: PRT
<213> ORGANISM: Artificial Sequence
<220> FEATURE:
<223> OTHER INFORMATION: variants of IL-2 (3M, M45)

<400> SEQUENCE: 22

Ala Pro Thr Ser Ser Ser Thr Lys Lys Thr Gln Leu Gln Leu Glu His
1               5                   10                  15

Leu Leu Leu Asp Leu Gln Met Ile Leu Asn Gly Ile Asn Asn Tyr Lys
            20                  25                  30

Asn Pro Lys Leu Thr Ala Met Leu Thr Ala Lys Phe Ala Met Pro Lys
            35                  40                  45

Lys Ala Thr Glu Leu Lys His Leu Gln Cys Leu Glu Glu Glu Leu Lys
50                  55                  60

Pro Leu Glu Glu Val Leu Asn Leu Ala Gln Ser Lys Asn Phe His Leu
65                  70                  75                  80

Arg Pro Arg Asp Leu Ile Ser Asn Ile Asn Val Ile Val Leu Glu Leu
            85                  90                  95

Lys Gly Ser Glu Thr Thr Phe Met Cys Glu Tyr Ala Asp Glu Thr Ala
            100                 105                 110

Thr Ile Val Glu Phe Leu Asn Arg Trp Ile Thr Phe Cys Gln Ser Ile
            115                 120                 125

Ile Ser Thr Leu Thr
        130

<210> SEQ ID NO 23
<211> LENGTH: 133
<212> TYPE: PRT
<213> ORGANISM: Artificial Sequence
<220> FEATURE:
<223> OTHER INFORMATION: variants of IL-2 (3M, M61)

<400> SEQUENCE: 23

Ala Pro Thr Ser Ser Ser Thr Lys Lys Thr Gln Leu Gln Leu Glu His
1               5                   10                  15

Leu Leu Leu Asp Leu Gln Met Ile Leu Asn Gly Ile Asn Asn Tyr Lys
            20                  25                  30

Asn Pro Lys Leu Thr Ala Met Leu Thr Ala Lys Phe Tyr Met Pro Lys
            35                  40                  45

Lys Ala Thr Glu Leu Lys His Leu Gln Cys Leu Glu Arg Glu Leu Lys
        50                  55                  60

Pro Leu Glu Glu Val Leu Asn Leu Ala Gln Ser Lys Asn Phe His Leu
65                  70                  75                  80

Arg Pro Arg Asp Leu Ile Ser Asn Ile Asn Val Ile Val Leu Glu Leu
                85                  90                  95

Lys Gly Ser Glu Thr Thr Phe Met Cys Glu Tyr Ala Asp Glu Thr Ala
            100                 105                 110

Thr Ile Val Glu Phe Leu Asn Arg Trp Ile Thr Phe Cys Gln Ser Ile
            115                 120                 125

Ile Ser Thr Leu Thr
        130

<210> SEQ ID NO 24
<211> LENGTH: 133
<212> TYPE: PRT
<213> ORGANISM: Artificial Sequence
<220> FEATURE:
<223> OTHER INFORMATION: variants of IL-2 (3M, M72)

<400> SEQUENCE: 24

Ala Pro Thr Ser Ser Ser Thr Lys Lys Thr Gln Leu Gln Leu Glu His
1               5                   10                  15

Leu Leu Leu Asp Leu Gln Met Ile Leu Asn Gly Ile Asn Asn Tyr Lys
            20                  25                  30

Asn Pro Lys Leu Thr Ala Met Leu Thr Ala Lys Phe Tyr Met Pro Lys
            35                  40                  45

Lys Ala Thr Glu Leu Lys His Leu Gln Cys Leu Glu Glu Glu Leu Lys
        50                  55                  60

Pro Leu Glu Glu Val Leu Asn Gly Ala Gln Ser Lys Asn Phe His Leu
65                  70                  75                  80

Arg Pro Arg Asp Leu Ile Ser Asn Ile Asn Val Ile Val Leu Glu Leu
                85                  90                  95

Lys Gly Ser Glu Thr Thr Phe Met Cys Glu Tyr Ala Asp Glu Thr Ala
            100                 105                 110

Thr Ile Val Glu Phe Leu Asn Arg Trp Ile Thr Phe Cys Gln Ser Ile
            115                 120                 125

Ile Ser Thr Leu Thr
        130

<210> SEQ ID NO 25
<211> LENGTH: 1851
<212> TYPE: DNA
<213> ORGANISM: Artificial Sequence
<220> FEATURE:
<223> OTHER INFORMATION: nucleotiedes coding fusion protein (GI102-M45)

<400> SEQUENCE: 25
atggatgcta tgctgagagg cctgtgttgc gtgctgctgc tgtgtggcgc tgtgttcgtg      60
tctccttctc acgctgtgat ccacgtgacc aaagaagtga agaggtcgc cacactgtcc      120 tgcggccaca acgtttcagt ggaagaactg gcccagacca ggatctactg cagaaagaa      180 aagaaaatgg tgctgaccat gatgtccggc gacatgaaca tctggcctga gtacaagaac      240
cggaccatct tcgacatcac caacaacctg tccatcgtga ttctggccct gaggccttct      300

-continued

```
gatgagggca cctatgagtg cgtggtgctg aagtacgaga aggacgcctt caagcgcgag    360
cacctggctg aagtgacact gtccgtgaag gccgactttc ccacaccttc catctccgac    420
ttcgagatcc ctacctccaa catccggcgg atcatctgtt ctacctctgg cggctttcct    480
gagcctcacc tgtcttggct ggaaaacggc gaggaactga acgccatcaa caccaccgtg    540
tctcaggacc ccgaaaccga gctgtacgct gtgtcctcca gctggacttc aacatgacc    600 accaaccaca gcttcatgtg cctgattaag tacggccacc tgagagtgaa ccagaccttc    660
aactggaaca ccaccaagca agagcacttc cctgacaatg gatctggcgg cggaggttct    720
ggcggaggtg aagcggagg cggaggatct gctgagtcta agtatggccc tccttgtcct    780
ccatgtcctg ctccagaagc tgctggcgga ccctctgtgt tcctgtttcc tccaaagcct    840
aaggaccagc tcatgatctc tcggacaccc gaagtgacct gcgtggtggt ggatgtgtct    900
caagaggacc ctgaggtgca gttcaattgg tacgtggacg gcgtggaagt gcacaacgcc    960
aagaccaagc ctagagagga acagttcaac tccacctaca gagtggtgtc cgtgctgacc   1020
gtgctgcacc aggattggct gaacggcaaa gagtacaagt gcaaggtgtc caacaagggc   1080
ctgcccttcc agatcgaaaa gaccatctcc aaggctaagg gccagcctag gaaccccag    1140 gtttacaccc tgcctccaag ccaagaggaa atgaccaaga accaggtgtc cctgacctgc   1200
ctggtcaagg gcttctaccc ttccgacatt gccgtggaat gggagtccaa tggccagcct   1260
gagaacaact acaagaccac acctcctgtg ctggactccg acggctcctt ctttctgtac   1320
tctcgcctga ccgtggacaa gtctagatgg caagagggca acgtgttctc ctgctctgtg   1380
ctgcacgagg ccctgcacaa tcactacacc cagaagtccc tgtctctgtc tcttggaggt   1440
ggtggcggtt ctgccctac cagctcctct accaagaaaa cccagctcca gttggagcat   1500
ctgctgctgg acctccagat gattctgaac gggatcaaca actataagaa ccccaagctg   1560
accgccatgc tgaccgctaa gttcgccatg cccaagaagg ccaccgagct gaagcacctc   1620
cagtgcctga agaagaaact gaagcccctg aagaggtgc tgaatctggc ccagtccaag   1680
aacttccacc tgaggccacg ggacctgatc agcaacatca cgtgatcgt gctggaactg   1740 aagggctccg agacaacctt tatgtgcgag tacgccgacg agacagccac catcgtggaa   1800
tttctgaacc ggtggatcac cttctgccag agcatcatct ccacactgac c            1851
```

<210> SEQ ID NO 26
<211> LENGTH: 592
<212> TYPE: PRT
<213> ORGANISM: Artificial Sequence
<220> FEATURE:
<223> OTHER INFORMATION: fusion protein (GI102-M45)

<400> SEQUENCE: 26

```
Val Ile His Val Thr Lys Glu Val Lys Glu Val Ala Thr Leu Ser Cys
1               5                   10                  15

Gly His Asn Val Ser Val Glu Glu Leu Ala Gln Thr Arg Ile Tyr Trp
            20                  25                  30

Gln Lys Glu Lys Lys Met Val Leu Thr Met Met Ser Gly Asp Met Asn
        35                  40                  45

Ile Trp Pro Glu Tyr Lys Asn Arg Thr Ile Phe Asp Ile Thr Asn Asn
    50                  55                  60

Leu Ser Ile Val Ile Leu Ala Leu Arg Pro Ser Asp Glu Gly Thr Tyr
65                  70                  75                  80

Glu Cys Val Val Leu Lys Tyr Glu Lys Asp Ala Phe Lys Arg Glu His
                85                  90                  95
```

-continued

```
Leu Ala Glu Val Thr Leu Ser Val Lys Ala Asp Phe Pro Thr Pro Ser
            100                 105                 110
Ile Ser Asp Phe Glu Ile Pro Thr Ser Asn Ile Arg Ile Ile Cys
            115                 120                 125
Ser Thr Ser Gly Gly Phe Pro Glu Pro His Leu Ser Trp Leu Glu Asn
130                 135                 140
Gly Glu Glu Leu Asn Ala Ile Asn Thr Thr Val Ser Gln Asp Pro Glu
145                 150                 155                 160
Thr Glu Leu Tyr Ala Val Ser Ser Lys Leu Asp Phe Asn Met Thr Thr
                165                 170                 175
Asn His Ser Phe Met Cys Leu Ile Lys Tyr Gly His Leu Arg Val Asn
            180                 185                 190
Gln Thr Phe Asn Trp Asn Thr Thr Lys Gln Glu His Phe Pro Asp Asn
            195                 200                 205
Gly Ser Gly Gly Gly Ser Gly Gly Gly Ser Gly Gly Gly Gly
210                 215                 220
Ser Ala Glu Ser Lys Tyr Gly Pro Pro Cys Pro Pro Cys Pro Ala Pro
225                 230                 235                 240
Glu Ala Ala Gly Gly Pro Ser Val Phe Leu Phe Pro Pro Lys Pro Lys
                245                 250                 255
Asp Gln Leu Met Ile Ser Arg Thr Pro Glu Val Thr Cys Val Val Val
            260                 265                 270
Asp Val Ser Gln Glu Asp Pro Glu Val Gln Phe Asn Trp Tyr Val Asp
            275                 280                 285
Gly Val Glu Val His Asn Ala Lys Thr Lys Pro Arg Glu Glu Gln Phe
            290                 295                 300
Asn Ser Thr Tyr Arg Val Val Ser Val Leu Thr Val Leu His Gln Asp
305                 310                 315                 320
Trp Leu Asn Gly Lys Glu Tyr Lys Cys Lys Val Ser Asn Lys Gly Leu
                325                 330                 335
Pro Ser Ser Ile Glu Lys Thr Ile Ser Lys Ala Lys Gly Gln Pro Arg
            340                 345                 350
Glu Pro Gln Val Tyr Thr Leu Pro Pro Ser Gln Glu Glu Met Thr Lys
            355                 360                 365
Asn Gln Val Ser Leu Thr Cys Leu Val Lys Gly Phe Tyr Pro Ser Asp
            370                 375                 380
Ile Ala Val Glu Trp Glu Ser Asn Gly Gln Pro Glu Asn Asn Tyr Lys
385                 390                 395                 400
Thr Thr Pro Pro Val Leu Asp Ser Asp Gly Ser Phe Phe Leu Tyr Ser
                405                 410                 415
Arg Leu Thr Val Asp Lys Ser Arg Trp Gln Glu Gly Asn Val Phe Ser
            420                 425                 430
Cys Ser Val Leu His Glu Ala Leu His Asn His Tyr Thr Gln Lys Ser
            435                 440                 445
Leu Ser Leu Ser Leu Gly Gly Gly Gly Ser Ala Pro Thr Ser Ser
            450                 455                 460
Ser Thr Lys Lys Thr Gln Leu Gln Leu Glu His Leu Leu Asp Leu
465                 470                 475                 480
Gln Met Ile Leu Asn Gly Ile Asn Asn Tyr Lys Asn Pro Lys Leu Thr
                485                 490                 495
Ala Met Leu Thr Ala Lys Phe Ala Met Pro Lys Lys Ala Thr Glu Leu
            500                 505                 510
```

| | | | | | | | | | | | |
|---|---|---|---|---|---|---|---|---|---|---|---|
|Lys|His|Leu|Gln|Cys|Leu|Glu|Glu|Leu|Lys|Pro|Leu|Glu|Glu|Val|
| | |515| | |520| | | |525| | | | | |

Leu Asn Leu Ala Gln Ser Lys Asn Phe His Leu Arg Pro Arg Asp Leu
              530                 535                 540

Ile Ser Asn Ile Asn Val Ile Val Leu Glu Leu Lys Gly Ser Glu Thr
545                 550                 555                 560

Thr Phe Met Cys Glu Tyr Ala Asp Glu Thr Ala Thr Ile Val Glu Phe
              565                 570                 575

Leu Asn Arg Trp Ile Thr Phe Cys Gln Ser Ile Ile Ser Thr Leu Thr
              580                 585                 590

<210> SEQ ID NO 27
<211> LENGTH: 1851
<212> TYPE: DNA
<213> ORGANISM: Artificial Sequence
<220> FEATURE:
<223> OTHER INFORMATION: nucleotiedes coding fusion protein (GI102-M61)

<400> SEQUENCE: 27

```
atggatgcta tgctgagagg cctgtgttgc gtgctgctgc tgtgtggcgc tgtgttcgtg      60
tctccttctc acgctgtgat ccacgtgacc aaagaagtga agaggtcgc cacactgtcc     120 tgcggccaca acgtttcagt ggaagaactg gcccagacca ggatctactg cagaaagaa     180 aagaaaatgg tgctgaccat gatgtccggc gacatgaaca tctggcctga gtacaagaac     240
cggaccatct tcgacatcac caacaacctg tccatcgtga ttctggccct gaggccttct     300
gatgagggca cctatgagtg cgtggtgctg aagtacgaga aggacgcctt caagcgcgag     360
cacctggctg aagtgacact gtccgtgaag gccgactttc ccacaccttc catctccgac     420
ttcgagatcc ctacctccaa catccggcgg atcatctgtt ctacctctgg cggctttcct     480
gagcctcacc tgtcttggct ggaaaacggc gaggaactga acgccatcaa caccaccgtg     540
tctcaggacc ccgaaaccga gctgtacgct gtgtcctcca gctggacttt caacatgacc     600
accaaccaca gcttcatgtg cctgattaag tacggccacc tgagagtgaa ccagaccttc     660
aactggaaca ccaccaagca agagcacttc cctgacaatg gatctggcgg cggaggttct     720
ggcggaggtg gaagcggagg cggaggatct gctgagtcta gtatggccc tccttgtcct     780 ccatgtcctg ctccagaagc tgctggcgga ccctctgtgt tcctgttccc tccaaagcct     840
aaggaccagc tcatgatctc tcggacaccc gaagtgacct gcgtggtggt ggatgtgtct     900
caagaggacc ctgaggtgca gttcaattgg tacgtggacg gcgtggaagt gcacaacgcc     960
aagaccaagc tagagagga acagttcaac tccacctaca gtggtgtc cgtgctgacc    1020 gtgctgcacc aggattggct gaacggcaaa gagtacaagt gcaaggtgtc caacaagggc    1080
ctgccttcca gcatcgaaaa gaccatctcc aaggctaagg ccagcctag gaacccccag    1140 gtttacaccc tgcctccaag ccaagaggaa atgaccaaga accaggtgtc cctgacctgc    1200
ctggtcaagg gcttctaccc ttccgacatt gccgtggaat gggagtccaa tggccagcct    1260
gagaacaact acaagaccac acctcctgtg ctggactccg acggctcctt ctttctgtac    1320
tctcgcctga ccgtggacaa gtctagatgg caagagggca acgtgttctc ctgctctgtg    1380
ctgcacgagg ccctgcacaa tcactacacc cagaagtccc tgtctctgtc tcttggaggt    1440
ggtggcggtt ctgcccctac cagctcctct accaagaaaa cccagctcca gttggagcat    1500
ctgctgctgg acctccagat gattctgaac gggatcaaca actataagaa ccccaagctg    1560
accgccatgc tgaccgctaa gttctacatg cccaagaagg ccaccgagct gaagcacctc    1620
```

-continued

```
cagtgcctgg aaagggaact gaagcccctg gaagaggtgc tgaatctggc ccagtccaag    1680
aacttccacc tgaggccacg ggacctgatc agcaacatca acgtgatcgt gctggaactg    1740
aagggctccg agacaacctt tatgtgcgag tacgccgacg agacagccac catcgtggaa    1800
tttctgaacc ggtggatcac cttctgccag agcatcatct ccacactgac c             1851
```

<210> SEQ ID NO 28
<211> LENGTH: 592
<212> TYPE: PRT
<213> ORGANISM: Artificial Sequence
<220> FEATURE:
<223> OTHER INFORMATION: fusion protein (GI102-M61)

<400> SEQUENCE: 28

```
Val Ile His Val Thr Lys Glu Val Lys Glu Val Ala Thr Leu Ser Cys
1               5                   10                  15

Gly His Asn Val Ser Val Glu Glu Leu Ala Gln Thr Arg Ile Tyr Trp
            20                  25                  30

Gln Lys Glu Lys Lys Met Val Leu Thr Met Met Ser Gly Asp Met Asn
        35                  40                  45

Ile Trp Pro Glu Tyr Lys Asn Arg Thr Ile Phe Asp Ile Thr Asn Asn
    50                  55                  60

Leu Ser Ile Val Ile Leu Ala Leu Arg Pro Ser Asp Glu Gly Thr Tyr
65                  70                  75                  80

Glu Cys Val Val Leu Lys Tyr Glu Lys Asp Ala Phe Lys Arg Glu His
                85                  90                  95

Leu Ala Glu Val Thr Leu Ser Val Lys Ala Asp Phe Pro Thr Pro Ser
            100                 105                 110

Ile Ser Asp Phe Glu Ile Pro Thr Ser Asn Ile Arg Arg Ile Ile Cys
        115                 120                 125

Ser Thr Ser Gly Gly Phe Pro Glu Pro His Leu Ser Trp Leu Glu Asn
130                 135                 140

Gly Glu Glu Leu Asn Ala Ile Asn Thr Thr Val Ser Gln Asp Pro Glu
145                 150                 155                 160

Thr Glu Leu Tyr Ala Val Ser Ser Lys Leu Asp Phe Asn Met Thr Thr
                165                 170                 175

Asn His Ser Phe Met Cys Leu Ile Lys Tyr Gly His Leu Arg Val Asn
            180                 185                 190

Gln Thr Phe Asn Trp Asn Thr Thr Lys Gln Glu His Phe Pro Asp Asn
        195                 200                 205

Gly Ser Gly Gly Gly Gly Ser Gly Gly Gly Gly Ser Gly Gly Gly Gly
    210                 215                 220

Ser Ala Glu Ser Lys Tyr Gly Pro Pro Cys Pro Pro Cys Pro Ala Pro
225                 230                 235                 240

Glu Ala Ala Gly Gly Pro Ser Val Phe Leu Phe Pro Pro Lys Pro Lys
                245                 250                 255

Asp Gln Leu Met Ile Ser Arg Thr Pro Glu Val Thr Cys Val Val Val
            260                 265                 270

Asp Val Ser Gln Glu Asp Pro Glu Val Gln Phe Asn Trp Tyr Val Asp
        275                 280                 285

Gly Val Glu Val His Asn Ala Lys Thr Lys Pro Arg Glu Glu Gln Phe
    290                 295                 300

Asn Ser Thr Tyr Arg Val Val Ser Val Leu Thr Val Leu His Gln Asp
305                 310                 315                 320

Trp Leu Asn Gly Lys Glu Tyr Lys Cys Lys Val Ser Asn Lys Gly Leu
```

```
                    325                 330                 335
Pro Ser Ser Ile Glu Lys Thr Ile Ser Lys Ala Lys Gly Gln Pro Arg
                340                 345                 350

Glu Pro Gln Val Tyr Thr Leu Pro Pro Ser Gln Glu Glu Met Thr Lys
            355                 360                 365

Asn Gln Val Ser Leu Thr Cys Leu Val Lys Gly Phe Tyr Pro Ser Asp
        370                 375                 380

Ile Ala Val Glu Trp Glu Ser Asn Gly Gln Pro Glu Asn Asn Tyr Lys
385                 390                 395                 400

Thr Thr Pro Pro Val Leu Asp Ser Asp Gly Ser Phe Phe Leu Tyr Ser
                405                 410                 415

Arg Leu Thr Val Asp Lys Ser Arg Trp Gln Gln Gly Asn Val Phe Ser
            420                 425                 430

Cys Ser Val Leu His Glu Ala Leu His Asn His Tyr Thr Gln Lys Ser
        435                 440                 445

Leu Ser Leu Ser Leu Gly Gly Gly Gly Ser Ala Pro Thr Ser Ser
450                 455                 460

Ser Thr Lys Lys Thr Gln Leu Gln Leu Glu His Leu Leu Leu Asp Leu
465                 470                 475                 480

Gln Met Ile Leu Asn Gly Ile Asn Asn Tyr Lys Asn Pro Lys Leu Thr
                485                 490                 495

Ala Met Leu Thr Ala Lys Phe Tyr Met Pro Lys Lys Ala Thr Glu Leu
            500                 505                 510

Lys His Leu Gln Cys Leu Glu Arg Glu Leu Lys Pro Leu Glu Glu Val
        515                 520                 525

Leu Asn Leu Ala Gln Ser Lys Asn Phe His Leu Arg Pro Arg Asp Leu
530                 535                 540

Ile Ser Asn Ile Asn Val Ile Val Leu Glu Leu Lys Gly Ser Glu Thr
545                 550                 555                 560

Thr Phe Met Cys Glu Tyr Ala Asp Glu Thr Ala Thr Ile Val Glu Phe
                565                 570                 575

Leu Asn Arg Trp Ile Thr Phe Cys Gln Ser Ile Ile Ser Thr Leu Thr
            580                 585                 590
```

<210> SEQ ID NO 29
<211> LENGTH: 1857
<212> TYPE: DNA
<213> ORGANISM: Artificial Sequence
<220> FEATURE:
<223> OTHER INFORMATION: nucleotiedes coding fusion protein (GI102-M72)

<400> SEQUENCE: 29

```
atggatgcta tgctgagagg cctgtgttgc gtgctgctgc tgtgtggcgc tgtgttcgtg      60
tctccttctc acgctgtgat ccacgtgacc aaagaagtga agaggtcgc cacactgtcc      120 tgcggccaca cgtttcagt ggaagaactg gcccagacca ggatctactg cagaaagaa      180 aagaaaatgg tgctgaccat gatgtccggc gacatgaaca tctggcctga gtacaagaac      240
cggaccatct tcgacatcac caacaacctg tccatcgtga ttctggccct gaggccttct      300
gatgagggca cctatgagtg cgtggtgctg aagtacgaga aggacgcctt caagcgcgag      360
cacctggctg aagtgacact gtccgtgaag gccgactttc ccacaccttc catctccgac      420
ttcgagatcc ctaccctccaa catccggcgg atcatctgtt ctacctctgg cggctttcct      480
gagcctcact gtcttggct ggaaaacggc gaggaactga cgccatcaa accaccgtg      540 tctcaggacc ccgaaaccga gctgtacgct gtgtcctcca gctggactt caacatgacc      600
```

-continued

```
accaaccaca gcttcatgtg cctgattaag tacggccacc tgagagtgaa ccagaccttc    660
aactggaaca ccaccaagca agagcacttc cctgacaatg gatctggcgg cggaggttct    720
ggcggaggtg aagcggagg cggaggatct gctgagtcta agtatggccc tccttgtcct    780
ccatgtcctg ctccagaagc tgctggcgga ccctctgtgt tcctgtttcc tccaaagcct    840
aaggaccagc tcatgatctc tcggacaccc gaagtgacct gcgtggtggt ggatgtgtct    900
caagaggacc ctgaggtgca gttcaattgg tacgtggacg gcgtggaagt gcacaacgcc    960
aagaccaagc ctagagagga acagttcaac tccacctaca gagtggtgtc cgtgctgacc   1020
gtgctgcacc aggattggct gaacggcaaa gagtacaagt gcaaggtgtc caacaagggc   1080
ctgccttcca gcatcgaaaa gaccatctcc aaggctaagg ccagcctag ggaaccccag    1140
gtttacaccc tgcctccaag ccaagaggaa atgaccaaga accaggtgtc cctgacctgc   1200
ctggtcaagg gcttctaccc ttccgacatt gccgtggaat gggagtccaa tggccagcct   1260
gagaacaact acaagaccac acctcctgtg ctggactccg acggctcctt ctttctgtac   1320
tctcgcctga ccgtggacaa gtctagatgg caagagggca acgtgttctc ctgctctgtg   1380
ctgcacgagg ccctgcacaa tcactacacc cagaagtccc tgtctctgtc tcttggaggt   1440
ggtggcggtt ctgcccctac cagctcctct accaagaaaa cccagctcca gttggagcat   1500
ctgctgctgg acctccagat gattctgaac gggatcaaca actataagaa ccccaagctg   1560
accgccatgc tgaccgctaa gttctacatg cccaagaagg ccaccgagct gaagcacctc   1620
cagtgcctgg aagaagaact gaagcccctg aagaggtgc tgaatggggc ccagtccaag    1680
aacttccacc tgaggccacg ggacctgatc agcaacatca acgtgatcgt gctggaactg   1740
aagggctccg agacaacctt tatgtgcgag tacgccgacg agacagccac catcgtggaa   1800
tttctgaacc ggtggatcac cttctgccag agcatcatct ccacactgac ctgatga      1857
```

<210> SEQ ID NO 30
<211> LENGTH: 592
<212> TYPE: PRT
<213> ORGANISM: Artificial Sequence
<220> FEATURE:
<223> OTHER INFORMATION: fusion protein (GI102-M72)

<400> SEQUENCE: 30

```
Val Ile His Val Thr Lys Glu Val Lys Glu Val Ala Thr Leu Ser Cys
1               5                   10                  15

Gly His Asn Val Ser Val Glu Glu Leu Ala Gln Thr Arg Ile Tyr Trp
            20                  25                  30

Gln Lys Glu Lys Lys Met Val Leu Thr Met Met Ser Gly Asp Met Asn
        35                  40                  45

Ile Trp Pro Glu Tyr Lys Asn Arg Thr Ile Phe Asp Ile Thr Asn Asn
    50                  55                  60

Leu Ser Ile Val Ile Leu Ala Leu Arg Pro Ser Asp Glu Gly Thr Tyr
65                  70                  75                  80

Glu Cys Val Val Leu Lys Tyr Glu Lys Asp Ala Phe Lys Arg Glu His
                85                  90                  95

Leu Ala Glu Val Thr Leu Ser Val Lys Ala Asp Phe Pro Thr Pro Ser
            100                 105                 110

Ile Ser Asp Phe Glu Ile Pro Thr Ser Asn Ile Arg Arg Ile Ile Cys
        115                 120                 125

Ser Thr Ser Gly Gly Phe Pro Glu Pro His Leu Ser Trp Leu Glu Asn
    130                 135                 140
```

-continued

Gly Glu Glu Leu Asn Ala Ile Asn Thr Thr Val Ser Gln Asp Pro Glu
145                 150                 155                 160

Thr Glu Leu Tyr Ala Val Ser Ser Lys Leu Asp Phe Asn Met Thr Thr
                165                 170                 175

Asn His Ser Phe Met Cys Leu Ile Lys Tyr Gly His Leu Arg Val Asn
            180                 185                 190

Gln Thr Phe Asn Trp Asn Thr Thr Lys Gln Glu His Phe Pro Asp Asn
        195                 200                 205

Gly Ser Gly Gly Gly Ser Gly Gly Gly Ser Gly Gly Gly Gly
    210                 215                 220

Ser Ala Glu Ser Lys Tyr Gly Pro Pro Cys Pro Pro Cys Pro Ala Pro
225                 230                 235                 240

Glu Ala Ala Gly Gly Pro Ser Val Phe Leu Phe Pro Pro Lys Pro Lys
                245                 250                 255

Asp Gln Leu Met Ile Ser Arg Thr Pro Glu Val Thr Cys Val Val Val
            260                 265                 270

Asp Val Ser Gln Glu Asp Pro Glu Val Gln Phe Asn Trp Tyr Val Asp
        275                 280                 285

Gly Val Glu Val His Asn Ala Lys Thr Lys Pro Arg Glu Glu Gln Phe
    290                 295                 300

Asn Ser Thr Tyr Arg Val Val Ser Val Leu Thr Val Leu His Gln Asp
305                 310                 315                 320

Trp Leu Asn Gly Lys Glu Tyr Lys Cys Lys Val Ser Asn Lys Gly Leu
                325                 330                 335

Pro Ser Ser Ile Glu Lys Thr Ile Ser Lys Ala Lys Gly Gln Pro Arg
            340                 345                 350

Glu Pro Gln Val Tyr Thr Leu Pro Pro Ser Gln Glu Glu Met Thr Lys
        355                 360                 365

Asn Gln Val Ser Leu Thr Cys Leu Val Lys Gly Phe Tyr Pro Ser Asp
370                 375                 380

Ile Ala Val Glu Trp Glu Ser Asn Gly Gln Pro Glu Asn Asn Tyr Lys
385                 390                 395                 400

Thr Thr Pro Pro Val Leu Asp Ser Asp Gly Ser Phe Phe Leu Tyr Ser
                405                 410                 415

Arg Leu Thr Val Asp Lys Ser Arg Trp Gln Glu Gly Asn Val Phe Ser
            420                 425                 430

Cys Ser Val Leu His Glu Ala Leu His Asn His Tyr Thr Gln Lys Ser
        435                 440                 445

Leu Ser Leu Ser Leu Gly Gly Gly Gly Ser Ala Pro Thr Ser Ser
450                 455                 460

Ser Thr Lys Lys Thr Gln Leu Gln Leu Glu His Leu Leu Leu Asp Leu
465                 470                 475                 480

Gln Met Ile Leu Asn Gly Ile Asn Asn Tyr Lys Asn Pro Lys Leu Thr
                485                 490                 495

Ala Met Leu Thr Ala Lys Phe Tyr Met Pro Lys Lys Ala Thr Glu Leu
            500                 505                 510

Lys His Leu Gln Cys Leu Glu Glu Glu Leu Lys Pro Leu Glu Glu Val
        515                 520                 525

Leu Asn Gly Ala Gln Ser Lys Asn Phe His Leu Arg Pro Arg Asp Leu
    530                 535                 540

Ile Ser Asn Ile Asn Val Ile Val Leu Glu Leu Lys Gly Ser Glu Thr
545                 550                 555                 560

```
Thr Phe Met Cys Glu Tyr Ala Asp Glu Thr Ala Thr Ile Val Glu Phe
            565                 570                 575

Leu Asn Arg Trp Ile Thr Phe Cys Gln Ser Ile Ile Ser Thr Leu Thr
            580                 585                 590
```

<210> SEQ ID NO 31
<211> LENGTH: 1851
<212> TYPE: DNA
<213> ORGANISM: Artificial Sequence
<220> FEATURE:
<223> OTHER INFORMATION: nucleotiedes coding fusion protein (GI101w)

<400> SEQUENCE: 31

```
atggatgcta tgctgagagg cctgtgttgc gtgctgctgc tgtgtggcgc tgtgttcgtg    60
tctccttctc acgctgtgat ccacgtgacc aaagaagtga agaggtcgc cacactgtcc    120
tgcggccaca acgtttcagt ggaagaactg gcccagacca ggatctactg cagaaagaa   180
aagaaaatgg tgctgaccat gatgtccggc gacatgaaca tctggcctga gtacaagaac   240
cggaccatct tcgacatcac caacaacctg tccatcgtga ttctggccct gaggccttct   300
gatgagggca cctatgagtg cgtggtgctg aagtacgaga aggacgcctt caagcgcgag   360
cacctggctg aagtgacact gtccgtgaag gccgactttc ccacaccttc catctccgac   420
ttcgagatcc ctacctccaa catcggcgg atcatctgtt ctacctctgg cggctttcct   480
gagcctcacc tgtcttggct ggaaaacggc gaggaactga acgccatcaa ccaccaccgtg   540
tctcaggacc ccgaaaccga gctgtacgct gtgcctcca agctggactt caacatgacc   600
accaaccaca gcttcatgtg cctgattaag tacggccacc tgagagtgaa ccagaccttc   660
aactggaaca ccaccaagca agagcacttc cctgacaatg gatctggcgg cggaggttct   720
ggcggaggtg aagcggagg cggaggatct gctgagtcta gtatggcc tccttgtcct    780
ccatgtcctg ctccagaagc tgctggcgga ccctctgtgt tcctgttcc tccaaagcct   840
aaggaccagc tcatgatctc tcggacaccc gaagtgacct gcgtggtggt ggatgtgtct   900
caagaggacc ctgaggtgca gttcaattgg tacgtggacg gcgtggaagt gcacaacgcc   960
aagaccaagc ctagagagga acagttcaac tccacctaca gagtggtgtc cgtgctgacc   1020
gtgctgcacc aggattggct gaacggcaaa gagtacaagt gcaaggtgtc caacaagggc   1080
ctgccttcca gcatcgaaaa gaccatctcc aaggctaagg gccagcctag gaaccccag   1140
gtttacaccc tgcctccaag ccaagaggaa atgaccaaga accaggtgtc cctgacctgc   1200
ctggtcaagg gcttctaccc ttccgacatt gccgtggaat gggagtccaa tggccagcct   1260
gagaacaact acaagaccac acctcctgtg ctggactccg acggctcctt ctttctgtac   1320
tctcgcctga ccgtggacaa gtctagatgg caagagggca acgtgttctc ctgctctgtg   1380
ctgcacgagg ccctgcacaa tcactacacc cagaagtccc tgtctctgtc tcttggaggt   1440
ggtggcggtt ctgcccctac cagctcctct accaagaaaa cccagctcca gttggagcat   1500
ctgctgctgg acctccagat gattctgaac gggatcaaca actataagaa ccccaagctg   1560
acccgcatgc tgacctttaa gttctacatg cccaagaagg ccaccgagct gaagcacctc   1620
cagtgcctgg aagaagaact gaagcccctg gaagaggtgc tgaatctggc ccagtccaag   1680
aacttccacc tgaggccacg ggacctgatc agcaacatca acgtgatcgt gctggaactg   1740
aagggctccg agacaacctt tatgtgcgag tacgccgacg agacagccac catcgtggaa   1800
tttctgaacc ggtggatcac cttctgccag agcatcatct ccacactgac c             1851
```

<210> SEQ ID NO 32
<211> LENGTH: 592
<212> TYPE: PRT
<213> ORGANISM: Artificial Sequence
<220> FEATURE:
<223> OTHER INFORMATION: fusion protein (GI101w)

<400> SEQUENCE: 32

```
Val Ile His Val Thr Lys Glu Val Lys Glu Val Ala Thr Leu Ser Cys
1               5                   10                  15

Gly His Asn Val Ser Val Glu Glu Leu Ala Gln Thr Arg Ile Tyr Trp
            20                  25                  30

Gln Lys Glu Lys Lys Met Val Leu Thr Met Met Ser Gly Asp Met Asn
        35                  40                  45

Ile Trp Pro Glu Tyr Lys Asn Arg Thr Ile Phe Asp Ile Thr Asn Asn
    50                  55                  60

Leu Ser Ile Val Ile Leu Ala Leu Arg Pro Ser Asp Glu Gly Thr Tyr
65                  70                  75                  80

Glu Cys Val Val Leu Lys Tyr Glu Lys Asp Ala Phe Lys Arg Glu His
                85                  90                  95

Leu Ala Glu Val Thr Leu Ser Val Lys Ala Asp Phe Pro Thr Pro Ser
            100                 105                 110

Ile Ser Asp Phe Glu Ile Pro Thr Ser Asn Ile Arg Arg Ile Ile Cys
        115                 120                 125

Ser Thr Ser Gly Gly Phe Pro Glu Pro His Leu Ser Trp Leu Glu Asn
130                 135                 140

Gly Glu Glu Leu Asn Ala Ile Asn Thr Thr Val Ser Gln Asp Pro Glu
145                 150                 155                 160

Thr Glu Leu Tyr Ala Val Ser Ser Lys Leu Asp Phe Asn Met Thr Thr
                165                 170                 175

Asn His Ser Phe Met Cys Leu Ile Lys Tyr Gly His Leu Arg Val Asn
            180                 185                 190

Gln Thr Phe Asn Trp Asn Thr Thr Lys Gln Glu His Phe Pro Asp Asn
        195                 200                 205

Gly Ser Gly Gly Gly Gly Ser Gly Gly Gly Gly Ser Gly Gly Gly Gly
    210                 215                 220

Ser Ala Glu Ser Lys Tyr Gly Pro Pro Cys Pro Pro Cys Pro Ala Pro
225                 230                 235                 240

Glu Ala Ala Gly Gly Pro Ser Val Phe Leu Phe Pro Pro Lys Pro Lys
                245                 250                 255

Asp Gln Leu Met Ile Ser Arg Thr Pro Glu Val Thr Cys Val Val Val
            260                 265                 270

Asp Val Ser Gln Glu Asp Pro Glu Val Gln Phe Asn Trp Tyr Val Asp
        275                 280                 285

Gly Val Glu Val His Asn Ala Lys Thr Lys Pro Arg Glu Glu Gln Phe
    290                 295                 300

Asn Ser Thr Tyr Arg Val Val Ser Val Leu Thr Val Leu His Gln Asp
305                 310                 315                 320

Trp Leu Asn Gly Lys Glu Tyr Lys Cys Lys Val Ser Asn Lys Gly Leu
                325                 330                 335

Pro Ser Ser Ile Glu Lys Thr Ile Ser Lys Ala Lys Gly Gln Pro Arg
            340                 345                 350

Glu Pro Gln Val Tyr Thr Leu Pro Pro Ser Gln Glu Glu Met Thr Lys
        355                 360                 365

Asn Gln Val Ser Leu Thr Cys Leu Val Lys Gly Phe Tyr Pro Ser Asp
```

Ile Ala Val Glu Trp Glu Ser Asn Gly Gln Pro Glu Asn Asn Tyr Lys
385                 390                 395                 400

Thr Thr Pro Pro Val Leu Asp Ser Asp Gly Ser Phe Phe Leu Tyr Ser
                405                 410                 415

Arg Leu Thr Val Asp Lys Ser Arg Trp Gln Glu Gly Asn Val Phe Ser
                420                 425                 430

Cys Ser Val Leu His Glu Ala Leu His Asn His Tyr Thr Gln Lys Ser
            435                 440                 445

Leu Ser Leu Ser Leu Gly Gly Gly Gly Ser Ala Pro Thr Ser Ser
        450                 455                 460

Ser Thr Lys Lys Thr Gln Leu Gln Leu Glu His Leu Leu Leu Asp Leu
465                 470                 475                 480

Gln Met Ile Leu Asn Gly Ile Asn Asn Tyr Lys Asn Pro Lys Leu Thr
                485                 490                 495

Arg Met Leu Thr Phe Lys Phe Tyr Met Pro Lys Lys Ala Thr Glu Leu
                500                 505                 510

Lys His Leu Gln Cys Leu Glu Glu Glu Leu Lys Pro Leu Glu Glu Val
            515                 520                 525

Leu Asn Leu Ala Gln Ser Lys Asn Phe His Leu Arg Pro Arg Asp Leu
530                 535                 540

Ile Ser Asn Ile Asn Val Ile Val Leu Glu Leu Lys Gly Ser Glu Thr
545                 550                 555                 560

Thr Phe Met Cys Glu Tyr Ala Asp Glu Thr Ala Thr Ile Val Glu Phe
                565                 570                 575

Leu Asn Arg Trp Ile Thr Phe Cys Gln Ser Ile Ile Ser Thr Leu Thr
                580                 585                 590

<210> SEQ ID NO 33
<211> LENGTH: 1848
<212> TYPE: DNA
<213> ORGANISM: Artificial Sequence
<220> FEATURE:
<223> OTHER INFORMATION: nucleotiedes coding fusion protein (mGI102-M61)

<400> SEQUENCE: 33

```
atggatgcta tgctgagagg cctgtgtttgc gtgctgctgc tgtgtggcgc tgtgttcgtg     60
tctccttctc acgctgtgga cgagcagctc tccaagtccg tgaaggataa ggtcctgctg    120
ccttgccggt acaactctcc tcacgaggac gagtctgagg accggatcta ctggcagaaa    180
cacgacaagg tggtgctgtc cgtgatcgcc ggaaagctga agtgtggcc tgagtacaag    240
aacaggaccc tgtacgacaa caccacctac agcctgatca tcctgggcct cgtgctgagc    300
gatagaggca cctattcttg cgtggtgcag aagaaagagc ggggcaccta cgaagtgaag    360
cacctggctc tggtcaagct gtccatcaag gccgacttca gcacccctaa catcaccgag    420
tctggcaacc cttccgccga caccaagaga atcacctgtt cgcctctgg cggcttccct    480
aagcctcggt tctcttggct ggaaaacggc agagagctgc ccggcatcaa taccaccatt    540
tctcaggacc cagagtccga gctgtacacc atctccagcc agctcgactt taacaccacc    600
agaaaccaca ccatcaagtg cctgattaag tacggcgacg cccacgtgtc cgaggacttt    660
acttgggaga aacctcctga ggaccctcct gactctggat ctggcggcgg aggttctggc    720
ggaggtggaa gcgaggcgg aggatctgct gagtctaagt atggccctcc ttgtcctcca    780
tgtcctgctc cagaagctgc tggcggaccc tctgtgttcc tgtttcctcc aaagcctaag    840
```

```
gaccagctca tgatctctcg gaccoctgaa gtgacctgcg tggtggtgga tgtgtctcaa    900
gaggaccctg aggtgcagtt caattggtac gtggacggcg tggaagtgca caacgccaag    960
accaagccta gagaggaaca gttcaactcc acctatagag tggtgtccgt gctgaccgtg   1020
ctgcaccagg attggctgaa cggcaaagag tacaagtgca aggtgtccaa cagggcctg    1080 ccttccagca tcgaaaagac catcagcaag gctaagggcc agcctaggga accccaggtt   1140
tacaccctgc ctccaagcca agaggaaatg accaagaacc aggtgtccct gacctgcctg   1200
gtcaagggct tctacccttc cgacattgcc gtggaatggg agtccaatgg ccagcctgag   1260
aacaactaca agaccacacc tcctgtgctg gactccgacg gctccttctt tctgtactct   1320
cgcctgaccg tggacaagtc taggtggcaa gagggcaacg tgttctcctg ctctgtgctg   1380
cacgaggctc tgcacaacca ctacacccag aagtccctgt ctctgtctct tggaggtggt   1440
ggcggttctg cccctacctc cagctctacc aagaaaaccc agctccagtt ggagcatctg   1500
ctgctggacc tccagatgat cctgaatggc atcaacaatt acaagaaccc caagctgacc   1560
gccatgctga ccgctaagtt ctacatgccc aagaaggcca ccgagctgaa gcacttgcag   1620
tgcctggaaa gggaactgaa gcccctggaa gaagtgctga atctggccca gtccaagaac   1680
ttccacctga ggcctaggga cctgatctcc aacatcaacg tgatcgtgct ggaactgaaa   1740
ggctccgaga caaccttcat gtgcgagtac gccgacgaga cagccaccat cgtggaattt   1800
ctgaaccggt ggatcacctt ctgccagagc atcatctcca cactgacc               1848
```

<210> SEQ ID NO 34
<211> LENGTH: 616
<212> TYPE: PRT
<213> ORGANISM: Artificial Sequence
<220> FEATURE:
<223> OTHER INFORMATION: fusion protein (mGI102-M61)

<400> SEQUENCE: 34

```
Met Asp Ala Met Leu Arg Gly Leu Cys Cys Val Leu Leu Cys Gly
1               5                   10                  15

Ala Val Phe Val Ser Pro Ser His Ala Val Asp Glu Gln Leu Ser Lys
                20                  25                  30

Ser Val Lys Asp Lys Val Leu Leu Pro Cys Arg Tyr Asn Ser Pro His
            35                  40                  45

Glu Asp Glu Ser Glu Asp Arg Ile Tyr Trp Gln Lys His Asp Lys Val
        50                  55                  60

Val Leu Ser Val Ile Ala Gly Lys Leu Lys Val Trp Pro Glu Tyr Lys
65                  70                  75                  80

Asn Arg Thr Leu Tyr Asp Asn Thr Thr Tyr Ser Leu Ile Ile Leu Gly
                85                  90                  95

Leu Val Leu Ser Asp Arg Gly Thr Tyr Ser Cys Val Val Gln Lys Lys
            100                 105                 110

Glu Arg Gly Thr Tyr Glu Val Lys His Leu Ala Leu Val Lys Leu Ser
        115                 120                 125

Ile Lys Ala Asp Phe Ser Thr Pro Asn Ile Thr Glu Ser Gly Asn Pro
    130                 135                 140

Ser Ala Asp Thr Lys Arg Ile Thr Cys Phe Ala Ser Gly Gly Phe Pro
145                 150                 155                 160

Lys Pro Arg Phe Ser Trp Leu Glu Asn Gly Arg Glu Leu Pro Gly Ile
                165                 170                 175

Asn Thr Thr Ile Ser Gln Asp Pro Glu Ser Glu Leu Tyr Thr Ile Ser
            180                 185                 190
```

-continued

```
Ser Gln Leu Asp Phe Asn Thr Thr Arg Asn His Thr Ile Lys Cys Leu
        195                 200                 205

Ile Lys Tyr Gly Asp Ala His Val Ser Glu Asp Phe Thr Trp Glu Lys
        210                 215                 220

Pro Pro Glu Asp Pro Asp Ser Gly Ser Gly Gly Gly Ser Gly
225                 230                 235                 240

Gly Gly Gly Ser Gly Gly Gly Ser Ala Glu Ser Lys Tyr Gly Pro
            245                 250                 255

Pro Cys Pro Pro Cys Pro Ala Pro Glu Ala Ala Gly Gly Pro Ser Val
            260                 265                 270

Phe Leu Phe Pro Pro Lys Pro Lys Asp Gln Leu Met Ile Ser Arg Thr
        275                 280                 285

Pro Glu Val Thr Cys Val Val Val Asp Val Ser Gln Glu Asp Pro Glu
        290                 295                 300

Val Gln Phe Asn Trp Tyr Val Asp Gly Val Glu Val His Asn Ala Lys
305                 310                 315                 320

Thr Lys Pro Arg Glu Glu Gln Phe Asn Ser Thr Tyr Arg Val Val Ser
                325                 330                 335

Val Leu Thr Val Leu His Gln Asp Trp Leu Asn Gly Lys Glu Tyr Lys
            340                 345                 350

Cys Lys Val Ser Asn Lys Gly Leu Pro Ser Ser Ile Glu Lys Thr Ile
            355                 360                 365

Ser Lys Ala Lys Gly Gln Pro Arg Glu Pro Gln Val Tyr Thr Leu Pro
        370                 375                 380

Pro Ser Gln Glu Glu Met Thr Lys Asn Gln Val Ser Leu Thr Cys Leu
385                 390                 395                 400

Val Lys Gly Phe Tyr Pro Ser Asp Ile Ala Val Glu Trp Glu Ser Asn
                405                 410                 415

Gly Gln Pro Glu Asn Asn Tyr Lys Thr Thr Pro Pro Val Leu Asp Ser
            420                 425                 430

Asp Gly Ser Phe Phe Leu Tyr Ser Arg Leu Thr Val Asp Lys Ser Arg
        435                 440                 445

Trp Gln Glu Gly Asn Val Phe Ser Cys Ser Val Leu His Glu Ala Leu
        450                 455                 460

His Asn His Tyr Thr Gln Lys Ser Leu Ser Leu Ser Leu Gly Gly Gly
465                 470                 475                 480

Gly Gly Ser Ala Pro Thr Ser Ser Thr Lys Lys Thr Gln Leu Gln
            485                 490                 495

Leu Glu His Leu Leu Leu Asp Leu Gln Met Ile Leu Asn Gly Ile Asn
            500                 505                 510

Asn Tyr Lys Asn Pro Lys Leu Thr Ala Met Leu Thr Ala Lys Phe Tyr
        515                 520                 525

Met Pro Lys Lys Ala Thr Glu Leu Lys His Leu Gln Cys Leu Glu Arg
        530                 535                 540

Glu Leu Lys Pro Leu Glu Val Leu Asn Leu Ala Gln Ser Lys Asn
545                 550                 555                 560

Phe His Leu Arg Pro Arg Asp Leu Ile Ser Asn Ile Asn Val Ile Val
                565                 570                 575

Leu Glu Leu Lys Gly Ser Glu Thr Thr Phe Met Cys Glu Tyr Ala Asp
            580                 585                 590

Glu Thr Ala Thr Ile Val Glu Phe Leu Asn Arg Trp Ile Thr Phe Cys
        595                 600                 605
```

```
Gln Ser Ile Ile Ser Thr Leu Thr
    610                 615

<210> SEQ ID NO 35
<211> LENGTH: 153
<212> TYPE: PRT
<213> ORGANISM: Artificial Sequence
<220> FEATURE:
<223> OTHER INFORMATION: wild type hIL-2

<400> SEQUENCE: 35

Met Tyr Arg Met Gln Leu Leu Ser Cys Ile Ala Leu Ser Leu Ala Leu
1               5                   10                  15

Val Thr Asn Ser Ala Pro Thr Ser Ser Ser Thr Lys Lys Thr Gln Leu
            20                  25                  30

Gln Leu Glu His Leu Leu Leu Asp Leu Gln Met Ile Leu Asn Gly Ile
        35                  40                  45

Asn Asn Tyr Lys Asn Pro Lys Leu Thr Arg Met Leu Thr Phe Lys Phe
    50                  55                  60

Tyr Met Pro Lys Lys Ala Thr Glu Leu Lys His Leu Gln Cys Leu Glu
65                  70                  75                  80

Glu Glu Leu Lys Pro Leu Glu Glu Val Leu Asn Leu Ala Gln Ser Lys
                85                  90                  95

Asn Phe His Leu Arg Pro Arg Asp Leu Ile Ser Asn Ile Asn Val Ile
            100                 105                 110

Val Leu Glu Leu Lys Gly Ser Glu Thr Thr Phe Met Cys Glu Tyr Ala
        115                 120                 125

Asp Glu Thr Ala Thr Ile Val Glu Phe Leu Asn Arg Trp Ile Thr Phe
    130                 135                 140

Cys Gln Ser Ile Ile Ser Thr Leu Thr
145                 150

<210> SEQ ID NO 36
<211> LENGTH: 158
<212> TYPE: PRT
<213> ORGANISM: Artificial Sequence
<220> FEATURE:
<223> OTHER INFORMATION: IL-2 with signal sequence

<400> SEQUENCE: 36

Met Asp Ala Met Leu Arg Gly Leu Cys Cys Val Leu Leu Leu Cys Gly
1               5                   10                  15

Ala Val Phe Val Ser Pro Ser His Ala Ala Pro Thr Ser Ser Ser Thr
            20                  25                  30

Lys Lys Thr Gln Leu Gln Leu Glu His Leu Leu Leu Asp Leu Gln Met
        35                  40                  45

Ile Leu Asn Gly Ile Asn Asn Tyr Lys Asn Pro Lys Leu Thr Arg Met
    50                  55                  60

Leu Thr Phe Lys Phe Tyr Met Pro Lys Lys Ala Thr Glu Leu Lys His
65                  70                  75                  80

Leu Gln Cys Leu Glu Glu Glu Leu Lys Pro Leu Glu Glu Val Leu Asn
                85                  90                  95

Leu Ala Gln Ser Lys Asn Phe His Leu Arg Pro Arg Asp Leu Ile Ser
            100                 105                 110

Asn Ile Asn Val Ile Val Leu Glu Leu Lys Gly Ser Glu Thr Thr Phe
        115                 120                 125

Met Cys Glu Tyr Ala Asp Glu Thr Ala Thr Ile Val Glu Phe Leu Asn
    130                 135                 140
```

```
Arg Trp Ile Thr Phe Cys Gln Ser Ile Ile Ser Thr Leu Thr
145                 150                 155

<210> SEQ ID NO 37
<211> LENGTH: 474
<212> TYPE: DNA
<213> ORGANISM: Artificial Sequence
<220> FEATURE:
<223> OTHER INFORMATION: nucleotide sequence coding IL-2 with signal
      sequence

<400> SEQUENCE: 37
atggatgcta tgctgagagg cctgtgttgc gtgctgctgc tgtgtggcgc tgtgttcgtg      60
tctccttctc acgctgcccc taccagctcc tctaccaaga aacccagct ccagttggag      120 catctgctgc tggacctcca gatgattctg aacgggatca caactataa gaaccccaag      180 ctgacccgca tgctgacctt taagttctac atgcccaaga aggccaccga gctgaagcac      240
ctccagtgcc tggaagaaga actgaagccc ctggaagagg tgctgaatct ggcccagtcc      300
aagaacttcc acctgaggcc acgggacctg atcagcaaca tcaacgtgat cgtgctggaa      360
ctgaagggct ccgagacaac ctttatgtgc gagtacgccg acgagacagc caccatcgtg      420
gaatttctga accggtggat caccttctgc cagagcatca tctccacact gacc            474

<210> SEQ ID NO 38
<211> LENGTH: 591
<212> TYPE: PRT
<213> ORGANISM: Artificial Sequence
<220> FEATURE:
<223> OTHER INFORMATION: mGI-101

<400> SEQUENCE: 38

Val Asp Glu Gln Leu Ser Lys Ser Val Lys Asp Lys Val Leu Leu Pro
1               5                   10                  15

Cys Arg Tyr Asn Ser Pro His Glu Asp Glu Ser Glu Asp Arg Ile Tyr
            20                  25                  30

Trp Gln Lys His Asp Lys Val Val Leu Ser Val Ile Ala Gly Lys Leu
        35                  40                  45

Lys Val Trp Pro Glu Tyr Lys Asn Arg Thr Leu Tyr Asp Asn Thr Thr
50                  55                  60

Tyr Ser Leu Ile Ile Leu Gly Leu Val Leu Ser Asp Arg Gly Thr Tyr
65                  70                  75                  80

Ser Cys Val Val Gln Lys Lys Glu Arg Gly Thr Tyr Glu Val Lys His
                85                  90                  95

Leu Ala Leu Val Lys Leu Ser Ile Lys Ala Asp Phe Ser Thr Pro Asn
            100                 105                 110

Ile Thr Glu Ser Gly Asn Pro Ser Ala Asp Thr Lys Arg Ile Thr Cys
        115                 120                 125

Phe Ala Ser Gly Gly Phe Pro Lys Pro Arg Phe Ser Trp Leu Glu Asn
    130                 135                 140

Gly Arg Glu Leu Pro Gly Ile Asn Thr Thr Ile Ser Gln Asp Pro Glu
145                 150                 155                 160

Ser Glu Leu Tyr Thr Ile Ser Ser Gln Leu Asp Phe Asn Thr Thr Arg
                165                 170                 175

Asn His Thr Ile Lys Cys Leu Ile Lys Tyr Gly Asp Ala His Val Ser
            180                 185                 190

Glu Asp Phe Thr Trp Glu Lys Pro Pro Glu Asp Pro Pro Asp Ser Gly
        195                 200                 205
```

```
Ser Gly Gly Gly Gly Ser Gly Gly Gly Ser Gly Gly Gly Ser
    210                 215                 220

Ala Glu Ser Lys Tyr Gly Pro Pro Cys Pro Pro Cys Pro Ala Pro Glu
225                 230                 235                 240

Ala Ala Gly Gly Pro Ser Val Phe Leu Phe Pro Pro Lys Pro Lys Asp
                245                 250                 255

Gln Leu Met Ile Ser Arg Thr Pro Glu Val Thr Cys Val Val Val Asp
                260                 265                 270

Val Ser Gln Glu Asp Pro Glu Val Gln Phe Asn Trp Tyr Val Asp Gly
                275                 280                 285

Val Glu Val His Asn Ala Lys Thr Lys Pro Arg Glu Glu Gln Phe Asn
                290                 295                 300

Ser Thr Tyr Arg Val Val Ser Val Leu Thr Val Leu His Gln Asp Trp
305                 310                 315                 320

Leu Asn Gly Lys Glu Tyr Lys Cys Lys Val Ser Asn Lys Gly Leu Pro
                325                 330                 335

Ser Ser Ile Glu Lys Thr Ile Ser Lys Ala Lys Gly Gln Pro Arg Glu
                340                 345                 350

Pro Gln Val Tyr Thr Leu Pro Pro Ser Gln Glu Glu Met Thr Lys Asn
                355                 360                 365

Gln Val Ser Leu Thr Cys Leu Val Lys Gly Phe Tyr Pro Ser Asp Ile
                370                 375                 380

Ala Val Glu Trp Glu Ser Asn Gly Gln Pro Glu Asn Asn Tyr Lys Thr
385                 390                 395                 400

Thr Pro Pro Val Leu Asp Ser Asp Gly Ser Phe Phe Leu Tyr Ser Arg
                405                 410                 415

Leu Thr Val Asp Lys Ser Arg Trp Gln Glu Gly Asn Val Phe Ser Cys
                420                 425                 430

Ser Val Leu His Glu Ala Leu His Asn His Tyr Thr Gln Lys Ser Leu
                435                 440                 445

Ser Leu Ser Leu Gly Gly Gly Gly Ser Ala Pro Thr Ser Ser Ser
450                 455                 460

Thr Lys Lys Thr Gln Leu Gln Leu Glu His Leu Leu Leu Asp Leu Gln
465                 470                 475                 480

Met Ile Leu Asn Gly Ile Asn Asn Tyr Lys Asn Pro Lys Leu Thr Ala
                485                 490                 495

Met Leu Thr Ala Lys Phe Tyr Met Pro Lys Lys Ala Thr Glu Leu Lys
                500                 505                 510

His Leu Gln Cys Leu Glu Glu Glu Leu Lys Pro Leu Glu Glu Val Leu
                515                 520                 525

Asn Leu Ala Gln Ser Lys Asn Phe His Leu Arg Pro Arg Asp Leu Ile
530                 535                 540

Ser Asn Ile Asn Val Ile Val Leu Glu Leu Lys Gly Ser Glu Thr Thr
545                 550                 555                 560

Phe Met Cys Glu Tyr Ala Asp Glu Thr Ala Thr Ile Val Glu Phe Leu
                565                 570                 575

Asn Arg Trp Ile Thr Phe Cys Gln Ser Ile Ile Ser Thr Leu Thr
                580                 585                 590
```